(12) United States Patent
Parker

(10) Patent No.: US 11,144,894 B2
(45) Date of Patent: Oct. 12, 2021

(54) MULTI-LEVEL NETWORK-BASED ACCESS COORDINATION

(71) Applicant: DineGigs Inc., Richmond, VA (US)

(72) Inventor: Duncan Parker, Richmond, VA (US)

(73) Assignee: DINEGIGS INC., Richmond, VA (US)

( * ) Notice: Subject to any disclaimer, the term of this patent is extended or adjusted under 35 U.S.C. 154(b) by 309 days.

(21) Appl. No.: 16/145,989

(22) Filed: Sep. 28, 2018

(65) Prior Publication Data

US 2019/0095882 A1    Mar. 28, 2019

Related U.S. Application Data

(60) Provisional application No. 62/564,565, filed on Sep. 28, 2017, provisional application No. 62/592,873, filed on Nov. 30, 2017.

(51) Int. Cl.
| | |
|---|---|
| *G06Q 20/08* | (2012.01) |
| *H04L 29/08* | (2006.01) |
| *G07F 9/00* | (2006.01) |
| *G06Q 20/34* | (2012.01) |

(Continued)

(52) U.S. Cl.
CPC ......... *G06Q 20/085* (2013.01); *G06Q 20/356* (2013.01); *G07F 9/006* (2013.01); *G07F 19/206* (2013.01); *H04L 67/04* (2013.01); *H04L 67/10* (2013.01); *H04L 67/125* (2013.01); *H04L 67/22* (2013.01); *H04L 67/30* (2013.01);

(Continued)

(58) Field of Classification Search
CPC .... G06Q 20/085; G06Q 20/356; G07F 9/006; G07F 19/206; H04L 67/10; H04L 67/04; H04L 67/125; H04L 67/22; H04L 67/30; H04L 67/306; H04L 67/32; H04L 67/34; G06F 8/61

See application file for complete search history.

(56) References Cited

U.S. PATENT DOCUMENTS

| | | | |
|---|---|---|---|
| 8,032,409 B1 * | 10/2011 | Mikurak | G06Q 30/00 |
| | | | 705/14.39 |
| 9,286,640 B1 * | 3/2016 | Smith | G06Q 10/1091 |
| 9,313,381 B2 * | 4/2016 | Kim | G06F 1/1605 |

(Continued)

FOREIGN PATENT DOCUMENTS

WO    WO-2016204817 A1 * 12/2016    ........... G06Q 20/385

*Primary Examiner* — James R Sheleheda
(74) *Attorney, Agent, or Firm* — Volentine, Whitt & Francos, PLLC

(57) ABSTRACT

Multi-level network-based access is coordinated. Multiple downloadable first software applications configured to provide a first class of service are distributed over a communications network. Multiple downloadable second software applications configured to provide a second class of service are distributed over the communications network. A centralized computer system coordinates access between the first software applications and the second software applications, such that access between any of the first software applications and the second software applications is controlled by and through confirmation of the centralized computer system. Services on behalf of the first software applications are provided by the centralized computer system to the second software applications once access between a first software application and a second software application is confirmed.

20 Claims, 46 Drawing Sheets

(51) Int. Cl.
   *G07F 19/00* (2006.01)
   *G06F 8/61* (2018.01)
(52) U.S. Cl.
   CPC ............ *H04L 67/306* (2013.01); *H04L 67/32* (2013.01); *H04L 67/34* (2013.01); *G06F 8/61* (2013.01)

(56) References Cited

U.S. PATENT DOCUMENTS

| | | | | |
|---|---|---|---|---|
| 10,700,875 B1* | 6/2020 | Daruwalla | ............ | H04L 9/3263 |
| 10,861,096 B1* | 12/2020 | Lawrence | ............ | G06Q 40/06 |
| 2001/0044756 A1* | 11/2001 | Watkins | ............ | G06Q 40/02 |
| | | | | 705/26.82 |
| 2002/0010744 A1* | 1/2002 | Prell | ............ | G06F 9/5061 |
| | | | | 709/205 |
| 2002/0052852 A1* | 5/2002 | Bozeman | ............ | G06Q 20/10 |
| | | | | 705/64 |
| 2002/0143655 A1* | 10/2002 | Elston | ............ | H04L 29/06 |
| | | | | 705/26.81 |
| 2002/0174030 A1* | 11/2002 | Praisner | ............ | G06Q 20/10 |
| | | | | 705/39 |
| 2005/0120214 A1* | 6/2005 | Yeates | ............ | H04L 63/08 |
| | | | | 713/171 |
| 2005/0177496 A1* | 8/2005 | Blagg | ............ | G06Q 20/10 |
| | | | | 705/39 |
| 2005/0192895 A1* | 9/2005 | Rogers | ............ | G07F 7/08 |
| | | | | 705/39 |
| 2006/0157557 A1* | 7/2006 | Lee | ............ | G06Q 20/341 |
| | | | | 235/380 |
| 2011/0022484 A1* | 1/2011 | Smith | ............ | G06Q 20/4016 |
| | | | | 705/17 |
| 2011/0079648 A1* | 4/2011 | Pourfallah | ............ | G06Q 20/346 |
| | | | | 235/492 |
| 2012/0016782 A1* | 1/2012 | Hardison, III | ............ | G06Q 40/10 |
| | | | | 705/30 |
| 2012/0036220 A1* | 2/2012 | Dare | ............ | H04L 67/04 |
| | | | | 709/217 |
| 2012/0239560 A1* | 9/2012 | Pourfallah | ............ | G06Q 40/08 |
| | | | | 705/40 |
| 2013/0024364 A1* | 1/2013 | Shrivastava | ............ | G06Q 20/38 |
| | | | | 705/39 |
| 2013/0151358 A1* | 6/2013 | Ramalingam | ............ | G06Q 20/322 |
| | | | | 705/16 |
| 2013/0179346 A1* | 7/2013 | Kumnick | ............ | G06Q 20/40145 |
| | | | | 705/44 |
| 2013/0346302 A1* | 12/2013 | Purves | ............ | G06Q 20/108 |
| | | | | 705/40 |
| 2014/0279474 A1* | 9/2014 | Evans | ............ | G06Q 20/40 |
| | | | | 705/41 |
| 2014/0337175 A1* | 11/2014 | Katzin | ............ | G06Q 30/00 |
| | | | | 705/26.62 |
| 2014/0351042 A1* | 11/2014 | Chaudhary | ............ | G06Q 30/0246 |
| | | | | 705/14.45 |
| 2015/0193745 A1* | 7/2015 | Handwerger | ............ | G06Q 20/20 |
| | | | | 705/39 |
| 2015/0278776 A1* | 10/2015 | Murray | ............ | G06Q 20/28 |
| | | | | 705/39 |
| 2016/0117714 A1* | 4/2016 | Salihu | ............ | G06Q 30/0232 |
| | | | | 705/14.31 |
| 2016/0140520 A1* | 5/2016 | Antoo | ............ | G06Q 20/34 |
| | | | | 705/44 |
| 2016/0335686 A1* | 11/2016 | AthuluruTlrumala | ............ | H04N 21/44222 |
| 2017/0053002 A1* | 2/2017 | Bowman | ............ | G06F 16/951 |
| 2017/0083917 A1* | 3/2017 | Sjoholm | ............ | G06Q 20/4014 |
| 2017/0161688 A1* | 6/2017 | Wang | ............ | G06Q 20/367 |
| 2017/0243170 A1* | 8/2017 | Rashid | ............ | H04W 4/021 |
| 2018/0012210 A1* | 1/2018 | Harman | ............ | G06Q 20/20 |
| 2019/0005451 A1* | 1/2019 | Esposito, II | ............ | H04L 65/1069 |
| 2019/0095882 A1* | 3/2019 | Parker | ............ | H04L 67/32 |
| 2019/0378202 A1* | 12/2019 | Belke | ............ | G06Q 30/06 |
| 2020/0226690 A1* | 7/2020 | Gulati | ............ | G06Q 40/08 |
| 2020/0356966 A1* | 11/2020 | Burkinshaw | ............ | G06Q 20/4012 |

\* cited by examiner

!! = Scheduling Clash
For Employee4

Filter

Gig Type

[X] Part Time

[ ] Full Time

Location

Area

[50 Miles] V

Restaurant Categories

[X] Type #1     [ ] Type #9
[ ] Type #2     [ ] Type #10
[X] Type #3     [ ] Type #11
[ ] Type #4     [ ] Type #12
[ ] Type #5     [ ] Type #13
[ ] Type #6     [ ] Type #14
[ ] Type #7     [ ] Type #15
[ ] Type #8     [ ] Type #16

Gig Categories

[X] Type #1     [ ] Type #9
[ ] Type #2     [ ] Type #10
[X] Type #3     [ ] Type #11
[ ] Type #4     [ ] Type #12
[ ] Type #5     [ ] Type #13
[ ] Type #6     [ ] Type #14
[ ] Type #7     [ ] Type #15
[ ] Type #8     [ ] Type #16

Clear All        ( Apply )

Figure 43

You Are Applying For:
Employer/Position

Your DineWall Profile is Your Resume!

> Write an Introduction or Cover Letter

Or

Alternatively, you may upload a formal cover letter in pdf or .docx format

Upload

I acknowledge this employer may require new hires supply a personal smartphone or tablet with the DineGigs mobile app installed in order for me to access the restaurant management system; I can provide such a device on each shift in which I am scheduled.

Apply

MULTI-LEVEL NETWORK-BASED ACCESS COORDINATION

CROSS REFERENCE

This U.S. non-provisional patent application claims priority to U.S. provisional patent application No. 62/564,565, filed on Sep. 28, 2017, and to U.S. provisional patent application No. 62/592,873, filed on Nov. 30, 2017, the entire contents of which are hereby incorporated by reference.

BACKGROUND

1. Field of the Disclosure

The present disclosure relates to the field of network-based coordination. More particularly, the present disclosure relates to coordinating access between distributed entities with different access levels to controlled network-based infrastructure.

2. Background Information

Currently, some large business entities like national restaurant chains integrate several disparate aspects of business using the internet. For example, a large national restaurant chain may provide integrated functionality via a single internet address for menus and employment applications. However, there are no similar common resources of this type for different business entities (as a class). Similarly, there are no common resources of this type for individuals to access different business entities (as a class).

BRIEF DESCRIPTION OF THE DRAWINGS

FIG. 43 illustrates another exemplary DineWall user interface of an application for multi-level network-based access coordination.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
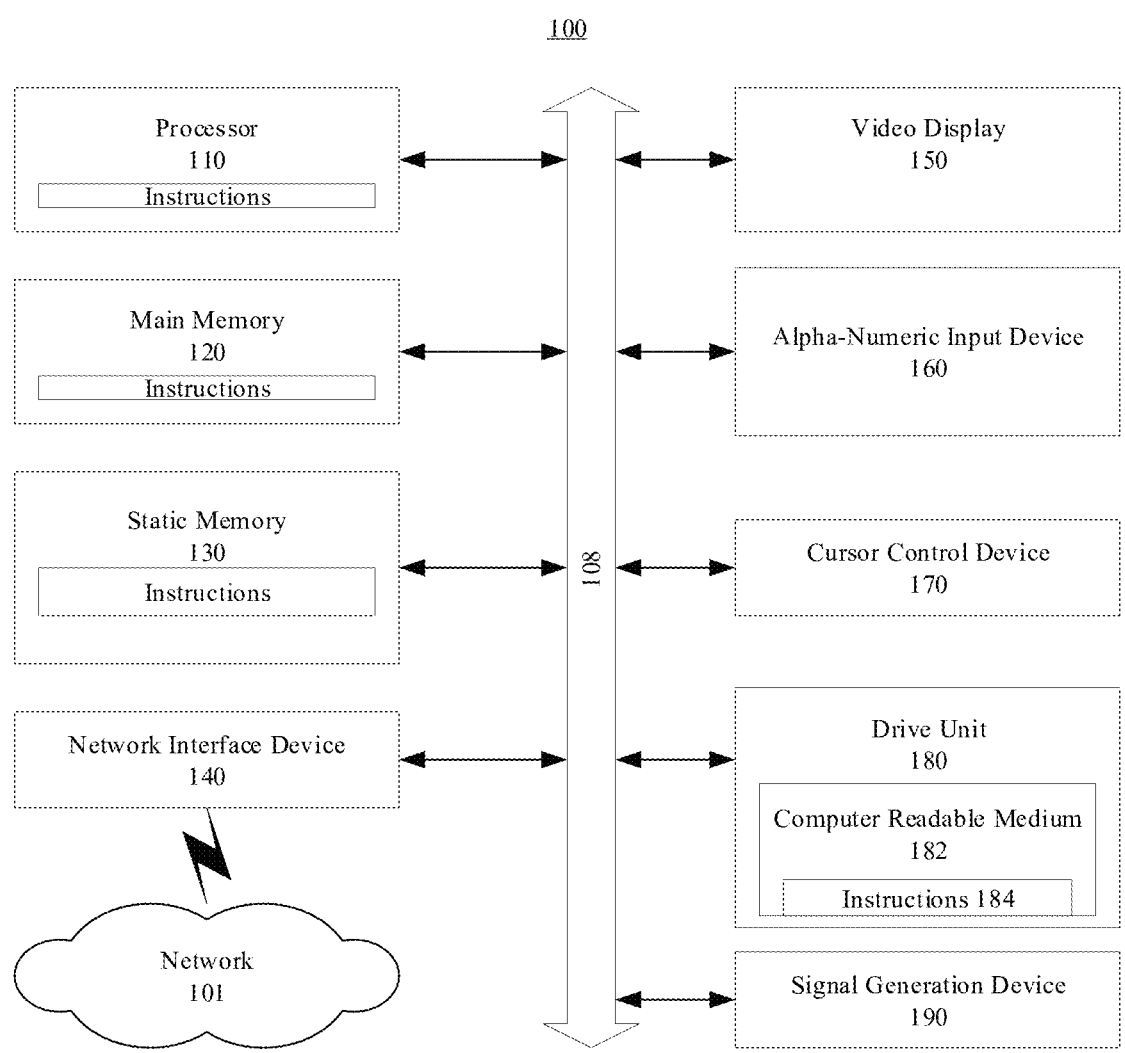
FIG. 1 illustrates an exemplary general computer system that includes a set of instructions for multi-level network-based access coordination.

FIG. 1 is an illustrative embodiment of a general computer system, on which a method of multi-level network-based access coordination can be implemented. The computer system 100 can include a set of instructions that can be executed to cause the computer system 100 to perform any one or more of the methods or computer-based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a server, a stationary computer, a mobile computer, a personal computer (PC), a laptop computer, a tablet computer, a wireless smart phone, a personal digital assistant (PDA), a communications device, or any other machine capable of executing a set of instructions (sequential or otherwise) that specify actions to be taken by that machine. The computer system 100 can be incorporated as or in a device that in turn is in an integrated system that includes additional devices. In an embodiment, the computer system 100 can be implemented using electronic devices that provide voice, video or data communication. Further, while the computer system 100 is illustrated in the singular, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. A processor is an article of manufacture and/or a machine component. A processor for a computer system 100 is configured to execute software instructions to perform functions as described in the various embodiments herein. A processor for a computer system 100 may be a general-purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions and are non-transitory during the time instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid-state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In an embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In an embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

The system that provides the multi-level network-based access coordination described herein may be referred to as the DineGigs system. The DineGigs system refers to a system that was originally developed to provide comprehensive employment services for workers in the restaurant industry. Workers in the restaurant industry often work unsteady schedules, sometimes for multiple employers simultaneously, so that even shift work may appear similar to a "gig" arrangement for a specified time typical of entertainers. The DineGigs system has evolved to become a comprehensive network-based support system for the restaurant industry as a whole, including establishments (restaurants), employees, managers and even customers. The DineGigs system provides a centralized hardware-based infrastructure to assist distributed entities. In the description below, the distributed entities are described in the context of owner/operator restaurants, but the descriptions provided herein may apply to establishments in other individual industries or group(s) of related industries. The DineGigs system provides for detailed services that managers and owners of the distributed entities face daily, and this reduces time spent by the managers and owners by providing scalable technology as a resource not previously available to distributed entities such as independent owner/operator restaurants. For the purposes of descriptions herein, references to managers may refer to individuals with supervisory responsibilities for an establishment and other individuals acting on behalf of the managers. Functionally, many aspects of the DineGigs system may be made available to a manager that are not made available to ordinary employees.

Figure 2:
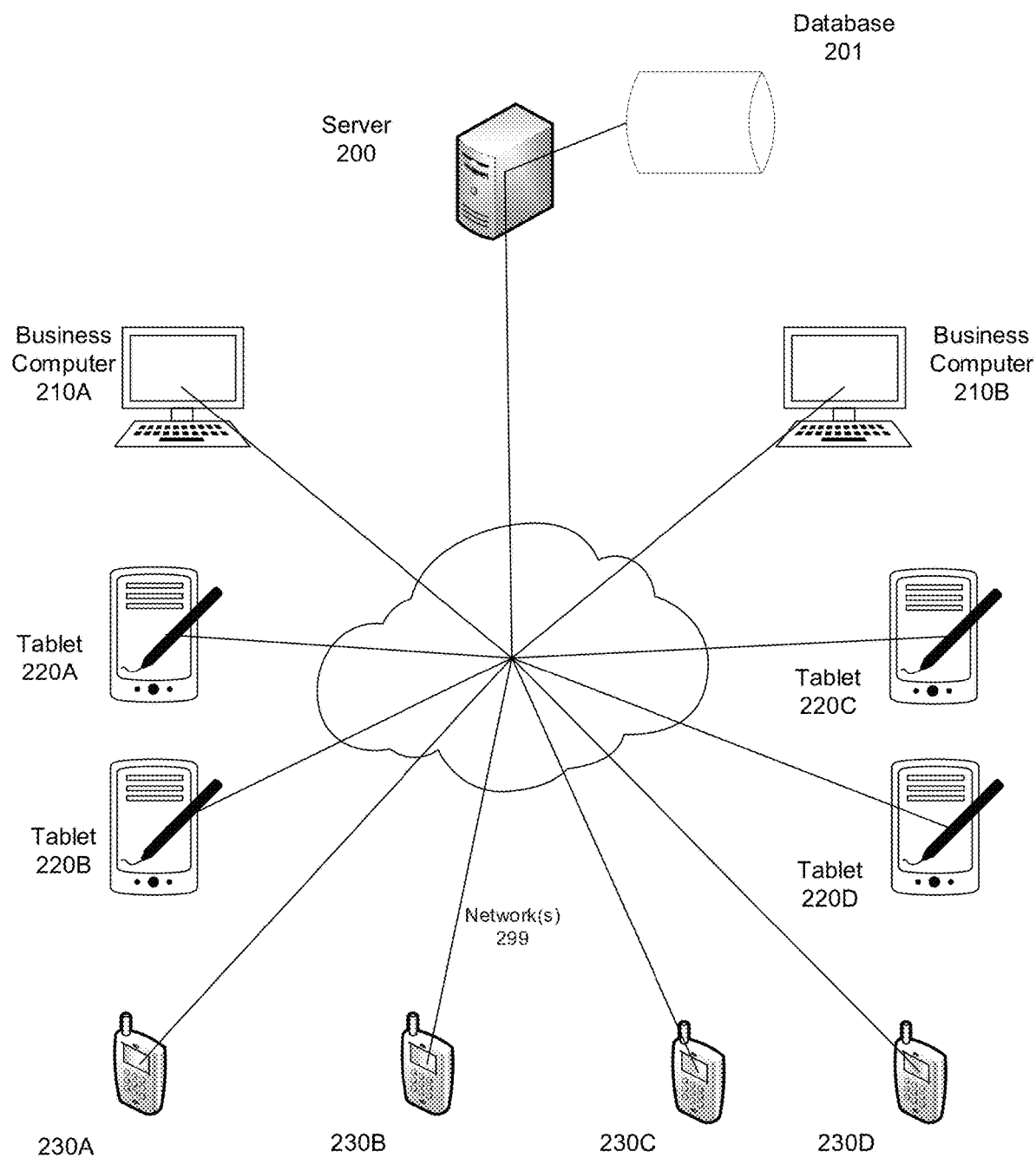
FIG. 2 illustrates a distributed system for multi-level network-based access coordination, according to an aspect of the present disclosure.

FIG. 2 illustrates a distributed system for multi-level network-based access coordination, per an aspect of the present disclosure. In FIG. 2, a server 200 is representative of an application server or another type of server. Moreover, the server 200 may be representative of multiple servers or other computers in a centralized system.

In FIG. 2, business computer 210A and business computer 210B are representative of a first class of computers on which a first class (type) of applications are installed. In the descriptions below, the business computers 210A, 210B are representative of computers used by independent, distributed entities such as completely different and unrelated owner/operator restaurants. Later in this disclosure, businesses such as restaurants may be referred to as "establishments". The business computers 210A, 210B may both access the internet, and have specific applications installed therein for use in the multi-level network-based access coordination. Generally, the first class of applications on business computers 210A, 210*b* may provide functionality useful specifically from the perspective of a business owner/operator rather than from the perspective of a business employee or customer.

In FIG. 2, smart phone 230A, smart phone 230B, smart phone 230C, and smart phone 230D are representative of mobile devices used by employees of independent businesses, such as the businesses that provide the business computers 210A, 210B. A second class (type) of applications is installed on the smart phones 230A, 230B, 230C, 230D. The smart phones 230A, 230B, 230C, 230D may both access the internet, and have specific applications installed therein for use in the multi-level network-based access coordination. Generally, the second class of applications on smart phones 230A, 230B, 230C, 230D may provide functionality useful specifically from the perspective of an individual such as an employee or potential employee (job/opportunity seeker) rather than the perspective of a business owner/operator or a customer.

In FIG. 2, tablet 220A, tablet 220B, tablet 220C, and tablet 220D are representative of mobile devices issued by a business owner/operator or a customer. A third class (type) of applications is installed on the tablets 220A, 220B, 220C,

220D. The tablets 220A, 220B, 220C, 220D may provide functionality useful specifically from the perspective of an agent rather than the perspective of a business owner/operator or a customer. For example, applications on the tablets 220A, 220B, 220C, 220D may be used to take orders from customers.

In embodiments herein, each of the first class of applications, the second class of applications, and the third set of applications may be provided from and as part of a DineGigs system, where functionality provided by the first class of applications, the second class of applications, and the third set of applications is coordinated and/or controlled to some degree by a centralized network-based system of one or more servers used with the applications to provide a coordinated and integrated set of services.

Figure 3:
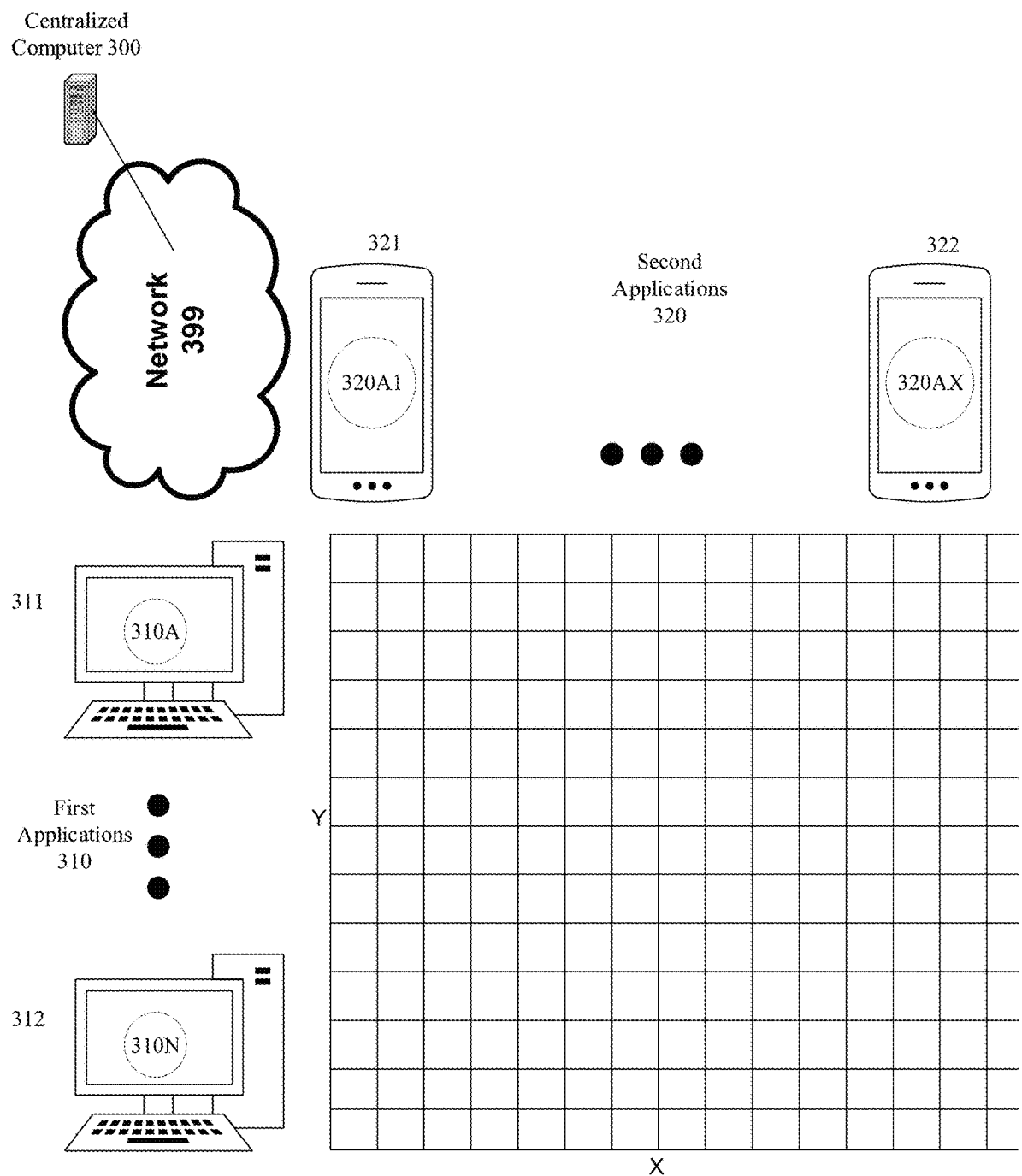
FIG. 3 illustrates a logical arrangement for coordinating access between entities with different applications, according to an aspect of the present disclosure.

FIG. 3 illustrates a logical arrangement for coordinating access between entities with different applications, according to an aspect of the present disclosure.

In FIG. 3, device 311 and device 312 carry first applications 310, and device 321 and device 322 carry second applications 320. The device 311, device 312, device 321 and device 322 may all be mobile devices that communicate with a centralized computer 300 over one or more networks 399. A grid in FIG. 3 shows a way of confirming access authorization between individual instances of first applications 310 and second applications 320.

Examples of either or both of device 311 and device 312 include a desktop or laptop computer. The device 311 and device 312 may be used on behalf of an entity such as a restaurant for management purposes that include access to the centralized computer 300. Examples of either or both of device 321 and device 322 include a smartphone or tablet computer. The device 321 and device 322 may be used on behalf of individuals such as job seekers, employees, customers for purposes ranging from seeking relationships with employers via the centralized computer 300, coordinating with employers via the centralized computer 300, or simply ordering food from a restaurant via the centralized computer 300.

The grid in FIG. 3 is used to confirm relationships between individual instances of the first applications 310 and the second applications 320. When, for example, a restaurant that uses device 311 confirms a relationship with an individual using device 321, the relationship can be confirmed by filling in a box on the grid to show the relationship. In an embodiment, multiple different types of relationships can be tracked using the logical arrangement in FIG. 3, such as applicant, employee, contractor, manager, owner, and so on. The confirmation of relationship or even type of relationship can be used to determine whether a user using device 321 can access content from device 311, and vise versa. The confirmation of relationship or even type of relationship can be used to determine whether a user using device 321 can communication with device 311, and vise versa.

The network 399 is representative of one or more wired and/or wireless networks. The network 399 may be or include a cellular network, a broadband wired network, a wireless local area network, and other types of networks that provide audio, visual and/or data communications between devices.

Figure 4:
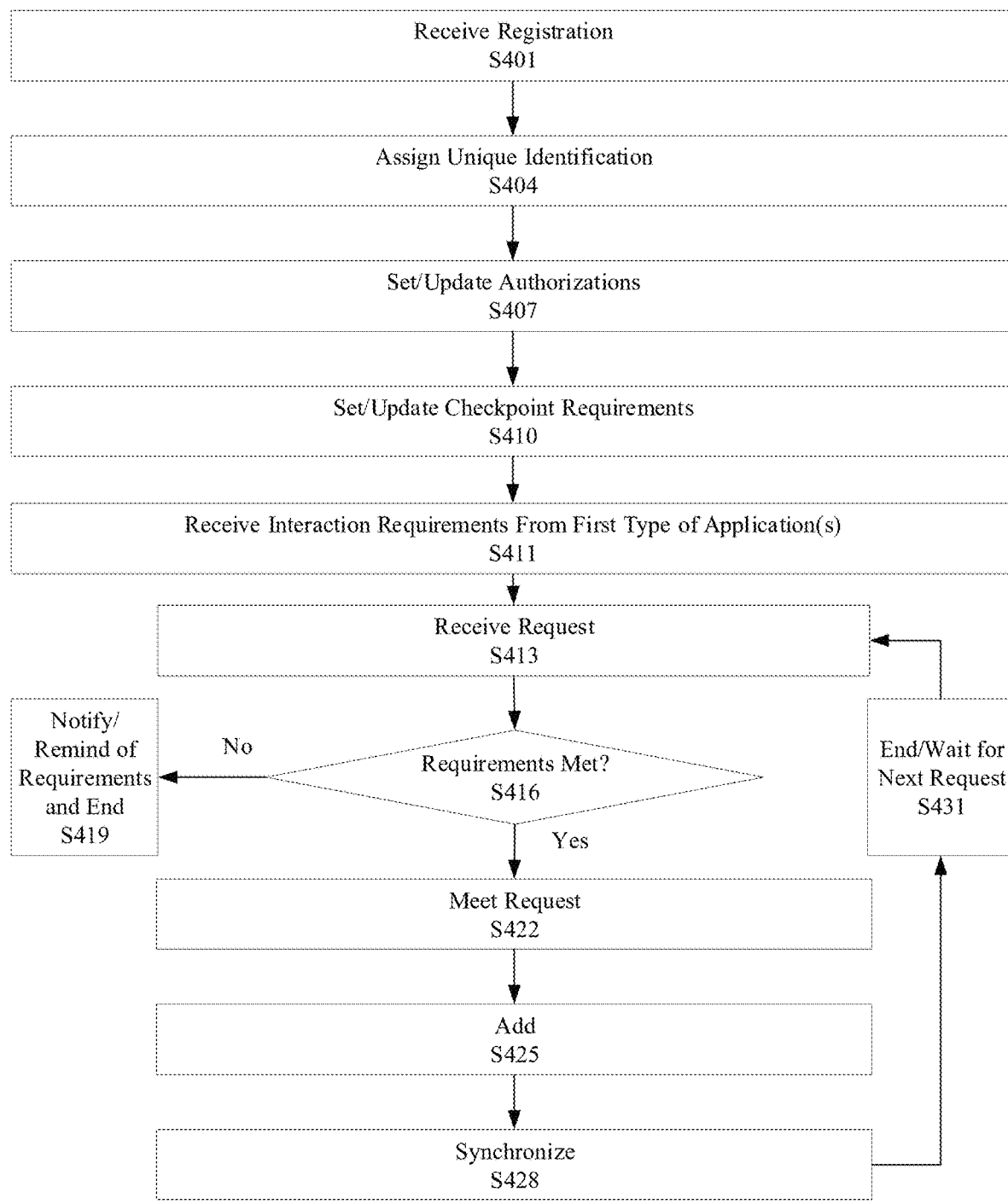
FIG. 4 illustrates a process for multi-level network-based access coordination, according to an aspect of the present disclosure.

FIG. 4 illustrates a process for multi-level network-based access coordination, according to an aspect of the present disclosure. The process in FIG. 4 is for a second application type. In FIG. 4, the process starts when a registration is received at S401. At S404, a unique identification is assigned. At S407, authorizations are set and/or updated. At S410, checkpoint requirements are set and/or updated. At S411, interaction requirements are received from a first type of application(s). At S413, a request is received. At S416, a determination is made whether requirements for the received request are met. At S419, if requirements for the received request are not met (S416=No), a notification is sent to remind of the requirements, and the process ends. At S422, if the requirements for the received request are met (S416=Yes), the request is met. At S425, the connection is added to the system so that the request can be met and so that the requester can interact with the requestee. At S428, the system is synchronized to reflect that the request is met. At S431, the process ends and waits for another request, and when the next request is made, the process returns to 413.

Figure 5:
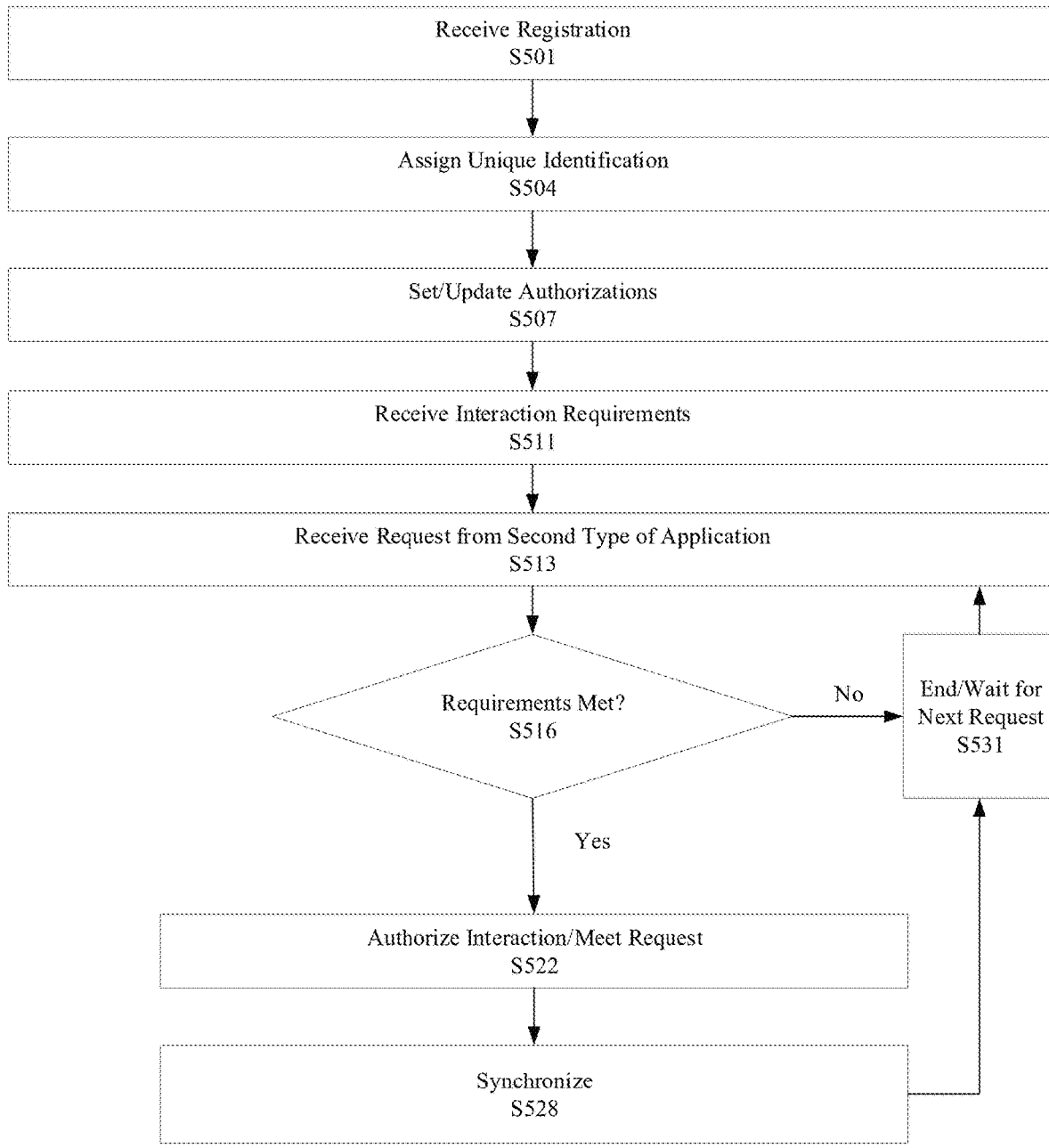
FIG. 5 illustrates another process for multi-level network-based access coordination, according to an aspect of the present disclosure.

FIG. 5 illustrates another process for multi-level network-based access coordination, according to an aspect of the present disclosure. The process in FIG. 5 is for a first application type. The process in FIG. 5 starts when a registration is received at S501. At S504, a unique identification is assigned. At S507, authorizations are set and/or updated. At S511, interaction requirements are received. At S513, a request is received from a second type of application for authorization to connect with and interact with a first type of application. At S516, a determination is made whether requirements are met. If requirements are not met (S516=No), the process ends at S531 and waits for another request at S513. If the requirements are met (S516=Yes), interaction is authorized, and the request is met at S522. At S518, the system synchronizes to reflect that interaction is authorized, and the process ends at S531 and waits for another request at S513.

Figure 6:
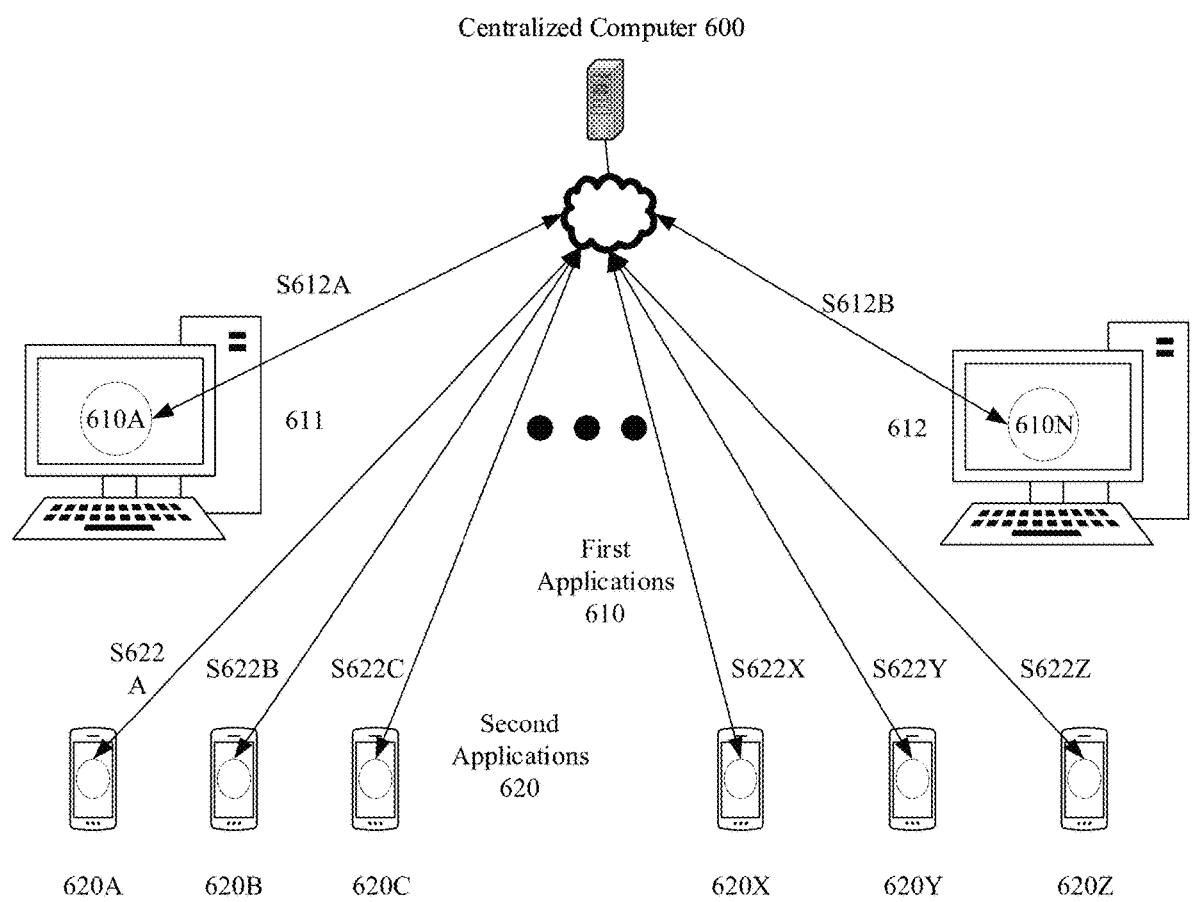
FIG. 6 illustrates a network arrangement for multi-level network-based access coordination, according to an aspect of the present disclosure.

FIG. 6 illustrates a network arrangement for multi-level network-based access coordination, according to an aspect of the present disclosure.

In FIG. 6, a centralized computer 600 communicates at S612A through network(s) with a computer 611 that stores a first application 610A. The centralized computer 600 also communicates at S612B through networks with a computer 612 that stores a first application 610N. The first application 610A and the first application 610N are representative of first applications that may be used by entities such as individual businesses. Each first application represented by the first application 610A and the first application N may be customized for the entity that uses the representative first application.

In FIG. 6, the centralized computer 600 communicates at S622A with a mobile device 620A that implements a second application 620. The centralized computer 600 communicates at S622B with a mobile device 620B that implements a second application 620. The centralized computer 600 communicates at S622C with a mobile device 620C that implements a second application 620. The centralized computer 600 communicates at S622X with a mobile device 620X that implements a second application 620. The centralized computer 600 communicates at S622Y with a mobile device 620Y that implements a second application 620. The centralized computer 600 communicates at S622Z with a mobile device 620Y that implements a second application 620. The mobile devices 620A, 620B, 620C, 620X, 620Y and 620X are representative of mobile devices that may be used by entities such as individuals who wish to connect with and interact with the entities using the first applications represented by the first application 610A and the first application 610N. Each second application 620 may be the same, substantially the same with minor differences, or may be customized for each entity that uses the mobile devices 620A, 620B, 620C, 620X, 620Y and 620X.

Figure 7:
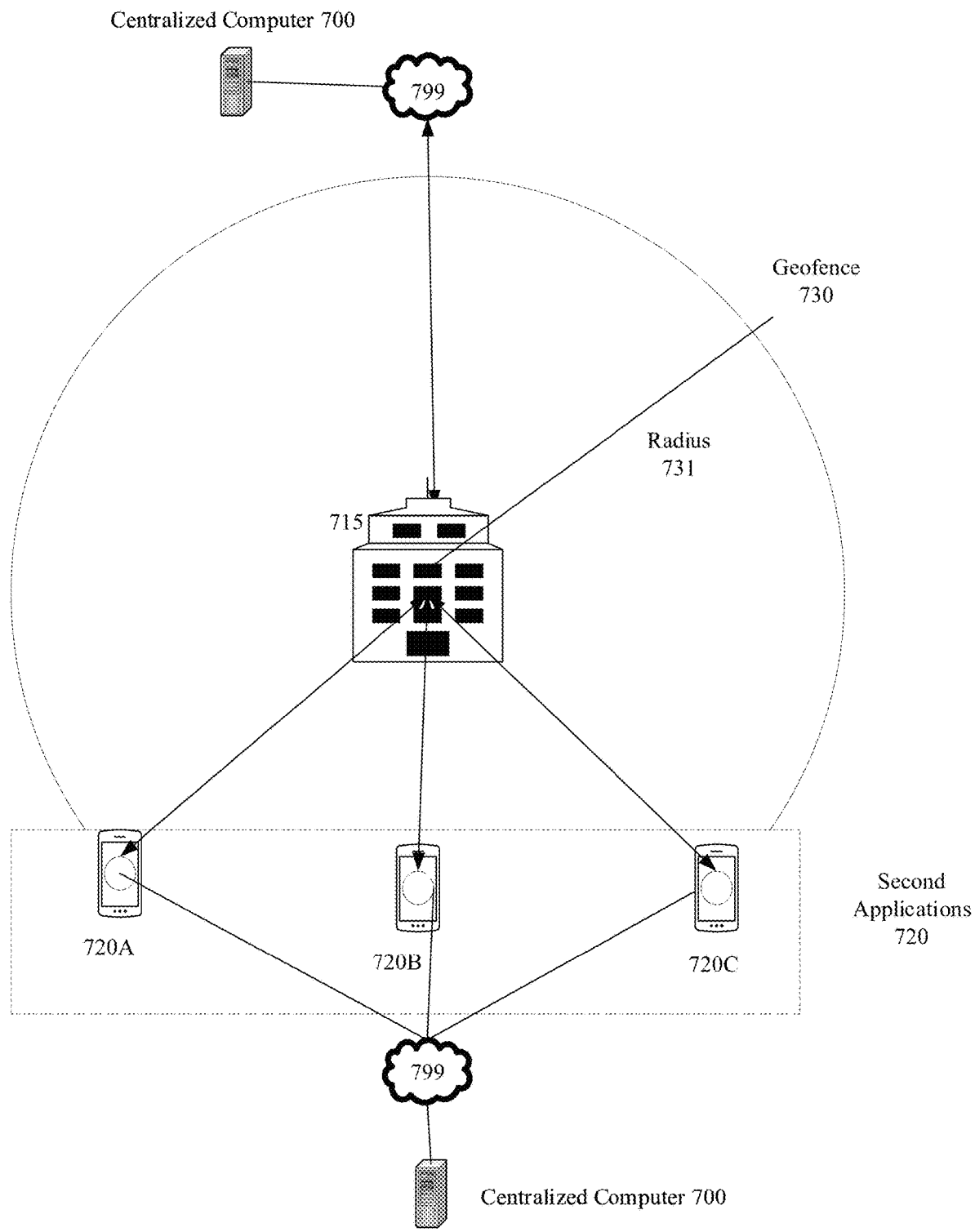
FIG. 7 illustrates a layout for geofencing using multi-level network-based access coordination, according to an aspect of the present disclosure.

FIG. 7 illustrates a layout for geofencing using multi-level network-based access coordination, according to an aspect of the present disclosure.

In FIG. 7, a centralized computer 700 communicates via networks 799 with a system or multiple communications devices or an individual device at entity 715. The entity 715 is shown as a building to represent a business such as a restaurant. An individual unlabeled communications device at the entity 715 may be used as the center of a geofence 730 with a radius 731. Mobile devices 720A, 720B, 720C may register with the individual unlabeled communications device, and may each have second applications 720 installed thereon. Therefore, the mobile devices 720A, 720B, 720C can be tracked geographically, such as when an individual is at work at the entity 715 and should be on premises. The geographical tracking may be performed using global positioning satellites (GPS), estimates of signal strength from the mobile devices 720A, 720B, 720C, or any other method that can reliably estimate locations of mobile device 720A, 720B, 720C.

As an example, the mobile devices 720A, 720B, 720C may be communications devices provided by the entity 715 to employees and may be activated once the employees check in for work. The mobile devices 720A, 720B, 720C may be mobile phones, tablets or other portable user devices, but may also simply be electronic key cards that transmit and/or receive signals.

As another example, the mobile devices 720A, 720B, 720C may be personal communications devices that belong to employees. Second applications 720 installed on mobile devices 720A, 720B, 720C may be used to coordinate hours and wages for the employees, so that the location tracking is directly relevant or even necessary for accurate accounting of hours. Therefore, the location tracking may be selectively activated, such as when the employee clocks-in at the entity 715, and then selectively deactivated, such as when the employee's scheduled shifts is over and the employee exits the premises of the entity 715. Thus, deactivation of the location tracking may be the default setting, and location tracking may only be activated when the employees carrying the mobile devices 720A, 720B, 720C are both scheduled to be at work and are actually clocked in at work. The centralized computer 700 may coordinate the selective activation of location tracking, such as by receiving notification from a keycard reader that an employee has clocked-in at the entity 715 and then confirming that the employee is scheduled to work at the entity 715.

Figure 8:
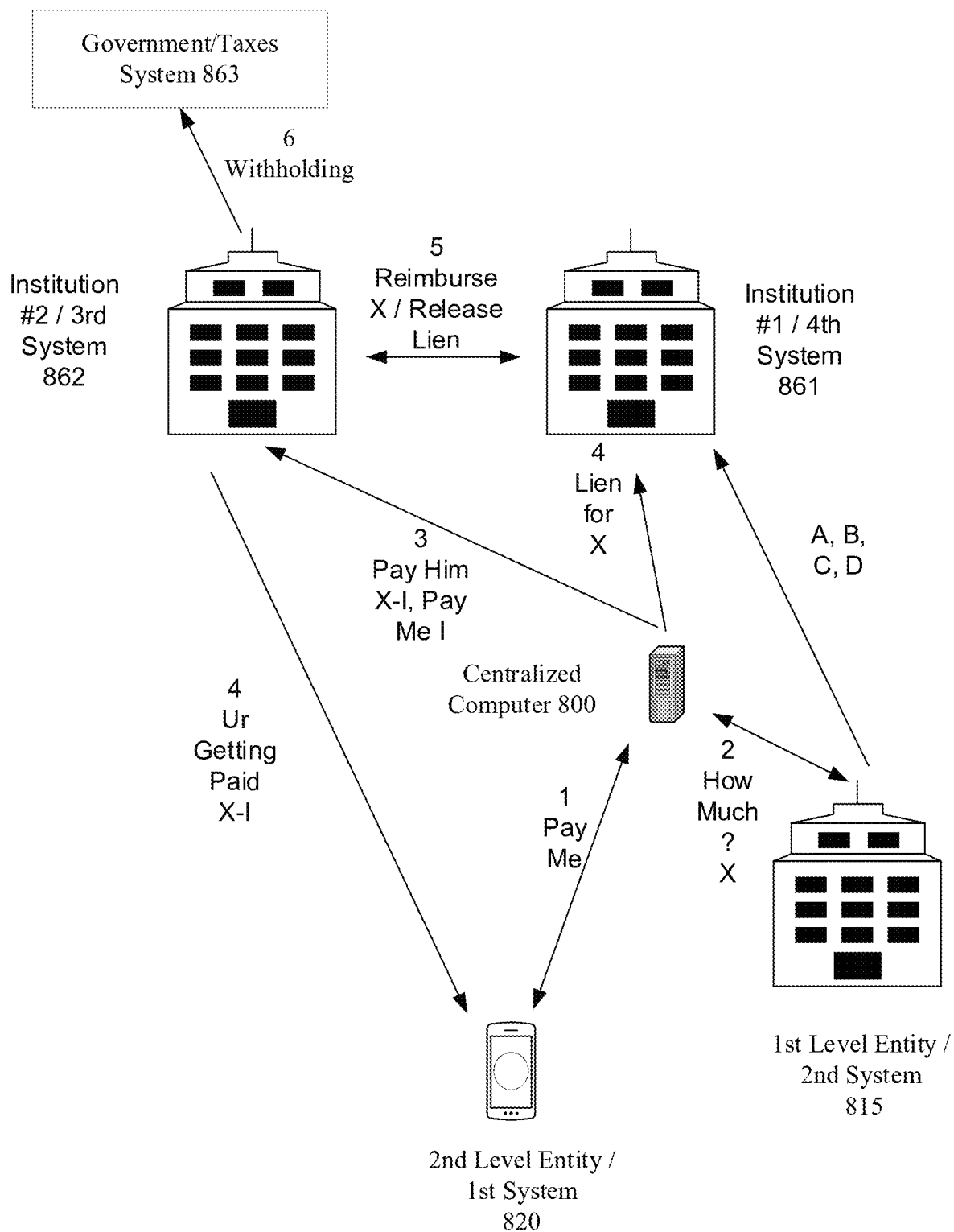
FIG. 8 illustrates a hybrid network and communication flow for multi-level network-based access coordination, according to an aspect of the present disclosure.

FIG. 8 illustrates a hybrid network and communication flow for multi-level network-based access coordination, according to an aspect of the present disclosure.

In FIG. 8, at least four separate systems are present. A first system is used by a second level entity 820. A second system is used by a first level entity 815. A third system is used by an external institution #2 862. A fourth system is used by an external institution #1 861.

In FIG. 8, a centralized computer 800 is used to coordinate all of the actions shown, so that all actions shown in FIG. 8 are performed based on instructions or authorizations from the centralized computer 800. The centralized computer 800 may be representative of a system with multiple coordinated computers used by a single entity as described herein, to implement multi-level network-based access coordination.

In FIG. 8, a step 1 may involve the second level entity 820 sending an instruction to the centralized computer 800. The centralized computer 800 may confirm the instruction at step 2 with the first level entity 815. An example of the step 1 may be the second level entity 820 requesting payment for work performed, and an example of the step 2 may be the centralized computer 800 requesting confirmation of the work being performed from the first level entity 815. Upon confirmation of information from the first level entity 815, the centralized computer 800 may send an instruction to the institution #2 862 as step 3, and another instruction to the institution #1 861 as step 4. The instruction to the institution #2 862 may be an instruction to initiate payment to the second level entity 820. The instruction to the institution #1 861 may be a lien on receivables of the first level entity 815.

At step 5 the institution #2 862 may send a request to the institution #1 861. At step #6 the institution #2 may send information to a system 863 used by the government for taxes. When institution #1 861 reimburses the institution #2 862, the institution #2 862 releases the lien originally imposed by the centralized computer 800 at step 4.

In FIG. 8, the A, B, C, D label is representative of credit card transactions initiated at the first level entity 815. The credit card transactions are receivables due to the first level entity 815, and are used as collateral by the institution #2 862 to pay the second level entity 820. Accordingly, the system that includes the centralized computer 800 can be used to coordinate payments for the second level entity 820 based on, for example, hours worked by the second level entity 820.

In an embodiment, since the centralized computer 800 coordinates a first application on the first system used by the second level entity 820 and a second application on the second system used by the first level entity 815, the centralized computer 800 may not need to affirmatively check or confirm anything from the first level entity 815. Rather, the centralized computer 800 may be used to coordinate employment and attendance records for employees of the first level entity 815, and may therefore already have, or have access to, records such as hours worked or gross income owed to the second level entity 820. In this way, the second level entity 820 requests an individual payment from the centralized computer 800, the centralized computer 800 may be able to automatically initiate the payment without individually checking anything with the first level entity 815.

Figure 9:
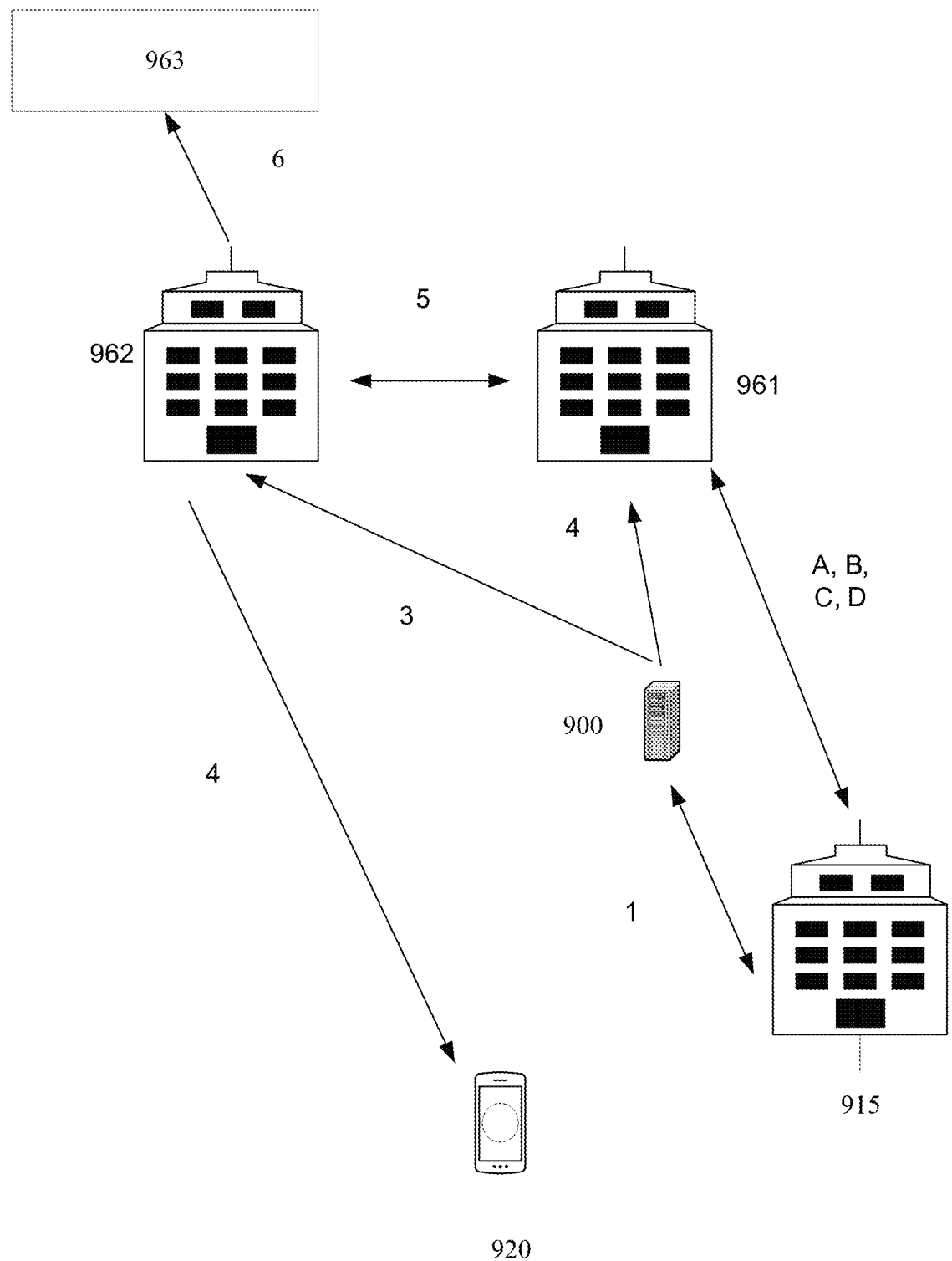
FIG. 9 illustrates another hybrid network and communication flow for multi-level network-based access coordination, according to an aspect of the present disclosure.

FIG. 9 illustrates another hybrid network and communication flow for multi-level network-based access coordination, according to an aspect of the present disclosure.

In FIG. 9, at least four separate systems are present. A first system is used by a second level entity 920. A second system is used by a first level entity 915. A third system is used by an external institution #2 962. A fourth system is used by an external institution #1 961.

In FIG. 9, a centralized computer 900 is used to coordinate all of the actions shown, so that all actions shown in FIG. 9 are performed based on instructions or authorizations from the centralized computer 900. The centralized computer 900 may be representative of a system with multiple coordinated computers used by a single entity as described herein, to implement multi-level network-based access coordination.

In FIG. 9, a step 1 may involve the centralized computer 900 interacting with the first level entity 915, such as based on pre-authorized instructions to both from the second level entity 920. An example of the step 1 may be the first level entity 915 simply sending a report and authorization reflecting how much time the second level entity 920 spent at work on the clock for a period (e.g., a day). Upon confirmation of information from the first level entity 915, the centralized computer 900 may send an instruction to the institution #2

962 as step 3, and another instruction to the institution #1 961 as step 4. The instruction to the institution #2 may be an instruction to initiate payment to the second level entity 920. The instruction to the institution #1 961 may be a lien on receivables of the first level entity 915.

At step 5 the institution #2 962 may send a request to the institution #1 961. At step #6 the institution #2 962 may send information to a system 963 used by the government for taxes. When institution #1 961 reimburses the system #2 962, the system #2 962 releases the lien originally imposed by the centralized computer 900 at step 4.

Details of the A, B, C, D label, receivables and collateral for FIG. 9 may be the same as for FIG. 8. Accordingly, the system that includes the centralized computer 900 can be used to coordinate payments for the second level entity 920 based on, for example, hours worked by the second level entity 920.

In an embodiment, since the centralized computer 900 coordinates a first application on the first system used by the second level entity 920 and a second application on the second system used by the first level entity 915, the centralized computer 900 may not need to affirmatively check or confirm anything from the first level entity 915. Rather, the centralized computer 900 may be used to coordinate employment and attendance records for employees of the first level entity 915, and may therefore already have, or have access to, records such as hours worked or gross income owed to the second level entity 920. In this way, the second level entity 920 provides preauthorization to the centralized computer 900, and the centralized computer 900 may be able to automatically initiate the payment without individually checking anything with the first level entity 915.

Figure 10:
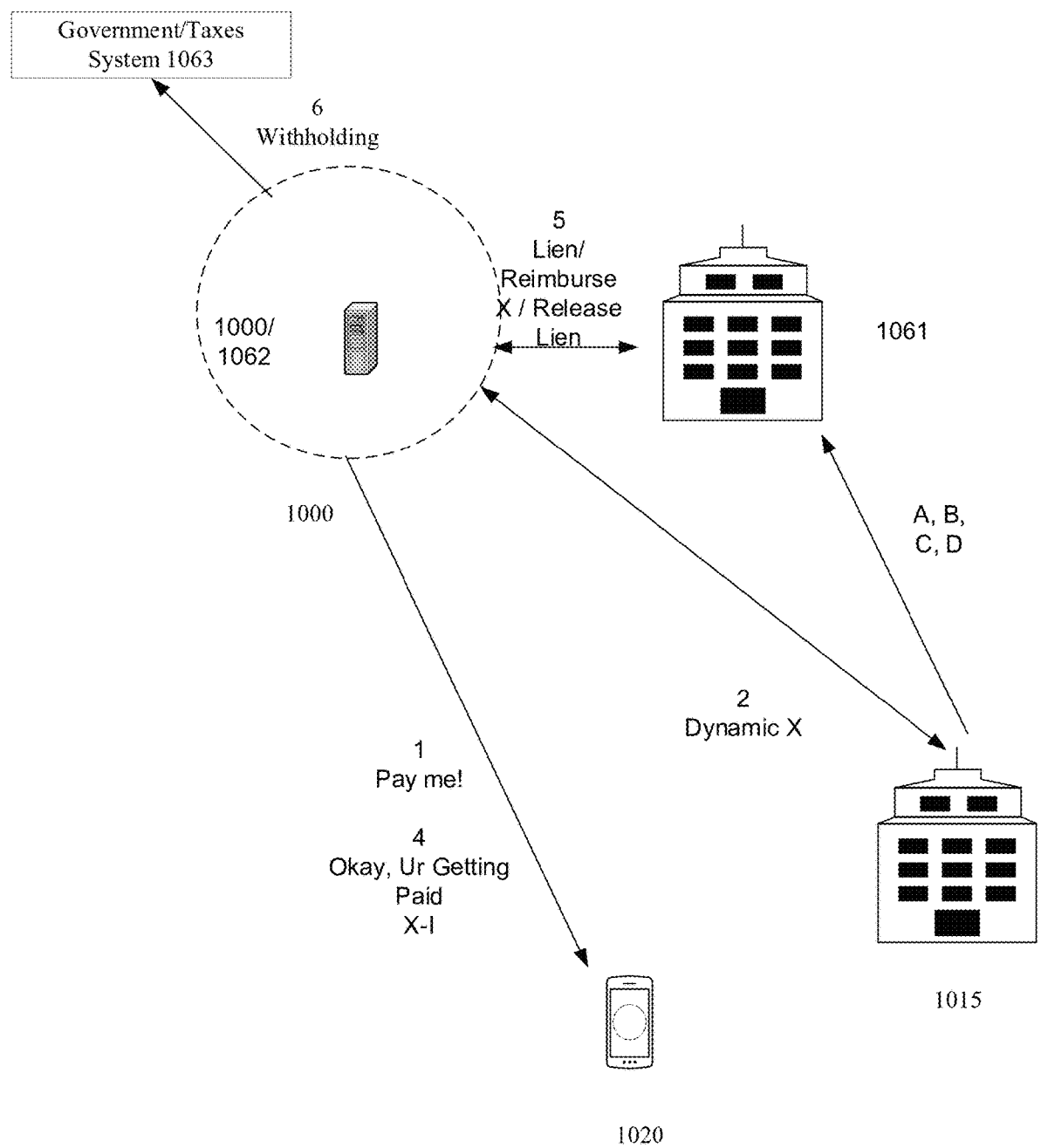
FIG. 10 illustrates another hybrid network and communication flow for multi-level network-based access coordination, according to an aspect of the present disclosure.

FIG. 10 illustrates another hybrid network and communication flow for multi-level network-based access coordination, according to an aspect of the present disclosure.

In FIG. 10, at least four separate systems are present. A first system is used by a second level entity 1020. A second system is used by a first level entity 1015. A third system is used by an external institution #2 1062. A fourth system is used by an external institution #1 1061.

In FIG. 10, a centralized computer 1000 is part of a system that includes the institution #2 1062, so that the combined system coordinates all of the actions shown, so that all actions shown in FIG. 10 are performed based on instructions or authorizations from the combined centralized computer 1000 and institution #2 1062. The centralized computer 1000 and institution #2 1072 may be representative of a system with multiple coordinated computers used by a single entity as described herein, to implement multi-level network-based access coordination.

In FIG. 10, a step 1 may involve the centralized computer 1000 receiving an instruction from the second level entity 1020. A step 2 may be the centralized computer 1000 interacting with the first level entity 1015, to determine how much to pay the second level entity 1020. An example of the step 2 may be the first level entity 1015 simply sending a report and authorization reflecting how much time the second level entity 1020 spent at work on the clock for a period (e.g., a day). Upon confirmation of information from the first level entity 1015, the centralized computer 1000 arranges the payment with the institution #2 1062, and confirmation of payment is sent as step 4 to the second level entity 1020.

In FIG. 10, step 5 denotes interaction that includes a lien on receivables being sent to institution #1 1061, reimbursement from institution #1 1061 to the institution #2 1062, and a release of the lien by the institution #2 1062. At step #6 the institution #2 1062 may send information to a system 1063 used by the government for taxes.

Details of the A, B, C, D label, receivables and collateral for FIG. 10 may be the same as for FIG. 8. Accordingly, the system that includes the centralized computer 1000 can be used to coordinate payments for the second level entity 1020 based on, for example, hours worked by the second level entity 1020.

In an embodiment, since the centralized computer 1000 coordinates a first application on the first system used by the second level entity 1020 and a second application on the second system used by the first level entity 1015, the centralized computer 1000 may not need to affirmatively check or confirm anything from the first level entity 1015. Rather, the centralized computer 1000 may be used to coordinate employment and attendance records for employees of the first level entity 1015, and may therefore already have, or have access to, records such as hours worked or gross income owed to the second level entity 1020. In this way, the second level entity 1020 provides authorization or preauthorization to the centralized computer 1000, and the centralized computer 1000 may be able to selectively or automatically initiate the payment.

Figure 11:
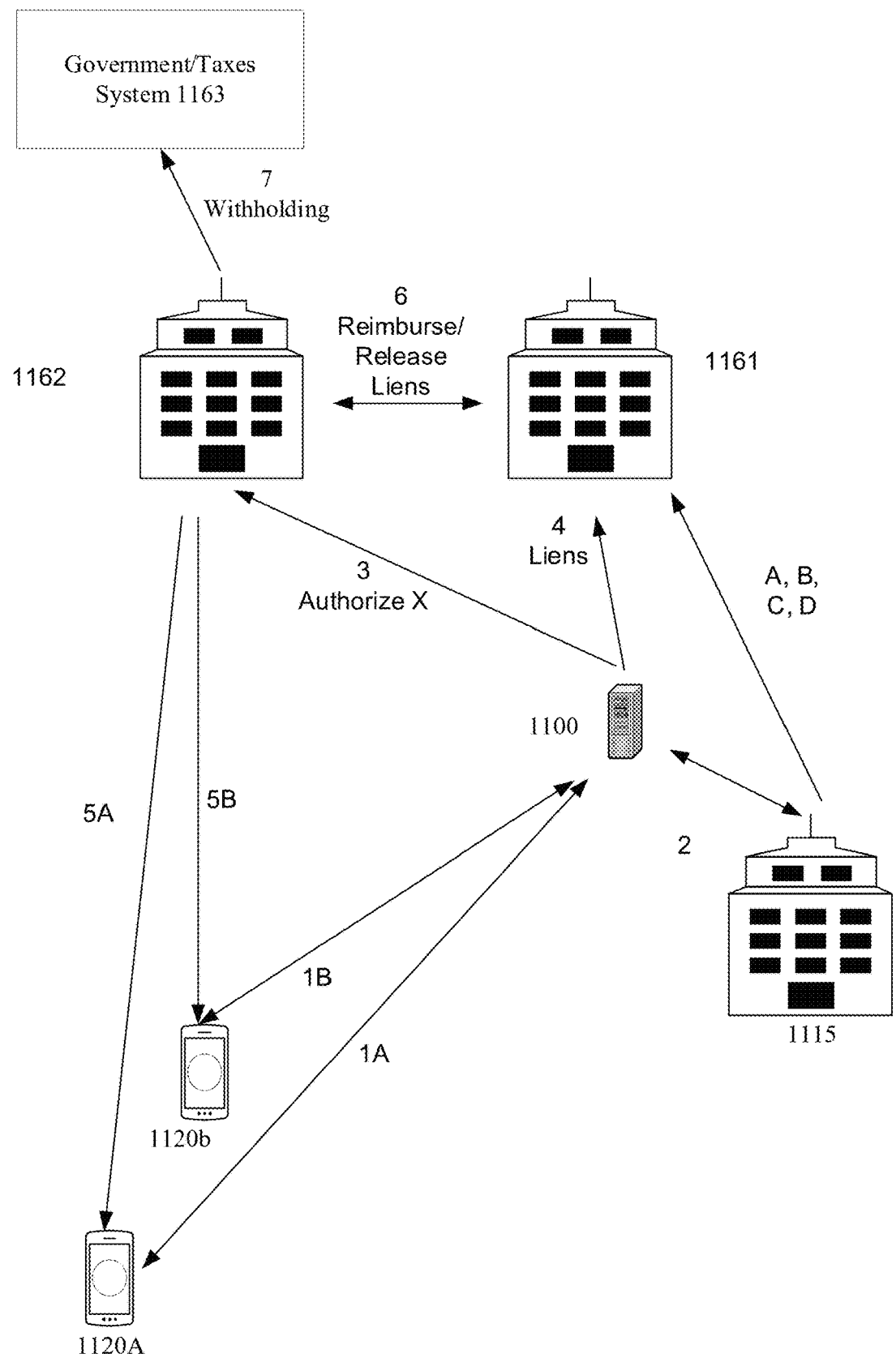
FIG. 11 illustrates another hybrid network and communication flow for multi-level network-based access coordination, according to an aspect of the present disclosure.

FIG. 11 illustrates another hybrid network and communication flow for multi-level network-based access coordination, according to an aspect of the present disclosure.

In FIG. 11, at least five separate systems are present. Two first systems are used by two second level entities 1120. A second system is used by a first level entity 1115. A third system is used by an external institution #2 1162. A fourth system is used by an external institution #1 1161.

In FIG. 11, a centralized computer 1100 is used to coordinate all of the actions shown, so that all actions shown in FIG. 11 are performed based on instructions or authorizations from the centralized computer 1100. The centralized computer 1100 may be representative of a system with multiple coordinated computers used by a single entity as described herein, to implement multi-level network-based access coordination.

In FIG. 11, a step 1A may involve the second level entity 1120A sending an instruction to the centralized computer 1100. A step 1B may involve the second level entity 1120B sending an instruction to the centralized computer 1100. The centralized computer 1100 may confirm the instruction1 at step 2 with the first level entity 1115. Examples of the step 1A and 1B may be the second level entity 1120A and the second level entity 1120B requesting payment for work performed, and an example of the step 2 may be the centralized computer 1100 requesting confirmation of the work being performed from the first level entity 1115. Upon confirmation of information from the first level entity 1115, the centralized computer 1100 may send an instruction to the institution #2 1162 as step 3. The remaining steps 4, 5 and 6 may be the same as in any of the embodiments in FIGS. 8, 9 and/or 10.

In an embodiment, since the centralized computer 1100 coordinates first applications on the first systems used by the second level entity 1120A and the second level entity 1120B and a second application on the second system used by the first level entity 1115, the centralized computer 1100 may not need to affirmatively check or confirm anything from the first level entity 1115. Rather, the centralized computer 1100 may be used to coordinate employment and attendance records for employees of the first level entity 1115, and may therefore already have, or have access to, records such as hours worked by employees or gross income owed to the second level entity 1120A and the second level entity 1120B. In this way, the second level entity 1120A and the second level entity 1120B request an individual payment from the centralized computer 1100, the centralized computer 1100 may be able to automatically initiate the payment without individually checking anything with the first level entity 1115.

Figure 12:
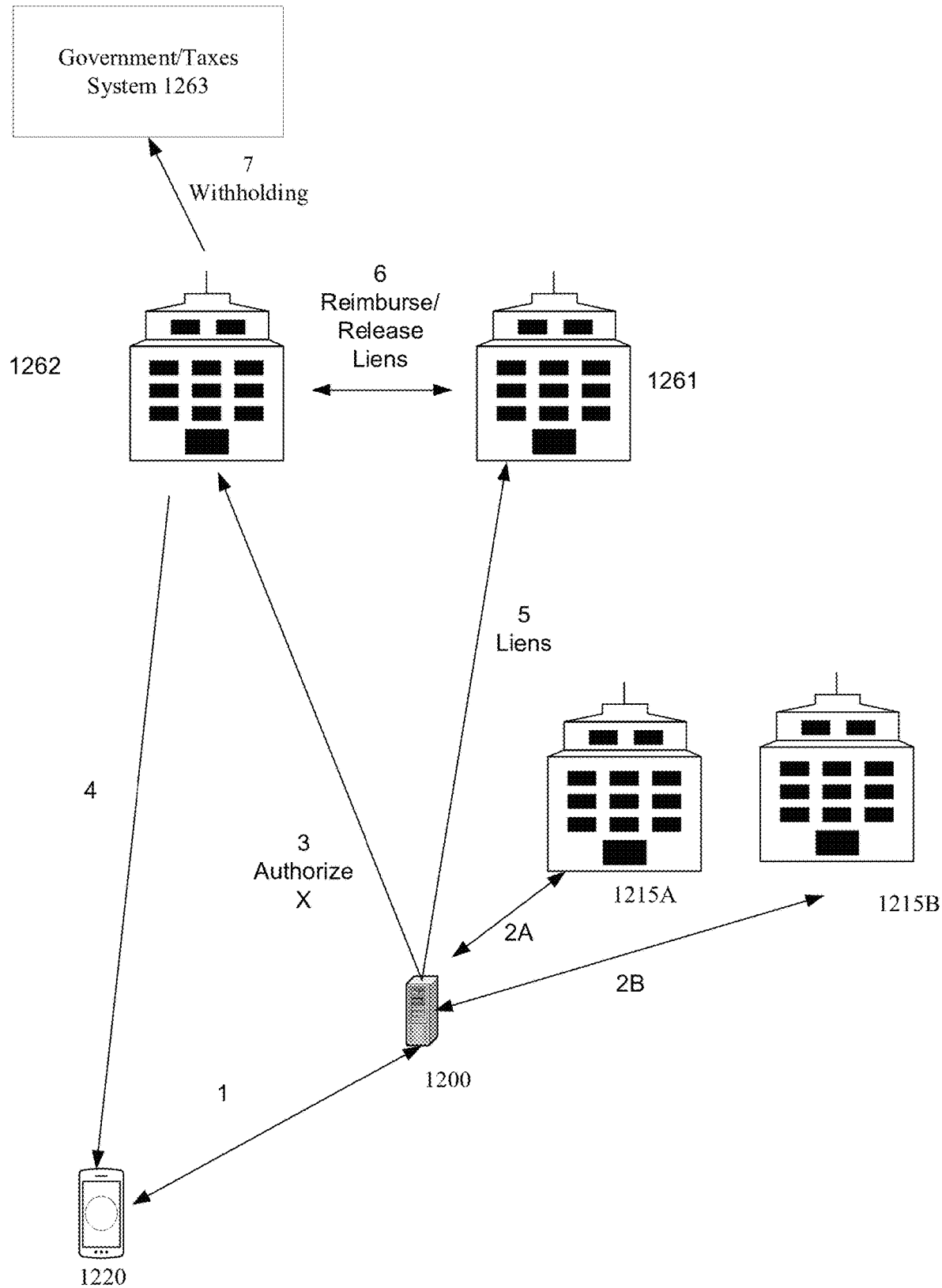
FIG. 12 illustrates another hybrid network and communication flow for multi-level network-based access coordination, according to an aspect of the present disclosure.

FIG. 12 illustrates another hybrid network and communication flow for multi-level network-based access coordination, according to an aspect of the present disclosure.

In FIG. 12, at least five separate systems are present. A first system is used by a second level entity 1220. Two second systems are used by first level entities 1215A and 1215B. A third system is used by an external institution #2 1262. A fourth system is used by an external institution #1 1261.

In FIG. 12, a centralized computer 1200 is used to coordinate all of the actions shown, so that all actions shown in FIG. 12 are performed based on instructions or authorizations from the centralized computer 1200. The centralized computer 1200 may be representative of a system with multiple coordinated computers used by a single entity as described herein, to implement multi-level network-based access coordination.

In FIG. 12, a step 1 may involve the second level entity 1120 sending an instruction to the centralized computer 1200. The centralized computer 1200 may confirm the instruction at step 2A with the first level entity 1215A and at step 2B with the first level entity 1215B. An example of the step 1 may be the second level entity 1220 requesting payment for work performed, and an example of the step 2A and the step 2B may be the centralized computer 1200 requesting confirmation of the work being performed from the first level entity 1215A and from the first level entity 1215B. Upon confirmation of information from the first level entity 1215A, the centralized computer 1200 may send an instruction to the institution #2 1262 as step 3, and another instruction to the institution #1 1261 as step 4. The instruction to the institution #2 1262 may be an instruction to initiate payment to the second level entity 1220. The instruction to the institution #1 1261 may be two liens on receivables of the first level entity 1215A and the first level entity 1215B.

The remainder of S6 and S7 correspond to features described previously with respect to the embodiments of FIGS. 8, 9, 10 and 11, and are not repeated herein for brevity.

In an embodiment, since the centralized computer 1200 coordinates a first application on the first system used by the second level entity 1220 and two second applications on the second systems used by the first level entity 1215A and by the first level entity 1215B, the centralized computer 1200 may not need to affirmatively check or confirm anything from the first level entity 1215A or from the first level entity 1215B. Rather, the centralized computer 1200 may be used to coordinate employment and attendance records for employees of the first level entity 1215A and of the first level entity 1215B, even when a single employee works for both. Therefore, the centralized computer 1200 may already have, or have access to, records such as hours worked or gross income owed to the second level entity 1220. In this way, the second level entity 1220 requests an individual payment from the centralized computer 1200, the centralized computer 1200 may be able to automatically initiate the payment without individually checking anything with the first level entity 1215A or the first level entity 1215B.

The description as follows describes functionality for the DineGigs system in terms of modules. The DineGigs system is implemented in a manner that establishments and individuals may all have downloaded DineGigs applications installed on devices, and different levels of access are provided via to different establishments and individuals. An ecosystem that includes the establishments and individuals is centrally coordinated and implemented using one or more application servers of the DineGigs system. The various functional modules provide the full range of online resources that can be used to assist establishments and individuals associated with or wishing to be associated with the establishments.

From the viewpoint of an individual, the DineGigs system simplifies many aspects of employment, from human resources forms to payment arrangements, and the functionality provided by the DineGigs system can be provided across establishments. As a result, an individual changing employment or working different gigs in the same timeframe at multiple establishments can obtain coordinated benefits that, for example, avoid redundancies otherwise required. Similarly, functionality described herein can be used to enable a transaction system in which individuals and establishments transact via the DineGigs system without having to synchronize or individually engage with financial institutions for each different gig.

In the following description, different functional modules of the applications provided to establishments and individuals are described one at a time. From the view of an individual first encountering the DineGigs system, the individual initially downloads and installs the DineGigs application on a device and may be presented with a Welcome page that asks the individual to sign in or sign up. When the individual elects to sign up, a new account is created via a Profile Setup page. The initial starting point for the individual once logged in to an existing account is pages of a functional module referred to herein still as DineGigs. The DineGigs module is used to present employment opportunities (gigs) to individuals when the individuals first log in to the DineGigs application.

Additionally, modules of the DineGigs system described below may be implemented centrally on a server system that provides services for numerous distributed establishments that are unrelated to each other. DineGigs applications downloaded to user devices may also include aspects of the modules of the DineGigs system and may be customized for different establishments and different individual users for each establishment. Furthermore, functionality of computer systems at or dedicated to a particular establishment may also be integrated with the modules of the DineGigs system implemented on the server system and with DineGigs applications on individual user devices. Thus, functionality described herein may be implemented on individual user devices (with DineGigs applications) where selections are made and information is displayed, on the DineGigs server system, and/or on dedicated establishment computer systems with DineGigs applications installed thereon.

As described herein, user interfaces of DineGigs applications provide different functionality for different modules of the DineGigs system. Selections made by individual users such as employees and managers may be detected and recognized by touch-screen functionality or similar functionality on the individual user devices. Detected selections however may result in signals being sent to the DineGigs server system to result in the functionality described herein. Thus, where selections by a user are described, it will be understood that the DineGigs applications and DineGigs server system implement actions responsive to the selections in order to provide the many features of the DineGigs system described herein.

As a final note before describing the modules of the DineGigs system, the DineGigs system refers typically to the DineGigs server system, and the DineGigs system may be implemented partly or fully in the cloud at data centers. On the other hand, as much as possible the teachings herein that refer to applications and the DineGigs applications refer to DineGigs applications installed on individual user devices. The DineGigs application may not be a monolithic application installed equally on all individual user devices; rather, different modules of the DineGigs application may be installed on individual user devices for different users. The differences may account for selections by the individual users, but also permissions for the individual users accorded by managers of the establishments that employ the individual users, as well as characteristics of the individual user devices used by the individual users and other technical aspects that may govern the ability to install modules of the DineGigs system on any particular individual user device.

DineGigs Module—001

The DineGigs module helps establishments with employment opportunities find job seekers and vice versa. The DineGigs module is provided via the DineGigs system and the DineGigs application and implements and coordinates an online opportunity board by which job seekers can seek employment opportunities, and by which establishments can post employment opportunities. Employers and job seekers meet via the opportunity board and may selectively interact via the DineGigs system. Whereas the overall multi-level network-based access coordination system described herein may be referred to as DineGigs or the DineGigs System, the DineGigs module and the DineGigs user interface may refer to a specific subset of functionality offered within the overall DineGigs system.

Figure 39:
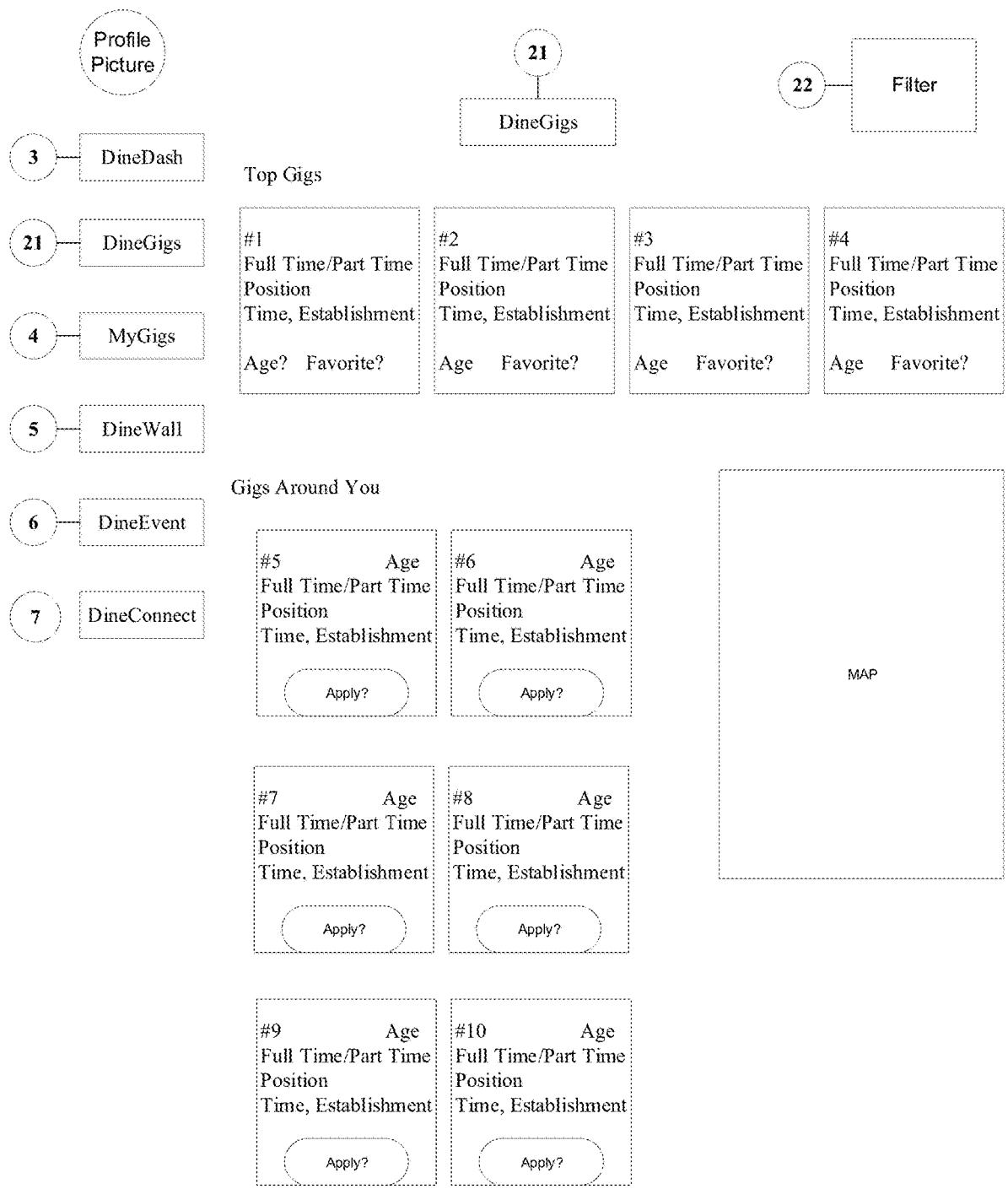
FIG. 39 illustrates an exemplary DineGigs user interface of an application for multi-level network-based access coordination.

FIG. 39 illustrates an exemplary DineGigs user interface of an application for multi-level network-based access coordination. In FIG. 39, a profile picture of the job seeker is shown on the upper left, and selectable links to related modules are provided on the left side. The related modules selectably linked on the left side of FIG. 39 include Dine-Dash, MyGigs, DineWall, DineEvent and DineConnect.

The DineGigs user interfaces may allow job seekers to view and interact with the opportunity board, apply for an employment opportunity by submitting a DineWall profile and/or a resume and cover letter. DineGigs users who wish to freelance (on a 1099 basis) and accept work on demand may submit recording of themselves, either from their DineWall profile or from a DineGigs or other storage, when applying for an employment opportunity. Freelance Dine-Gigs users may determine or negotiate pay rate as part of accepting work via the DineGigs module. Such freelance DineGigs users may be entertainment providers such as disk jockeys, bands or other service providers to restaurants, rather than typical foodservice workers. As a result, Dine-Gigs users can use the DineGigs user interface to find and accept work even on a "gig" basis such as on contract or event basis. The DineGigs user interfaces may allow establishments to post solicitations for potential employees with specified skill set(s), and to receive responses from qualified DineGigs users who are allowed to apply based on the DineGigs system confirming a match with the specified skill set(s). The DineGigs user interface may allow managers to view and interact with the opportunity board, post an employment opportunity, manage job postings, manage applicants using DineWall profiles of applicants, schedule interviews, record notes for applicant interviews, extend employment offers when accepted applicant moves to onboarding under DineHR, and search for talent. For example, a manager may be allowed to search for talent by searching DineWall profiles by experience, certifications, location and more.

In FIG. 39, sections are provided for Top Gigs and Gigs Around You. Job opportunities presented in the Top Gigs section may be determined by the DineGigs system. The DineGigs system may determine job opportunities to present in the Top Gigs section for each job seeker based on information known about the job seeker and information known about job opportunities. The information known about the job seeker may be information provided from the job seeker, information provided from others such as previous employers, and information automatically determined such as a current location of the job seeker and/or other information otherwise known about the job seeker from the DineGigs system. As a result, different job seekers may be presented with different job opportunities in the Top Gigs section based on their employment histories, education or other variable characteristics known to the DineGigs system. Employers may promote jobs for particular types of job seekers, though the DineGigs system may prohibit promotions based on immutable criteria such as age, race and gender.

The DineGigs system may also determine job opportunities to present in the Gigs Around You section for each job seeker based on the information known about the job seeker and the information known about job opportunities. As a result, different job seekers may also be presented with different job opportunities in the Gigs Around You section based on their employment histories, education or other variable characteristics known to the DineGigs system. The DineGigs system may ensure no overlap between opportunities presented to a job seeker in the Gigs Around You section and the Top Gigs section, to be sure to present the greatest number of relevant opportunities to the job seeker at any time. Additionally, the DineGigs system may use all or part of the same criteria to determine which employment opportunities to present in the Gigs Around You section and in the Top Gigs section, along with proximity for the Gigs Around You section but not for the Top Gigs section. Therefore, opportunities that would meet the criteria for presentation on both Top Gigs and Gigs Around You may be prioritized for presentation in the Gigs Around You and not the Top Gigs section so that additional opportunities can be presented in the Top Gigs section.

Figure 40:
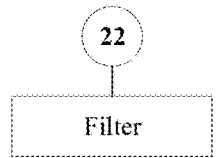
FIG. 40 illustrates an exemplary DineGigs Filter user interface of an application for multi-level network-based access coordination.

In FIG. 39, a map is also provided on the right side. The map may center on the present location of the job seeker or a known address of the job seeker and may be changed to the location of an establishment corresponding to a selected gig that is highly rated (Top Gigs) or geographically proximate (Gigs Around You) entry when the job seeker selects the highly rates or geographically proximate entre for viewing. In FIG. 39, a filter is also provided on the upper right as a selectable link, selection of which will result in either a popup user interface over the user interface in FIG. 39 or a change from the user interface in FIG. 39 to a new user interface. The popup user interface or new user interface are shown in FIG. 40 as described below.

Accordingly, the DineGigs user interface in FIG. 39 may be presented as a webpage or as a user interface on the DineGigs application so that the job seeker can search for employment opportunities. Information that can be used to search for the job may include, for example, location of the establishment, type of job, how long the opportunity has been open, and other criteria. The employment opportunities may be presented to the job seeker on the DineGigs user interface based on a search by the job seeker, and also based on opportunities that employers may want to push to potential job seekers. In this way, an establishment can request the DineGigs system to present a particular employment opportunity to a job seeker conducting a search even when the job seeker does not enter parameters that would otherwise result in the particular employment opportunity being presented but for the request of the establishment. Similar to Google search results, DineGigs search results may note when a particular opportunity is sponsored.

In an embodiment, the DineGigs opportunity board may allow establishments to list gig opportunities on an ongoing basis rather than one gig at a time. As an example, the opportunity board may list employment opportunities for preferred freelance workers (if any) for an establishment. Such employment opportunities may also be listed on a DineWall profile for the establishment. Additionally, the DineGigs users may list their availability for freelance work using a job code on, for example, their DineWall profile. As such, a manager can perform a search for available freelance workers via the opportunity board or via a search of DineWall profiles for individuals, and a job seeker can search for available employment opportunities via the opportunity board or via a search of DineWall opportunities for establishments.

The DineGigs user interface may be the default first user interface a job seeker or other user encounters once signed into the DineGigs system. Additionally, the DineGigs system may allow users to customize their experience with the DineGigs application by setting a user interface of another module of the DineGigs application as the first user interface the user will encounter once signed in, such as when the user is not searching for a new job.

FIG. 40 illustrates an exemplary DineGigs Filter user interface of an application for multi-level network-based access coordination. The DineGigs Filter user interface appears when the filter in the upper right of FIG. 39 is selected. The DineGigs Filter user interface allows the job seeker to input filter criteria for their job search. On the left side, the job seeker can select part time or full time. The job seeker can enter a location and an area around the location to search within a specified radius. The job seeker can check one or more categories of restaurants in listings in a Restaurant Categories section. The job seeker can also check one or more categories of jobs (roles) in listings in a Gig Categories section. Once the job seeker is done customizing their search criteria, the job seeker can select an Apply button, and the DineGigs system will perform a search for employment opportunities using the job seeker's customized criteria. Accordingly, the DineGigs Filter user interface in FIG. 40 may be presented as a webpage or as a user interface on the DineGigs application so that the job seeker can search for employment opportunities by filtering criteria for a job search. The filters may allow the user to select criteria described above, as well as other forms of characteristics that can be used in a job search.

The online opportunity board can minimize or eliminate spam job posts by requiring that the employers create a profile and get verified before being allowed to post a job. Job seekers can access positions posted on the opportunity board without creating a profile, such as when the job seekers are accessing the DineGigs module on a desktop computer. Job seekers can also be required to create a profile and sign in to access positions posted on the opportunity board, such as when the job seekers are accessing the DineGigs module on a mobile device. Thus, access to the DineGigs application may be provided at different levels based on device type, operating system, processing capability, screen size or resolution, or other characteristics of a device used by a job seeker seeking to access employment opportunities.

The profile of a job seeker may be used as a resume in the DineGigs system. The profile may list relevant education and experience within the food industry. Accordingly, when the job seeker comes across a position of interest, the job seeker is enabled to submit their profile to apply for the position of interest. Applying for a job in the DineGigs system may be as simple as clicking an Apply button once to submit a profile as a resume. Once an individual has initially set up a profile in the DineGigs system, the profile may follow the individual across jobs so that the profile in the DineGigs system can be leveraged to avoid redundancies. Additionally, when an individual is simultaneously employed by multiple establishments, aspects of the individual's employment such as scheduling can be coordinated across establishments to, for example, avoid schedule conflicts.

Employers collect submitted profiles on a DineGigs user interface that displays a dashboard organized under job code (i.e. Server, Bartender, Dishwasher). The employers are provided the ability to arrange candidates in order of preference. When a job seeker applies for a position for which the job seeker is not qualified, the profile of the job seeker can be held in an archived job code folder as a resume in compliance with law where the resume will still be accessible by the employer. The DineGigs system may also offer a job seeker an option to feature their profile in front of others via the DineGigs application, such as in front of a local employer searching for potential applicants using criteria matching the profile of the job seeker.

A DineGigs Apply Job user interface may be provided when a job seeker selects a job to apply for by a selectable link. The DineGigs Apply Job user interface may notify the job seeker that the job seeker's DineWall profile is their resume. The DineGigs Apply Job user interface may also provide the user with the ability to upload a formal cover letter. A clickable link allows the job seeker to apply for the job after providing the required information. The job seeker may be required to click a box to acknowledge a responsibility required by the DineGigs system, such as the possibility that an employer will require the job seeker to possess a personal smartphone or tablet for work with the DineGigs application installed thereon.

The DineGigs module described above relates primarily to matching job seekers with establishments offering jobs. Other modules described herein may provide different services to individuals such as once employed, or over time across different jobs. Even more modules may provide different services to establishments once the employees are hired, or even outside the scope of hiring and employment. These modules are described below.

Figure 22:
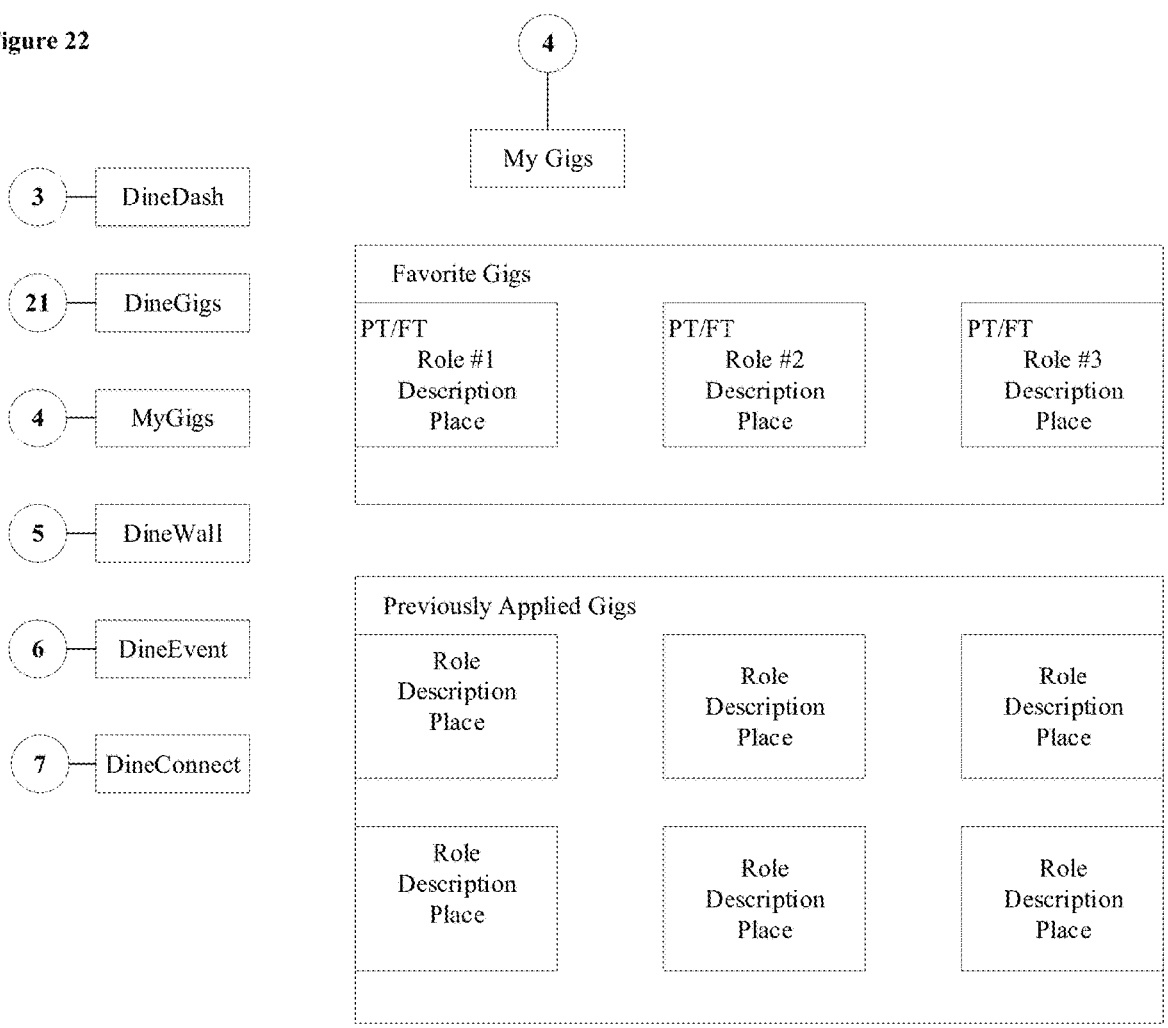
FIG. 22 illustrates an exemplary My Gigs user interface of an application for multi-level network-based access coordination.

FIG. 22 illustrates an exemplary My Gigs user interface of an application for multi-level network-based access coordination.

A MyGigs user interface may be provided in the DineGigs module specifically for a job seeker to track their job search history and interests. As shown in FIG. 22, selectable links to other user interfaces may again be provided on the left side of the MyGigs user interface. The selectable links include links to DineDash, DineGigs, DineWall, DineEvent and DineConnect. The MyGigs user interface of FIG. 22 may include one or more favorite employment opportunities which the job seeker has bookmarked, as shown in the Favorite Gigs section. Each bookmarked employment opportunity in the Favorite Gigs section may include the name of the establishment, the type of job, a job description, a location of the establishment, whether the job is part time or full-time, and the age of the posting listing the employment opportunity. A clickable link for each job in the Favorite Gigs section may allow the user to apply for the job. The MyGigs user interface may also include a Previously Applied Gigs section that lists jobs previously for by the job seeker. The employment opportunities in the Previously Applied Gigs section may include the name of the establishment, the type of job, the job description, when the user applied for the job, and whether the job is part time or full-time. A clickable link for each job in the Previously Applied Gigs in FIG. 22 may allow the user to see details of the previous employment opportunity.

GigPay Module—002

The GigPay module helps employees obtain compensation from establishments and helps establishments compensate employees. The GigPay module is provided via the DineGigs system and the DineGigs application and coordinates with external systems implemented by, e.g., credit card processors and banks.

Figure 17A:
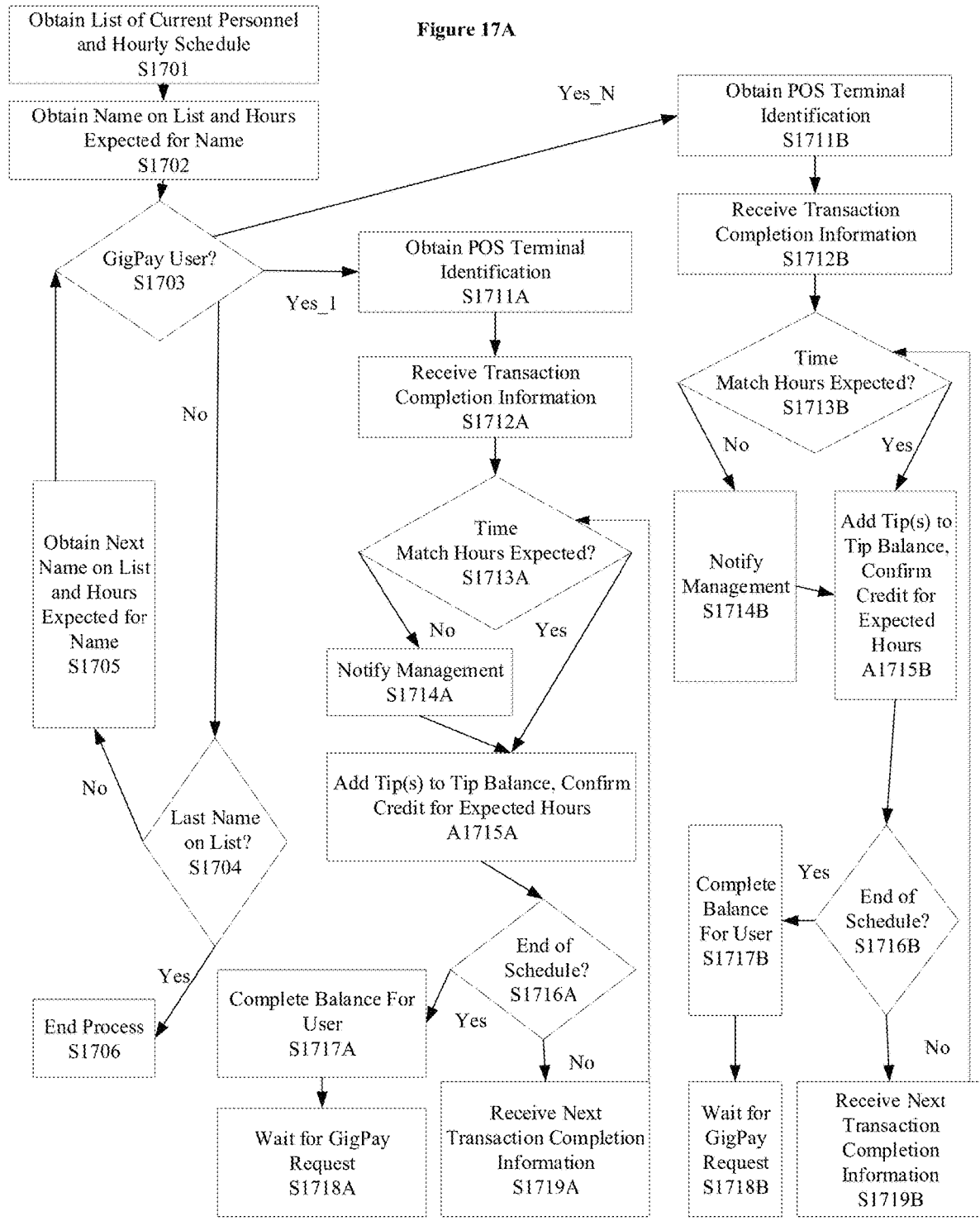
FIG. 17A illustrates a GigPay process for coordinating points of sale using multi-level network-based access coordination.

FIG. 17A illustrates a GigPay process for coordinating points of sale using multi-level network-based access coordination.

GigPay is a payroll technology developed for the DineGigs system. GigPay uses accounting software native to the DineGigs system to provide a money transfer service similar to Venmo or PayPal. However, GigPay can be used to transmit wages as well as tips collected on credit cards to tipped GigPay users at the end of a shift so that the GigPay users do not have to wait for their standard paycheck (e.g., biweekly) to collect the wages and tips. Integration of the GigPay module into the DineGigs system allows DineGigs users to obtain payment for labor rendered at the end of a shift. Indeed, an establishment may require employees (e.g., freelance employees) to accept payment for a shift through the GigPay module via the DineGigs application upon shift completion. GigPay users are also provided an ability to transfer money to other GigPay users or other recipients from the GigPay user interface. GigPay can also be used by business GigPay users to pay vendors on the same basis that GigPay can be used by individual GigPay users to obtain advance pay.

In the embodiment of FIG. 17A, the process starts at S1701 by obtaining a list of current personnel and an hourly schedule. Here, the GigPay module is finding employees of an establishment to pay using GigPay as described herein. The GigPay module may obtain the lists from establishments that use the DineGigs system.

At S1702, the GigPay module obtains a name on the list and hours expected for the name. At S1703, the GigPay module determines whether the name on the list is a GigPay user. If the name on the list is not a GigPay user (S1703=No), the GigPay module next determines whether the name on the list is the last name on the list at S1704. If the name on the list is the last name on the list (S1704=Yes), the process ends at S1706. If the name on the list is not the last name on the list (S1704=No), the GigPay module obtains the next name on the list and hours expected for the name at S1705 and the process returns to S1703.

The first time the name on a list is a GigPay user (S1703=Yes_1), a point of sale (POS) terminal identification is obtained for the GigPay user at S1711A. At S1712A transaction completion information is received from the POS terminal based on the POS terminal identification. At 1711A and S1712A, the GigPay module is determining which POS terminal the GigPay user was using, and transactions completed using the determined POS terminal. In this way, the GigPay module determines tips that customers allocated to the GigPay user and confirms that the GigPay user was working at the time of the transactions.

At A1713A, the GigPay module compares time spent on the POS terminal with expected hours. If the time spent on the POS terminal does not match expected hours (S1713A=No), management is notified at S1714A, after which the GigPay module adds one or more tips from the transaction completion information to a tip balance for the GigPay user and still confirms credit for the expected hours. Additionally, if the time spent does match expected hours (S1713A=Yes), the GigPay module adds one or more tips from the transaction completion information to a tip balance for the GigPay user and confirms credit for the expected hours without notifying management at S1714A. Here, the GigPay module is calculating an amount that may be due to the GigPay user based on a schedule provided to the DineGigs system by the establishment that employs the GigPay user. The amount due will include tips reflected in credit card receipts corresponding to the transaction completion information, as well as hourly wages for the hours worked by the GigPay user.

At A1716A, the GigPay module determines whether the schedule is at the end. If the schedule is not at the end (S1716A=No), the next transaction completion information is received at S1719A and the process returns to S1713A to ensure the time still matches expected hours. If the schedule is at an end (S1716A=Yes), a balance is completed for the user at A1717A and the GigPay module waits for a GigPay request from the user at S1718A.

The process from 1703A to S1718A is repeated for each of N GigPay users on a list, as shown by (S1703=Yes_N) in FIG. 17A. That is, a process from S1711B to S1718B mirrors the process from S1711A to A1718A for each GigPay user from 1 to N on the list of current personnel on the hourly schedule obtained at S1701. As should be evident, the process in FIG. 17A reflects the GigPay module tracking transactions for GigPay users to see how much the GigPay users will be owed by the establishment at the end of their shifts. As explained herein, these GigPay users can then request an advance from DineGigs based on the balances completed at S1717A. As an example, the GigPay module in FIG. 17A may be running on a workstation of the establishment that employs the GigPay users on the list in FIG. 17A.

Figure 17B:
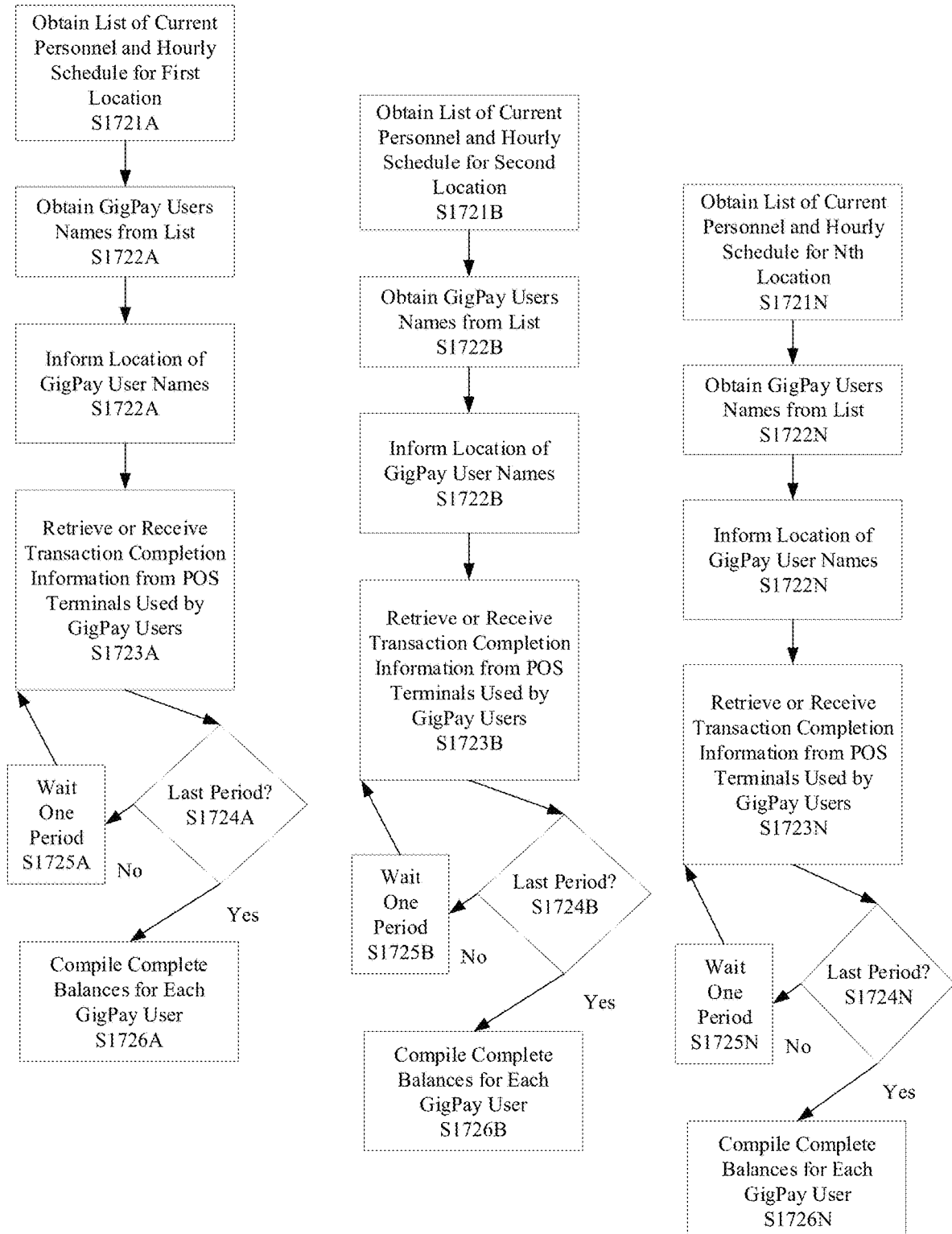
FIG. 17B illustrates another GigPay process for coordinating points of sale using multi-level network-based access coordination.

FIG. 17B illustrates another GigPay process for coordinating points of sale using multi-level network-based access coordination.

In an embodiment alternative to the embodiment of FIG. 17A, the GigPay module(s) in FIG. 17B may be running in the centralized DineGigs system and may be running an identical process for multiple establishments simultaneously. In FIG. 17B, the process starts at S1721A when a list of current personnel and an hourly schedule are obtained for a first location (establishment). At A1722A, names of GigPay users are obtained from the list. At A1723A, the location is informed of the names of the GigPay users. At S1723A, transaction completion information from POS terminals used by the GigPay users is retrieved or received. At S1724A, a determination is made whether the last period for the establishment is completed. If the last period is completed (S1724=Y), complete balances are compiled for each GigPay user at the first location (establishment). If the last period is not completed (S1724=No), the process returns to S1723A and repeats until the last period is completed.

The process from 1721A to S1726A is repeated for each of N establishments, as shown by the processes from S1721B to S1726B and S1721N to S1726N in FIG. 17B. That is, a process from S1721B to S1726B and from S1721N to S1726N mirrors the process from S1721A to 1726A for each of N establishments, where N may be any natural number. As should be evident, the process in FIG. 17B reflects one or more GigPay modules at a centralized DineGigs system tracking transactions for GigPay users at the N establishments to see how much the GigPay users are owed by the establishment at the end of their shifts or at the end of another period such as a week or bi-week or month.

Figure 17C:
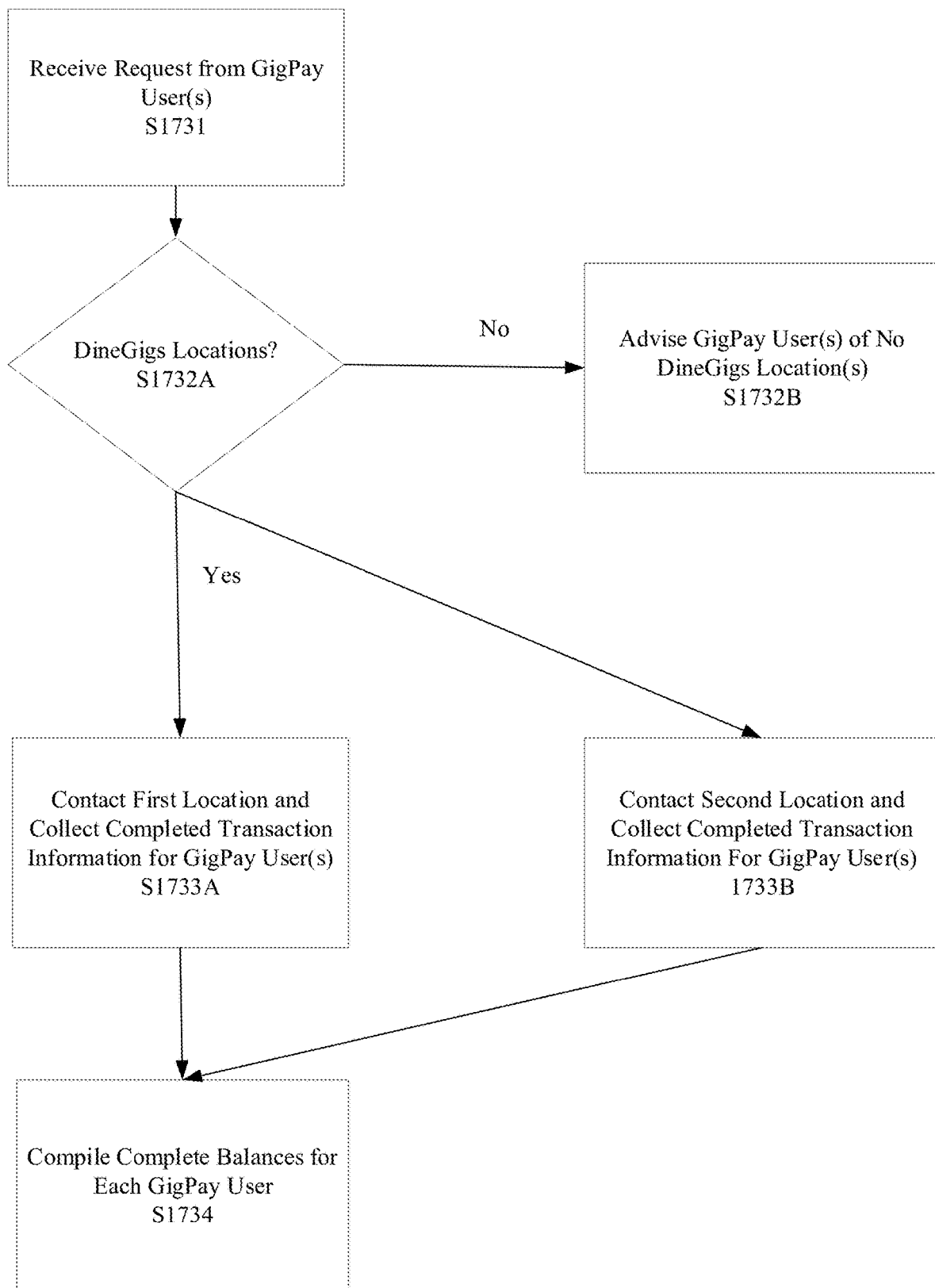
FIG. 17C illustrates another GigPay process for coordinating points of sale using multi-level network-based access coordination.

FIG. 17C illustrates another GigPay process for coordinating points of sale using multi-level network-based access coordination.

At S1731, the GigPay module receives a request from a GigPay user. At S1732A, the GigPay module checks the request to determine if any locations that use the DineGigs system employ the GigPay user. For example, the request may list establishments where the GigPay user claims to have worked. Alternatively, the DineGigs system may already know of any establishments that use the DineGigs system and that employ the GigPay user and may simply be identifying these locations (if any) at S1732A. If the GigPay user has not been working at any establishments using the DineGigs system (S1732A=No), the GigPay user is advised of the same at S1732B and the process ends. If the GigPay use has been working at any establishments using the DineGigs system (S1732A=Yes), the establishments (locations) are contacted at S1733A and/or S1733B to collect completed transaction information for the GigPay user, and at S1734 the completed balances are compiled for each GigPay user from each establishment that uses the DineGigs system. In other words, the GigPay module in the DineGigs system is determining how much is due to GigPay users based on requests received from the GigPay users at S1731.

For decades, tipped restaurant workers relied upon customers paying cash so the restaurant workers could end their shifts with money in their pocket. Today, an overwhelming number of tabs are paid by credit card, leaving tipped staff to wait until the end of the next pay period to receive their compensation—and eliminating one of the main reasons people choose to do the work. GigPay changes this by offering workers in establishments utilizing the DineGigs system (e.g., the DinePOS module) access to their funds at the end of a shift, week, pay period or another period. When the shift (or other period) is completed, labor hours are calculated, and any tips owed are added to the hourly wage. Once a manager signs off on earnings via the DineGigs system, the shift wage becomes available and any portion of the credit can be deposited into a paypal or other account for immediate use for the GigPay user. Funds dispersed to GigPay users are replenished from credit card receivables. GigPay users who wish to wait for their normal paycheck (e.g., biweekly) can do so—GigPay processes payroll and direct deposit on behalf of participating restaurants and GigPay users as an option. In terms of scale, tens of thousands of establishments (e.g., restaurants) could use GigPay, and each establishment could employ any number of people who are enabled to access wages and tips quickly.

Employees who use GigPay may be subject to a fee for using the GigPay module to obtain faster payments. Specifically, if a line of credit is extended to an establishment by DineGigs based on credit card receivables due to the establishment, the line of credit will incur an interest expense. Though the line of credit may be extended for very short terms, the establishment may wish to recover the interest expense from the employees. Therefore, the DineGigs system may electively allow an establishment to deduct a small fee from GigPay earnings in order to offset interest expense incurred by the establishment in order to obtain advances based on credit card receivables due to the establishment. Thus, short term revolving loans to the employer which are based on credit card receivables and which are made for the benefit of employees may be paid for by the employees who are paid much faster using the GigPay arrangements.

Figure 36:
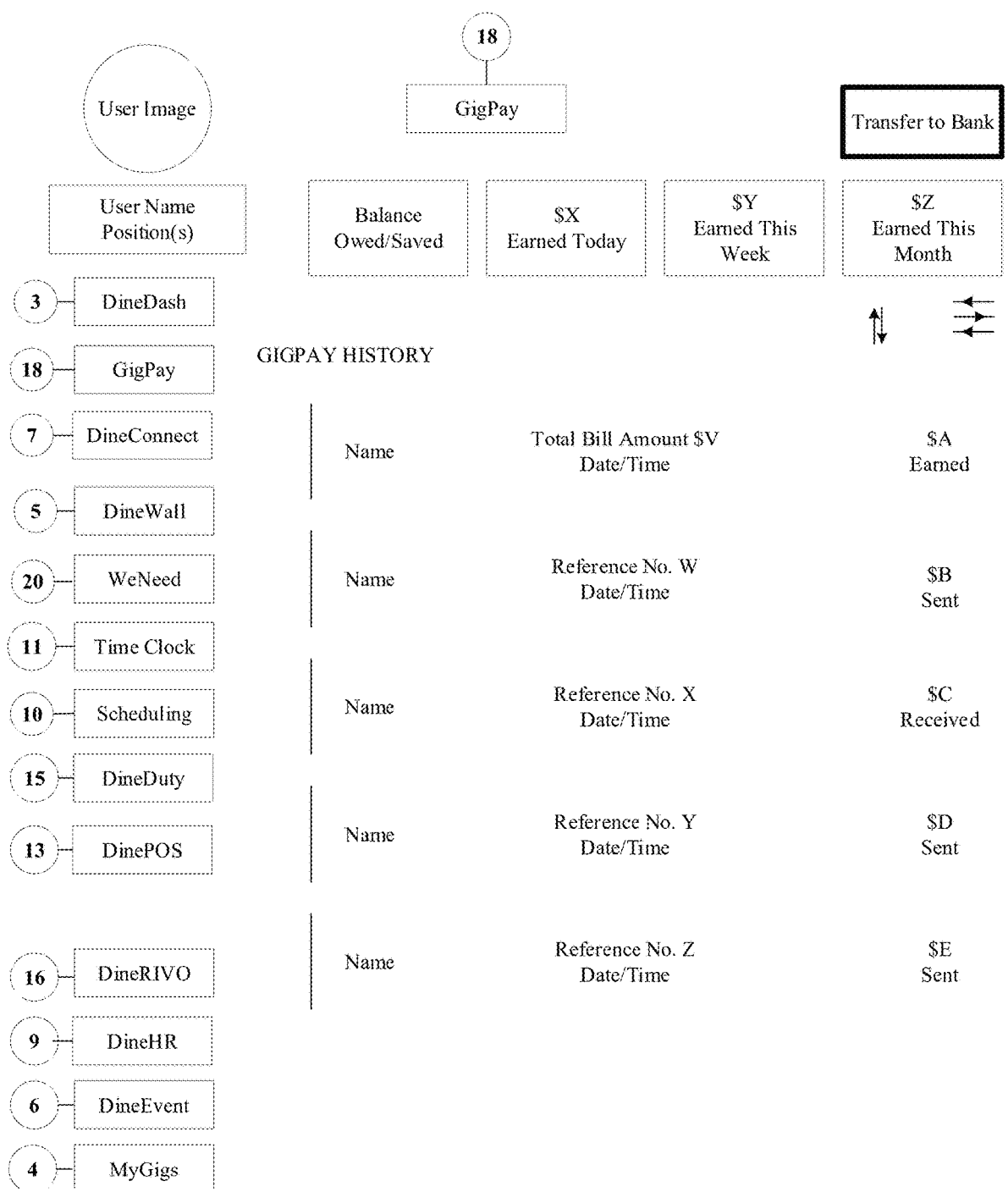
FIG. 36 illustrates an exemplary GigPay user interface of an application for multi-level network-based access coordination.

FIG. 36 illustrates an exemplary GigPay user interface of an application for multi-level network-based access coordination.

In FIG. 36, a GigPay user interface includes selectable links on the left side and profile picture of the GigPay user on the upper left with a label for the GigPay users name and position. The selectable links on the left in FIG. 36 include DineDash, DineConnect, DineWall, WeNeed, Time Clock, Scheduling, DineDuty, DinePOS, DineRIVO, DineHR, DineEvent, and MyGigs. The selectable links on the left of the GigPay user interface in FIG. 36 may be different for each GigPay user and may be arranged based on determinations made by the DineGigs system and/or based on preferences of each GigPay user and/or based on permissions granted by managers or owners of establishments using the DineGigs system.

In FIG. 36, the GigPay user interface shows a current balance owed to or otherwise saved by the GigPay user, an amount earned for the day, an amount earned for the week, and total earnings for the month. The GigPay user interface of FIG. 36 also shows a history including, for example, amounts received as tips from customers individually or as a total over a period of time, pay from employers, and transfers/pay to other users. A selectable link on the GigPay user interface may also allow a GigPay user to transfer part or all of the GigPay user's balance to a bank, such as by direct deposit on-demand. Although not shown, the GigPay user interface may also provide options for the GigPay user to transfer part or all of the GigPay user's balance to another GigPay user.

A GigPay Dropdown Sort function under the total earnings for the month on the GigPay user interface of FIG. 36 may allow a user to select a drop-down menu to sort history items. For example, the GigPay user may sort history items by date, counterparty (i.e., recipient or source), table number (i.e., a table at a restaurant), or other types of information that can be used to identify a transaction on the GigPay user interface.

A GigPay Dropdown Filter function under the total earnings for the month on the GigPay user interface may allow a user to filter history items. For example, the GigPay user may filter items by a range of dates, whether the transaction involved the user sending or receiving funds, a source or recipient of the funds, or any other type of information that can be used to identify one or more transactions via a filter on the GigPay user interface.

The GigPay Transfer to Bank selectable option may allow the GigPay user to select or confirm a bank account to transfer funds from GigPay. The Transfer to Bank selectable option may show the current balance available for withdrawal and allow the user to specify an amount up to the current balance to withdraw.

DineHR Module—003

The DineHR module helps establishments implement human resources policies. The DineHR module is provided via the DineGigs system and the DineGigs application.

Nevertheless, many forms of human resource records managed by the DineHR module may be stored and accessed via local networked resources of the establishments that use the DineGigs system.

The DineHR module may provide numerous different user interfaces that vary for establishments and employees. Functionality of selections by a manager or an employee on any of the DineHR user interfaces may be implemented by the DineGigs system. From the viewpoint of a manager of an establishment, a DineHR user inter interface that displays a dashboard for managers may provide many different selectable options for different human resources functions. For example, a DineHR user interface may provide selectable links to different user interfaces for:

new applicants (e.g., for managing submitted DineGigs profiles for (1) Top Applicants and for (2) Archived Applicants)

background checks permissions management (for managing DineGigs permissions for different DineGigs users involved with the establishment)

employer identification, and licenses/permits employee performance

In the case of permissions management, once hired, an owner or manager of an establishment may delegate and grant access permissions to employees from a DineHR user interface for managers that acts as an establishment-specific dashboard for the establishment. The permissions may cover some or all duties to be completed on behalf of the establishment. The access permissions can be linked to the users' individual profiles and stored by the DineHR module for the establishment and for the employee.

Figure 27:
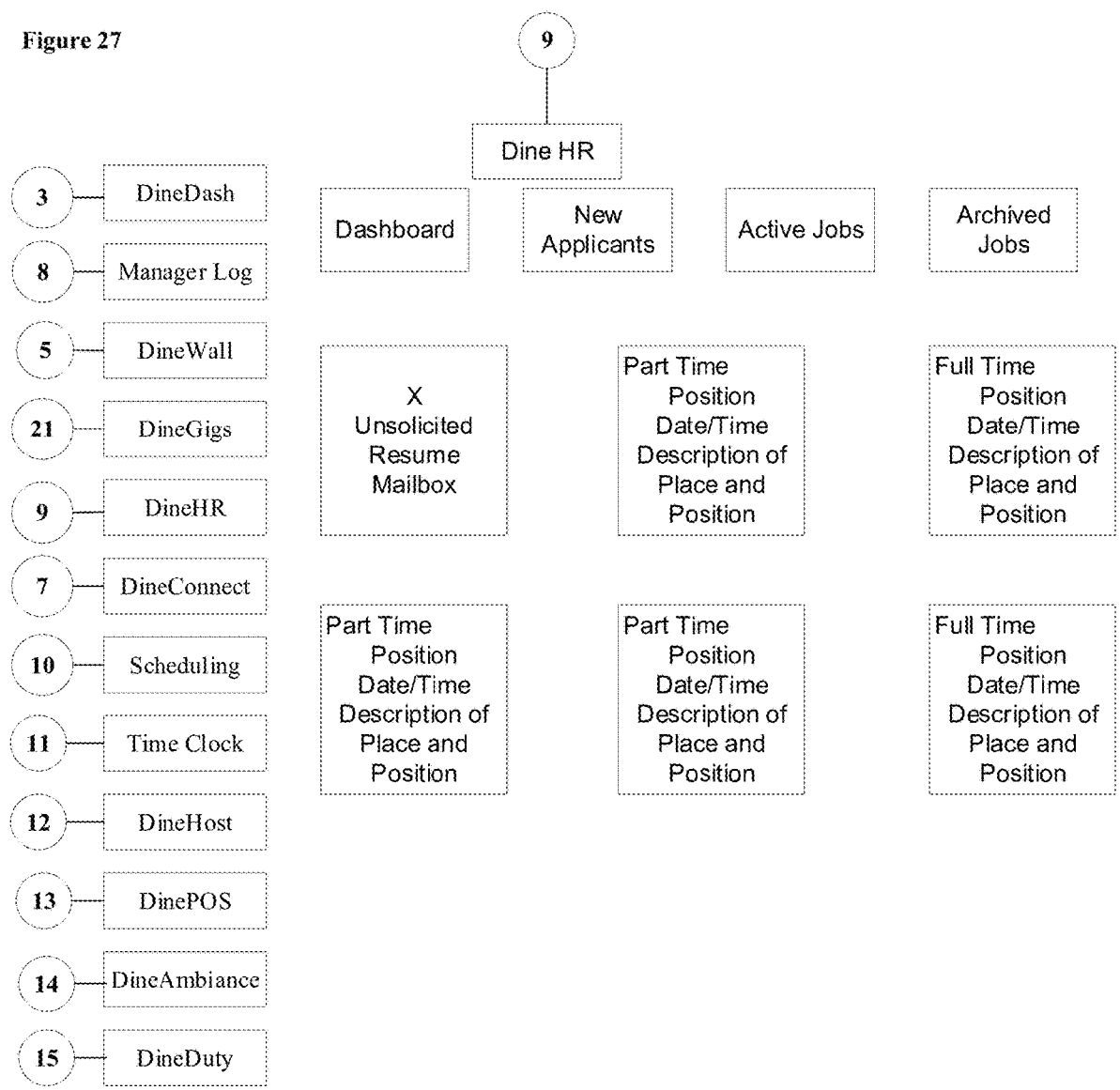
FIG. 27 illustrates an exemplary DineHR user interface of an application for multi-level network-based access coordination.

FIG. 27 illustrates an exemplary DineHR user interface of an application for multi-level network-based access coordination.

In FIG. 27, the DineHR user interface is for managers to manage hiring functions involving New Applicants as one of four selectable options shown on the top under DineHR. Using the DineHR interface in FIG. 27 for New Applicants, the DineGigs system provides a manager with an ability to:

access and review unsolicited resumes review active jobs posted by the establishment mark an active job inactive so as to add the inactivated job to the archive The DineHR user interface in FIG. 27 includes selectable links on the left side. The selectable links include DineDash, Manager Log, DineWall, DineGigs, DineConnect, Scheduling, Time Clock, DineHost, DinePOS, DineAmbiance and DineDuty. The DineHR user interface in FIG. 27 also includes other functional DineHR user interface links on the top under DineHR, including the link to the DineHR user interface that serves as a dashboard for managers described above, as well as DineHR user interfaces for Active Jobs and for Archived Jobs. An Unsolicited Resume Mailbox link is shown beneath the Dashboard link and the New Applicants link. The DineHR user interface of FIG. 27 is one of multiple different DineHR user interfaces that can be used by the manager to manage human resource functions for the establishment using the DineGigs system.

When the manager selects one of the active jobs in FIG. 27, a new DineHR user interface may appear which organizes applicants for the selected active job by Top Applicants and All Applicants. The new DineHR user interface for the selected job may allow the manager to select a selectable sort button which generates a pop-up user interface that allows the manager to sort applicants for the selected active job by date and last name. A sort button on other DineHR user interfaces may provide more of a global sort function that allows the manager to sort applicants by date, last name, job posting, and job category. For example, the manager may be allowed to sort applicants for a selected job posting and by last name. using a pop-up user interface.

From any DineHR user interface that displays multiple applicants, the manager may be allowed to select an applicant. The manager may be provided a new DineHR user interface limited to information and options for the selected applicant. For example, the applicant profile picture, name and current position may be provided on the new DineHR user interface limited to information and options for the selected applicant. Options may include drop-down options to schedule an interview, interview and rate, extend an employment offer, onboard, and add a legacy employee. Additionally, the manager may be able to add the selected applicant to favorites, to place information of the selected applicant (e.g., a link to a profile) in a Top Applicants folder.

Using a DineHR user interface for managers, a manager can hire a job seeker with one click when the establishment wishes to hire the job seeker through the DineGigs system. Acceptance of the position by the new employee can be accepted via another DineGigs user interface for applicants, such as by a user interface provided by the DineGigs module. The DineHR module and the DineGigs module may coordinate to automatically notify the manager of the acceptance by the new employee in accordance with requirements set by the manager.

The DineHR module may notify the new employee of the amount of time the new employee has to complete hiring forms, and the amount of time the new employee takes to complete the hiring forms can be tracked by a clock on the server 200 of the DineGigs system in FIG. 2. The DineGigs system may not allow the new employee to schedule a work shift or clock in until the new employee completes hiring forms. When the new employee completes hiring forms, the new employee may be allowed to schedule a work shift and clock in via a terminal or via their mobile device (e.g., using mobile GPS and/or via facial recognition cameras on-sight). The completed hiring forms may be received and automatically analyzed to implement human resources functionality for the new employee.

Additionally, information such as photographs may be received and processed by the DineHR module of the DineGigs system. The new employee can submit photographs of a driver's license, passport, social security card, from, e.g., the camera of a smartphone, and the DineHR module may match the photographs with the new employee. The DineGigs system may also read data from images such as identification forms to auto-populate hiring forms, though the new employee may be requested to confirm auto-populated information in order to complete the hiring forms.

The DineGigs system may also process information from the new employee to meet legal requirements relating to hiring and employment. For example, the new hire may be reported by the DineGigs system to a state employment agency automatically based on confirmation of collected digital information.

The DineHR module may also implement employee disciplinary functions, such as for tardiness or absenteeism. Insofar as the DineGigs system may track employee location during shift hours, e.g., after clock-in and via their mobile terminal, the DineGigs system may report to managers when employees roam further than 250 feet from a restaurant geofence, i.e., from a perimeter or individual point. Once notified, managers can confirm how to process such notifications, including by generating and storing a disciplinary report for the employee file via the DineHR module. The DineHR module may automate some functions, such as the notification process or a reporting process.

A DineHR user interface specifically for a manager may allow the manager to see reports in real time such as when an employee takes breaks or leaves for the day without clocking out, allowing the manager to ensure adequate coverage for an establishment and to accurately determine labor hours payable. Should an action such as not clocking out require disciplinary report based on an establishment's policy, the disciplinary report can be submitted automatically via the DineHR module for any infraction. The employees may not be required to sign the write up, but the employee may be required to acknowledge that the write up was received or the employee may be prevented from clocking-in or accessing restaurant systems until receipt is acknowledged.

The server 200 may track all or selected transactions and communications between communications devices that use the system, so that receipt of a write up by an employee from a manager may be recorded. The employee digital signing or acknowledging a disciplinary action is recorded and held in an electronic repository for the establishment by the DineHR module. Other employee notes can be recorded here as well, including performance reviews. Other documents such as employee Code of Conduct can be uploaded and distributed to employees at any desired interval, also requiring their signature or acknowledgement to access systems and recording and storing each instance.

Employees have access to information regarding their employment—i.e. pay stubs, company policy docs, etc.—from their DineWall profile once the employee logs in. The DineWall profile a user creates may serve as the only platform needed to complete all administrative duties. The DineWall profile can be accessed from many user interfaces when the DineGigs user selects their profile picture or an accompanying icon. All actions take by an employee on behalf of the establishment are logged by the DineGigs system by time, user, and action and may be recorded for review on the DineWall profile for the establishment.

Via the DineHR module, DineGigs captures employee information for future employers too. For example, an establishment may require background checks on some or all employees, and such checks may carry over in the DineGigs system across employers. The DineHR module may also run automated periodic background checks on all or selected employees, such as monthly. Periodic checks may be done insofar as some states do not allow someone charged with an alcohol related offense to handle or serve alcohol for a period of time. If an employee is charged with or convicted of DUI and is then caught serving alcohol, the restaurant can face steep fines and even lose their liquor license. The DineGigs system may be used to purchase bulk background check credits for resale to employers for monthly checks. Anecdotal research shows these can be purchased wholesale, and an average restaurant establishment may have 3-5 employees where background checks are necessary. Alternatively, or additionally, the DineHR module may be used to automate some forms of background checks online, such as by checking local, state and federal databases once per month to check if employees of one or more establishments have new convictions for certain types of offenses.

As set forth above, the DineHR module streamlines the process of importing DineGigs users into businesses as employees. DineHR is where establishments manage employment applications, the hiring process, employee conduct compliance, and more. For DineGigs individual users, the DineHR module is where employees may complete employment forms as a self-service, personal information, upload personal identification, choose benefits elections, find their pay stubs and tax documents, employee manuals, acknowledge disciplinary actions, vacation and sick pay information, and any other information directly related to their employment status and compensation.

In terms of a flow for a job seeker using the DineGigs module to an employee using the DineHR module, once the employee is hired the DineGigs system may automatically assign default permissions based on the employee position. Automatic permissions for all employees may include keycard access to doors controlled by electronic locks, Time Clock access, scheduling access, and so on. Alternatively, or additionally, permissions may either be individually set by a manager or may require approval by a manager. Of course, some permissions may be automatically set by the DineHR module based on the employee position, and other permissions may be individually set or approved by the manager. For a new employee, the profile of the job seeker from the DineGigs module may be imported into the DineGigs module automatically such as by link the employee's DineWall profile linked originally from the DineGigs opportunity board. An electronic file may be initially created by the DineHR module for the hiring establishment from the imported DineWall profile, and then supplemented with hiring forms received from the employee. Then the process of permissions may be implemented to complete the hiring process via DineGigs, so that the employee appears on the employee roster of the establishment and is allowed to sign up for shifts, GigPay and so on.

When a job seeker viewing an opportunity selects Apply on the DineGigs opportunity board, the job seeker may see the right-side pop-out window open with a text field to write an employment cover letter to the interviewer. Alternatively, the job seeker may upload a formal cover letter as an image file such as a pdf. When the job seeker hits Send after writing or uploading the cover letter, the job seeker's profile picture and accompanying cover letter may arrive at a DineHR user interface that acts as a dashboard for the establishment on a button titled New Applicants. Once the manager clicks New Applicants from within the DineHR dashboard for the establishment, each active job post for the establishment on the DineGigs system may be displayed with a card-style layout including post title and the main image uploaded when the job was posted. The first job card displayed may be a resume mailbox where unsolicited resumes are received from inquiries on the DineWall user interface for the establishment.

A numbered alert may appear on each active job post card identifying the number of applications received since last the manager last viewed the job card. Selection of the job card results in display of a user interface with the user profile photos of each applicant. Clicking on a profile picture may have the profile of the corresponding DineGigs user pop up without requiring the manager to leave the current user interface to view the pop-up profile and qualifications. Additionally, managers may have the ability to post jobs to the DineGigs module from within the DineHR user interface for managers that acts as a dashboard, such as by using a Post A Job button. On the DineHR user interface that serves as a dashboard for managers, a button titled Active Job Postings may list all current active jobs for the establishment in the DineGigs module in card-style view, with the ability to make a job post inactive or archived from the card view.

An additional dashboard button Archived Job Postings allows the manager to view postings that have been archived.

As business users review resumes via profile cards submitted within New Applicants, the business users may have the opportunity to select profiles of favorite candidates to a section within the DineHR user interface that serves as the dashboard titled Top Applicants. Text may appear here instructing the manager to Favorite a candidate to save the candidate's profile to Top Applicants and schedule an interview. When Top Applicants is clicked from the DineHR user interface serving as the dashboard, each profile card the employer has saved may be sortable by date, alphabetically by last name, by job posting, by job category and by rating. Hovering over a profile card may offer options such as Schedule an Interview, Interview and Rate, Extend Employment Offer, Onboarding, Add Legacy Employee.

When Schedule an Interview is selected, the right menu may pop out. The right menu may first ask the manager whether the manager would like to call the candidate now, send a message, or schedule an interview. If the manager elects to call the candidate, the candidate's phone number may appear with a Click to Call option. If the manager elects to send the candidate a message, a message text box may appear to send a message to the candidates' DineGigs message folder. If the manager elects to schedule an interview, the manager may be asked to select whether the interview will be by phone or in person. When one is selected the other is greyed out and a calendar appears where the manager may select a date, enter a time, and enter the location and phone number. Once scheduled, the interview is synchronized to the manager's DineDash calendar and an invitation is sent to the applicant to accept the interview. When accepted, a DineDash alert announces the interview as confirmed with date, time and applicant name.

If the manager elects to interview and rate the candidate, the right-side menu may appear with a text box for comments and a field below asking the manager to rate the candidate (e.g., on a scale of 1 to 10), so the manager can enter any number 1-10 (or higher if the manager wishes to indicate that the candidate was truly exceptional). The manager may be allowed to save selections with a Save button below both fields. Saved notes may appear with the candidate's Top Applicants card, and when hired, the notes will move to a folder with details for the new employee.

When the manager elects to extend an employment offer, the right-side menu pops out. The manager is prompted to select full time or part time. If part time is selected, the manager may be asked to approximate the hours or shifts per week, with both hours and shifts being selectable. The DineGigs system may create a default job code Training for a new employee, with an hourly pay rate that can be edited. Below the training job code, the manager may be prompted to assign another job code from a list of job categories from the opportunity board of the DineGigs module. Examples of job categories include server, bartender, cook. The DineGigs system may only allow the manger to select a single job code initially, but then provide an option to add another job code pay rate at the end of the section. Next is pay rate, where the manager enters a number in the box. The words "per" and then a dropdown with choices for Hour, Shift, Day, Week, Month, Year. If a second job code is needed, example—someone hired as a bartender at $8/hr. and a server at $2.13/hr. might also have a training rate of $10/hr.—the option to add an additional job code which results in a new form to add the job code and pay rate. The job codes attach directly to scheduling and other modules, so it's important the hot links are done correctly so that the hot links can be easily referenced throughout the ecosystem. Next, a section called Benefits is where the business user can select with a check mark all or any of the following: Health, Vision, 401K, Life, PTO, Sick to denote benefits associated and two radios, Immediate or After If after is selected then a field to enter a number followed by "days, weeks, months". Upon accepting an offer, benefits may be automatically initiated by the DineHR module, with processing at the future date. This will help the employer ensure benefits information is transmitted from the employee when their benefits window opens, usually 90 days to six months from start date. Benefit packages will need to be defined in the Benefits section by the employer to completable by the employee in the hiring packet). At the bottom will appear the word Next with an arrow pointing right. When clicked, the right-side menu pops out again showing the current week schedule with an option to advance weekly into the future. Text prompting the manager to click a shift to add a start date and shifts to a schedule is then provided with an option for the manager to skip these actions for the time being. The manager may click a shift on the schedule and elect whether to add the employee to the shift, then select a job code, not if the employee is in training, assign a trainer and so on. The manager may also add a reminder to schedule the trainer if no schedule is yet published, and then select another employee as the trainer. The DineHR module may automatically update the pay rate for the shift to be a training pay rate for the trainer, which then allows the new employee and the trainer to clock in to the Time Clock module under the correct job code. The manager may also be provided an option to use the DineHR module for digital onboarding, so that standard government hiring forms are generated and collected for the new employee. When selections are completed, the manager may send the documents to the new employee for receipt at the new employee's DineDash dashboard user interface.

The applicant receives a notification of the new job offer on the applicant's DineDash user interface. The applicant user clicks the card and the details of the offer appear with the businesses' DineWall profile photo and verified checkmark (if applicable). The user can select to Accept or Decline the offer. If accepted, a message appears congratulating the application on the new job. If the establishment has selected the DineHR for digital onboarding, the new employee may receive the option to complete the new hire packet or skip for now. The new employee may be notified of the employer's requirement to complete the new hire packet prior to reporting for a first shift. The new employee may be advised of an inability to clock-in or access restaurant systems until the new hire packet is submitted. If the new hire elects to complete the new hire packet, the employee will then receive information such as warnings that must be acknowledged prior to being given an ability to complete the new hire packet.

The candidate's acceptance is communicated back to the establishment's DineDash user interface that serves as a dashboard or via the DineHR module. If the manager skipped answering the final question regarding how the manager wished to onboard the employee, the manager is offered the option to onboard the new employee so that a new screen is provided for the new employee who has accepted the offer. The manager is then prompted to click a profile to onboard a new employee. When a profile card is clicked, the right menu may pop out asking the manager how to onboard the new employee, with options for DineHR to digitally onboard the new employee or for the manager to enter and upload the employment data manually.

An option to add legacy employees may also be provided by the DineGigs system in order to collect all forms and signatures digitally for up to 50 employees in the first 30 days following the first time the option is used. This is intended to speed the process and lower the burden of transitioning to the DineGigs system for new establishments.

If DineHR is selected to digitally onboard an employee, the employer must select which forms are to be collected. Most common forms will be IRS Form 1040, State Tax Forms, New Hire Reporting. If the employer has a form required by the employer and which is not listed, the employer has the option to select the document from a list of saved docs or upload the document and enter/save fillable fields via a DocuSign API. DocuSign may be incorporated into DineHR for all signature and forms. One feature of DocuSign is that information filled into fields can be captured/collected and transmitted digitally into the DineGigs ecosystem immediately, eliminating redundant data entry.

When the employer chooses to have DineGigs collect DineHR employee information on their behalf, the process of onboarding an employee requires a system for the applicant to relinquish their personal information to the employer. Firstly, the employee is made aware that the business has asked DineGigs to collect employment information on behalf of the business. A DineDash notification may be sent to the new employee advising the new employee to complete the hiring packet so that, once clicked, the employee is notified that their new employer has asked DineGigs to complete the onboarding process on their behalf. The employee is then prompted to call the restaurant at the verified number and have the manager verbally confirm the employment offer. Before beginning to complete the hiring information, a warning may appear to avoid identity theft and only transmit personal data to employers with whom the new employee has met in-person at the hiring location and after the new employee has confirmed any employment offer extended. New employee check boxes may be required. For example, check boxes may be required next to "1) I attest that the hired person has been interviewed in-person by the employer at the hiring location 2) I attest the employment offer was confirmed verbally". The employee may then be prompted to click a button Complete Hiring Packet.

The hiring packet is a process for collecting more detailed information about the employee than was collected when the employee created their DineWall profile. The employee may be taken through stages of information to complete. At this time, DineHR may become an available option on the left menu to non-business users and is where users may complete or edit their personal information via self-service:

The employee may be required to upload a scan or .jpeg picture from their computer or cell phone of their social security card and drivers license or passport, so these fields may be added. Additionally, a column for taxes or taxes and tax forms may be added, along with a field for paystubs.

Once all stages and fields have been completed by the employee, the employee will receive the option "Submit Completed New Hire Packet". The employee will then be transmitted employee manuals to their own DineHR under "Employee Manuals". The employee will then be prompted to confirm receipt of the employee manual. When the employee confirms receipt of the employee manual, the DineHR system may automatically generate a notification to the employee confirming that the employee is hired. The employee will also be notified to download the DineGigs mobile application before reporting for the employee's first shift, with Android and iOS links below to download the DineGigs mobile application. The employee will use the DineGigs application from their smartphone or tablet (employer will need to provide if employee does not have a smart device) to complete all employment related duties on the job; from entering orders into POS systems, checking their schedule, communicating with managers, inventory and more.

The DineHR interface for business users may include a host information to help them navigate HR. To begin, a secondary interface for entering jobs unto the DineGigs platform and managing job postings may be included within DineHR. Applicant management must also be included. Top Applicants, Archived Applicants (where applicants not favorited as "Top Applicants" can be found), Employee Management, Organization Management (for Restaurant Groups), Permissions management, Training, Benefits Administration, Job Codes, Employee Manuals, Disciplinary Portal, Employee reporting, Employer Identification and Permits, Background Checks, Connected Accounts, Employee Performance, Holiday Schedule and Settings, and more—all may be selectable navigation where the processes identified in this document will find their home.

For employees, the DineHR module may focus on areas directly relevant to employees. The employees may be able to view and update their address/phone number/email, connect social media accounts, elect benefits and current insurance plans, tax withholding, view sick pay and paid time off (PTO) available, 401K, pay stubs, beneficiaries, emergency contacts, direct deposit information, valid identification, receive and acknowledge Disciplinary Actions, Change Passwords, Update communication preference notifications, Manager/Owner Contact Information, Time off request, Schedule History (job code, wage rate, tips claimed), and access the Training Portal.

All users must be escorted through the processes of DineHR with as little opportunity for error as possible to ensure systems consistently deliver repeatable, commonsense user behavior in interacting with the interface, across every business using the DineGigs platform. Information captured here will be used throughout the DineGigs infrastructure.

A series of DineHR pages may provide resources for a business to manage hiring and employment opportunities. For example, a DineHR Business Applicant Management page may provide categories for a business to store and organize top applicants, archived applicants, employee management, organization management (for restaurant groups), permission managements for the DineGigs pages for a business and related activities, training, benefits administration, job codes, employee manuals, a disciplinary portal, employee reporting, employer identification and permits, background checks, connected accounts, employee performance, holiday schedules, and more. In other words, DineGigs can provide a functional human resources ecosystem for restaurants to use in order to provide human resources functions. A dashboard at the top of a Business Applicant Management page may allow a manager to select from a main dashboard page, a selectable new applicants page, a selectable active jobs page, and a selectable archived jobs page.

A DineHR Business page may be provided to allow a manager to manage new applicants. The DineHR Business page may have a general mailbox for unsolicited resumes, and different windows for each different job opening being actively managed. Each window for a different job opening may include a separate inbox designator for the manager to select to view applicants for the job.

A DineHR Applied User page may be provided for the different job openings being actively managed. For instance, a manager may be able to select from a drop-down menu. When the manager selects a particular job opening, the Applied User page will display top applicants identified by name and a picture identification, as well as all applicants identified by name and a picture identification.

A DineHR Applied User Sort may show a pop up from the Applied User page. The pop-up page allows the manager to sort job postings and applicants such as by date, last name of applicants, the job posting, the job category of one or more job postings, ratings, or other metrics that can be used to filter a pool of job openings and/or applicants down to a smaller set.

A DineHR User Options page may allow a manager to select an applicant, view their profile or other information, schedule an interview, rate or otherwise grade the interview, extend an employment offer, manage an onboarding process, or add a legacy employee into the DineGigs system.

The User Options page option to add a legacy employee may be provided to new businesses on the DineGigs ecosystem. New businesses may be given 30 days to add legacy employees from the time the business joins the DineGigs ecosystem.

A user option page may show the profile of a candidate, such as by name and profile picture. The candidate information shown may include current and previous employment positions including location, duration, position type, and a description of the candidate. Separate drop-down menus may be provided to schedule an interview with the candidate, perform an interview and rate the candidate, extend an employment offer to the candidate, onboard the candidate, or to simply add the candidate as a legacy employee. When the drop-down menu for scheduling an interview is selected, options may be provided to call the candidate, send the candidate a message via the DineGigs system, or to schedule an interview such as by email. When the interview and rate drop down menu is selected, options may be provided to add free-form commentary regarding the candidate and to rate the candidate such as on a scale of 1 to 10 or by 0 to 4 stars. When the drop-down menu to extend an employment offer is selected, options may be provided for full time or part time, a number of hours per week, a job role, a job code, a pay rate per hour or per day or per year. When the onboard the candidate drop down menu is selected, options may appear for benefits such as health insurance, vision insurance, 401k, life insurance, paid time off (PTO), sick leave, and when the benefits will start such as immediately or after a specified number of days, weeks and/or months.

A Schedule an Interview page may show the interview candidate name and picture, and an automated form allowing the interviewer to call the candidate at the candidate's number, to send a message, or to schedule the interview via an automated process such as by sending an email.

Another Schedule an Interview page may show the message box opened when the interviewer selects the option to send the interview candidate a message.

Yet another Schedule an Interview page may show the automated process procedure when the interviewer selects the option to schedule the interview via the automated process. For example, the automated process may allow selections of scheduling the interview by phone or in person, on a selectable date and time, at a selectable location, and with a selectable contact phone number or email address.

Once the information is populated such as by selection, a clickable button to send the interview by the automated process such as email is provided. If the button is selected, the proposed interview schedule is sent to the interview candidate.

A business benefits page may show the candidate information including name and profile picture, and may allow the manager to add a start date and shifts by date and time and role. For example, the new employee may be scheduled to start (1) on Monday (2) at 8:00 AM (3) for training (4) as a chef by four separate windows that allow either free-form input or drop-down selections. A fifth window may be provided to list the trainer by name and DineGigs identification number. Options for onboarding the employee may be provided by DineGigs, such as for a fee, or may be performed manually by the manager.

A New Job Offer page may be provided to the candidate via the DineGigs system. The New Job Offer page may indicate that the candidate has a new job offer (1) by role, (2) by employer, (3) by address. The page may also provide two selectable links to accept the job or contact the employer. The candidate may be presented also with a separate notification that the new employer requires completion of a new hire packet digitally prior to reporting for the first shift, and links to the new hire packet. The link to the new hire packet may provide additional link to forms including an IRS Form 1040, state tax forms, new hire reporting, and employee benefits elections, along with options to digitally sign or upload the firms once completed.

When the hiring packet is to be completed via DineGigs, the candidate may receive a notification that the employer has asked DineGigs to complete onboarding. A page may provide a notification that the candidate should confirm an offer over the phone with the employer prior to completing the hiring information. Additionally, a page may ask the candidate to confirm ownership of a personal smartphone or tablet that can be used at work, as well as to confirm that the candidate was interviewed in-person and that an employment offer was extended.

When the candidate is ready to complete the hiring packet request, the candidate may use a page to provide their profile picture, name, date of birth, social security number, drivers license number, and other information typically provided to employers. The page may also allow the candidate to upload images and documents, and to download IRS and state tax forms along with administrative forms for new hire reporting. When the hiring packet is complete, a pop-up window may ask the candidate to confirm the hiring packet before submitting the same. Once submitted, the candidate may be notified that the candidate has been hired, and that the candidate's employer requires the candidate to download the DineGigs mobile application on a smartphone or tablet.

The DineGigs system then stores information for the new hire including contact information such as address, phone number, email addresses and social media accounts. A page specific for the employee in the DineGigs ecosystem may be a profile setting page that links to the contact information as well as IRS and state tax forms, new hire reporting, benefit information, pay stubs, insurance elections, beneficiaries and emergency contacts, direct deposit information, identification information, and so on. The page specific for each employee in the DineGigs ecosystem may provide links to disciplinary actions taken against the employee, time off requests submitted by the employee, and a schedule history including job codes, wage rates, and tips claimed. All of this information and more may be provided through separate links accessible via a "settings" page for the new hire.

Additional information linked through the settings page may include passwords, communication preferences for notifications, and manager/owner contact information.

The DineHR page may allow an establishment to perform employee onboarding, generate an employee roster, set permissions and accesses in the DineGigs system for employees, generate and store employment manuals, generate and record disciplinary actions, generate and perform training, and generate and generate and store employee performance reports. The employee onboarding is a transaction point after employment is accepted where DineGigs gathers data for a fee or the user collects and enters the data for free. The employee roster may include links to DineWall profiles of hired employees. The permissions and accesses may include both permissions and accesses to network locations and resources as well as physical locations in and around an establishment. The employment manuals may be written from scratch or uploaded from existing materials such as in a PDF manual. Disciplinary actions may be written, uploaded, stored, and shared with a chain of custody showing that the employee has acknowledged each instance of discipline. Training may be provided by building internal knowledge tests via forms, sharing and certifying employee knowledge for working various positions to thereby allow employees to be added to a schedule in certain job codes. The employee performance reports may be provided as pages of and/or links to a dashboard of employee performance data.

DinePos Module—004

The DinePOS module is used to enter orders, coordinate order fulfillment, ensure the ability to fulfill orders, and coordinate with other modules in the DineGigs system to ensure payment is received for orders. Functionality of the DinePOS module may be distributed between terminals used by employees and the centralized DineGigs system.

Figure 13:
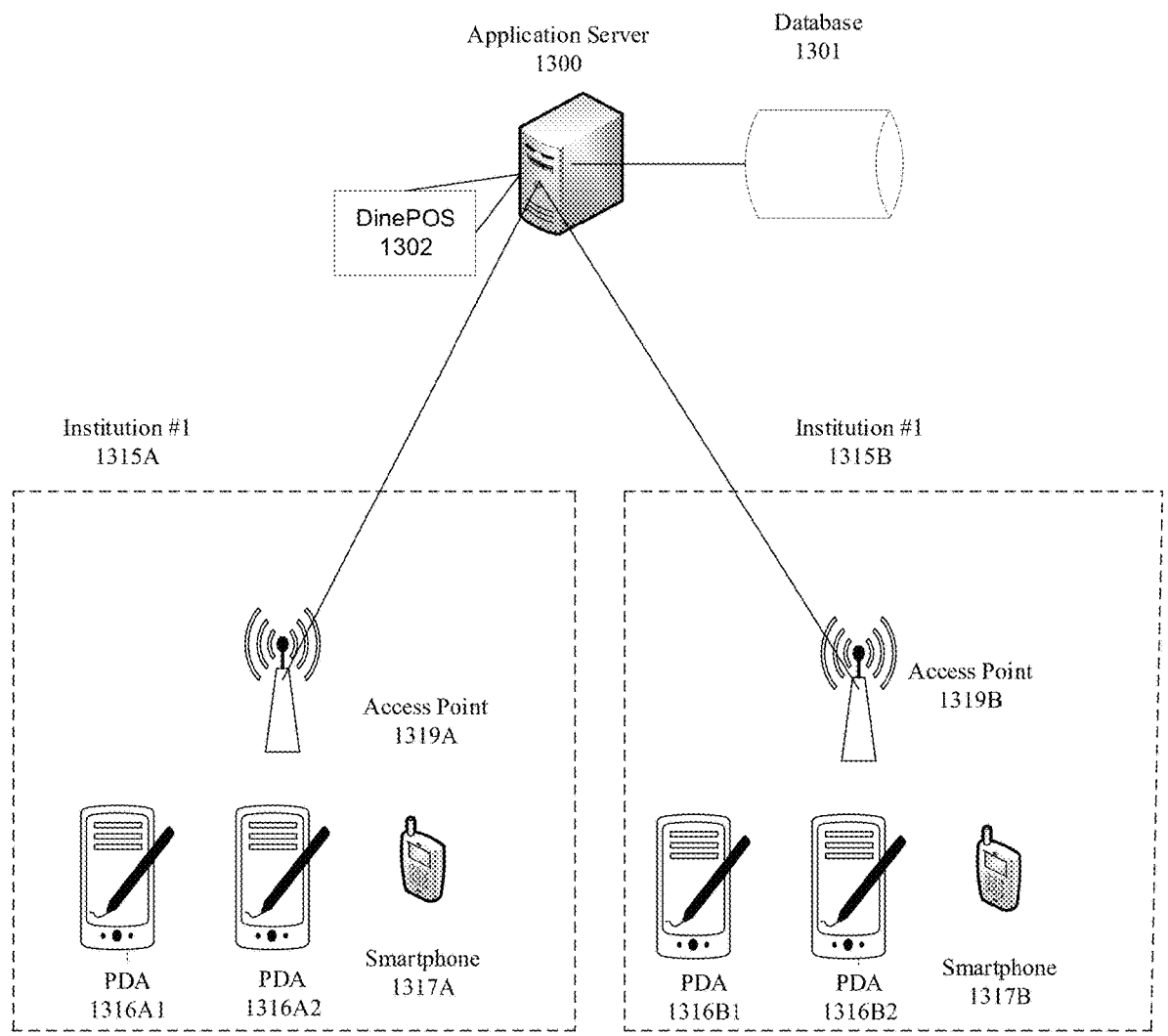
FIG. 13 illustrates another network arrangement for multi-level network-based access coordination, according to an aspect of the present disclosure.

FIG. 13 illustrates another network arrangement for multi-level network-based access coordination, according to an aspect of the present disclosure.

In FIG. 13, institution #1 1315A is representative of a first establishment such as a restaurant, and institution #2 1315B is representative of a second establishment such as a restaurant. The application server 1300 and database 1301 are used to provide centralized services to institution #1 1315A and institution #2 1315B. Of course, the application server 1300 is also representative, in this case of a service provider that provides services for multiple distributed entities using multiple levels of access and coordination for such services. The application server 1300 specifically runs a DinePOS application 1302 that, when executed, provides services as described herein. The DinePOS application 1302 is part of the DinePOS module, which also includes functional software on POS terminals and other computing devices local to the institution #1 1315A and institution #2 1315B.

In FIG. 13, an access point 1319A for institution #1 1315A may be connected to, for example, a broadband network that interconnects the access point 1319A and the application server 1300. An access point 1319B for institution #2 1315B may be connected to, for example, the same or a different broadband network, that interconnects the access point 1319B and the application server 1300.

PDA 1316A1, PDA 1316A2 and smartphone 1317A are POS terminals representative of POS systems, and can be used by, for example, employees at institution #1 1315A. PDA 1316B1, PDA 1316B2 and smartphone 1317B are POS terminals representative of POS systems, and can be used by, for example, employees at institution #2 1315B. The various points of sale described herein can communicate wirelessly via access point 1319A and access point 1319B on local wireless networks as employees move about the environment within institution #1 1315A and institution #2 1315B. As described herein, other computers and computing systems with different levels of access and different functions may also be connected with the application server 1300 and may be used by managers to oversee management and coordination of services provided by institution #1 1315A and institution #1 1315B.

Figure 14:
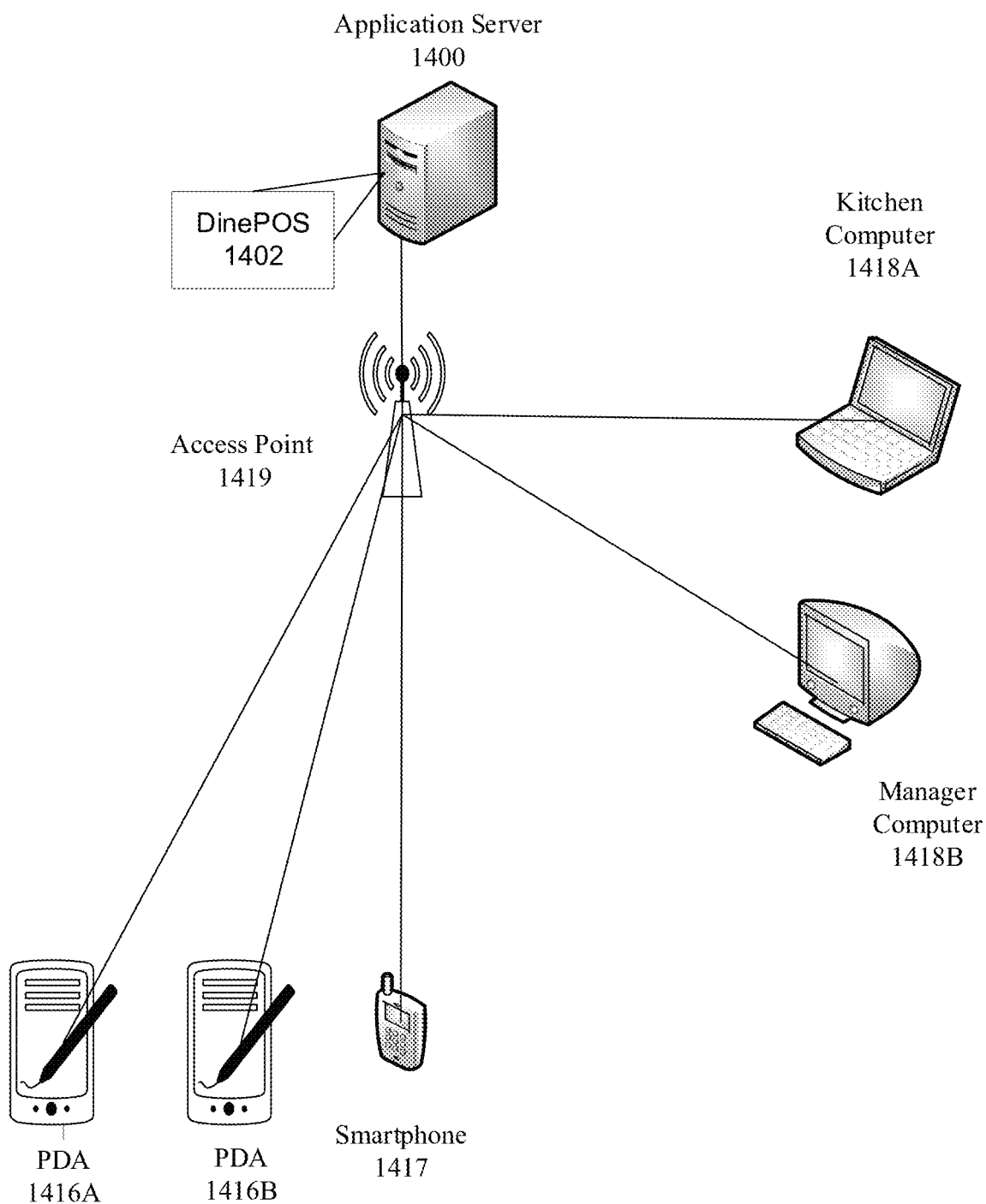
FIG. 14 illustrates another network arrangement for multi-level network-based access coordination, according to an aspect of the present disclosure.

FIG. 14 illustrates another network arrangement for multi-level network-based access coordination, according to an aspect of the present disclosure.

In FIG. 14, an application server 1400 may be provided remote from an institution. The application server 1400 is representative of infrastructure such as computers of any type, memories of any type, and software of any type, used to provide distributed services to multiple different institutions to assist in managing services provided by the different institutions. The application server 1400 specifically runs a DinePOS application 1402 that, when executed, provides services as described herein. The DinePOS application 1402 is part of the DinePOS module, which also includes functional software on POS terminals and other computing devices local to establishments and employees.

Within or proximate to an institution, an access point 1419 is used to coordinate communications between the institution and the application server 1400. The access point 1419 may provide communications links with a kitchen computer 1418A, a manager computer 1418B, a PDA 1416A, a PDA 1416B and a smartphone 1417.

The kitchen computer 1418A is labeled as such for purposes of explanation but is representative of a computer that is used for limited purposes by a limited group or subgroup on behalf of an institution. In the instance of restaurants, a kitchen computer 1418A is used for and/or by the kitchen to receive, prioritize, and output (e.g., display) orders received from POS terminals. Thus, the kitchen computer 1418A is representative of computers used to convey orders to workers who will fulfill the orders. The kitchen computer 1418A may be specifically configured to implement functions unique to a particular environment, particular group of people, particular purpose and so on.

The manager computer 1418B is labeled as such for purposes of explanation also but is also representative of a computer that is used for limited purposes by a limited group or subgroup on behalf of an institution. In the instance of restaurants, a manager computer 1418B may be used by a manager to monitor order flow and fulfillment, staffing levels and performance, and payment details such as credit card usage including tipping.

The PDA 1416A, PDA 1416B and smartphone 1417 are representative of POS terminals, and are used to take orders and payments from customers. The orders are transmitted to the kitchen computer 1418A to enable the kitchen staff to prepare the orders. Information from the orders is also provided to the manager computer 1418B, to allow a manager to monitor workflow, employee performance in servicing the orders, and other details related to the orders.

Figure 15:
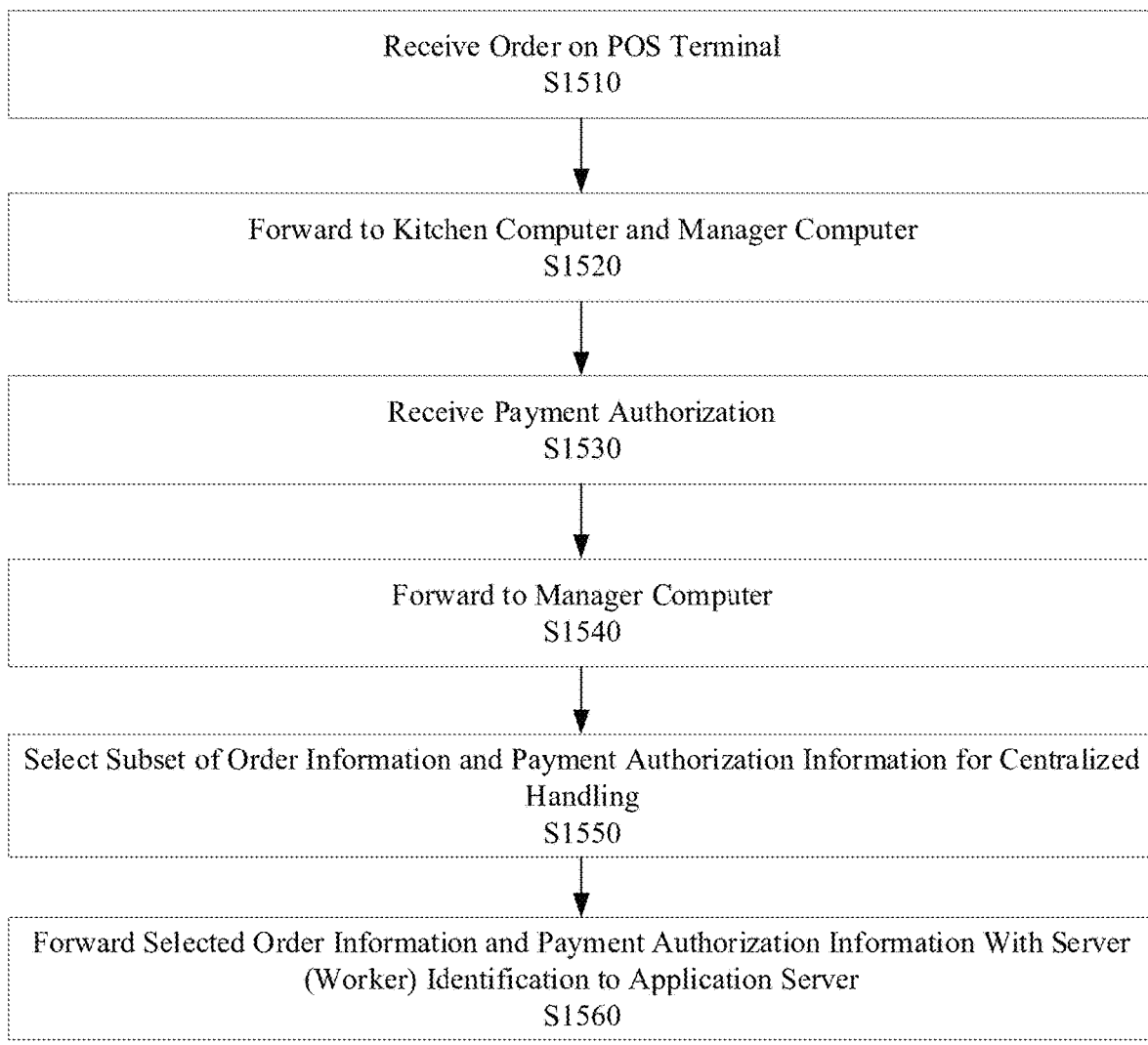
FIG. 15 illustrates another process for multi-level network-based access coordination, according to an aspect of the present disclosure.

FIG. 15 illustrates another process for multi-level network-based access coordination, according to an aspect of the present disclosure.

In FIG. 15, the process starts at S1510 when an order is received via a POS terminal. At S1520, the order is forwarded to the kitchen computer 1418A and the manager computer 1418B. It may be that the information forwarded to the kitchen computer 1418A is different than the information forwarded to the manager computer 1418B. For example, the information forwarded for the order to the kitchen computer may be a table identification such as a number, a server identification such as a first name, menu information for each guest at a table and corresponding information showing the seat position for each guest at the table. On the other hand, information forwarded to the manager computer 1418B may be server information, a time of the order, and a summary of the order.

The order information may be correlated with payroll information processed by the GigPay module described herein, and with inventory information processed by another module described herein. That is, order information is reflective of when a worker is working, and so can be used by the GigPay module to correlate payment requests for the worker. On the other hand, order information is also reflective of how much food is being ordered, so that inventory management procedures can be updated based on the volumes of food being ordered for consumption. Therefore, the modules described herein can use the same set of information in different ways and for entirely different purposes.

At S1530, payment authorization is received for the order. Payment authorization may be credit card information or debit card information obtained from scanning a credit card or debit card at the POS terminal or another terminal. The payment authorization may also be correlated with payroll information, insofar as payment authorizations may include tips that are to be credited to a server.

At S1540, payment information is forwarded to the manager computer 1418B. Payment information is of obvious value to a manager, such as to show aggregate revenue streams for an institution or even for an individual worker.

At S1550, a subset of order information and payment authorization is selected for centralized handling. The subset may be stripped of any information that can be compromised, such as customer names, or credit card numbers or debit card numbers, and so on. Nevertheless, insofar as such information can be used to verify how much a worker has earned, how much inventory an institution has used, and other details that can be used for centralized management purposes, the subset of information can be aggregated and used at a broader level to provide services via the application server 1300 and the application server 1400.

At S1560, the selected order information and payment authorization information is forwarded with server (worker) identification to the application server 1300 or the application server 1400. The server identification is used to verify that the server is entitled to payment for their services, such as for tips received from customers, hours worked based on verified times of service, and so on. The information forwarded at S1560 is representative of the different kinds of information that can be forwarded for different purposes to a centralized management system such as the application server 1300 or the application server 1400.

DinePOS therefore replaces and enhances functionality formerly implemented solely within an establishment, such as at POS terminals, and is designed to work with existing (legacy) touch screen POS systems as well as tablets, smartphones, and smartwatches. In the embodiments of FIG. 13 and FIG. 14, the DinePOS module provides applications that are installed on POS systems such as PDA 1316A1, PDA 1316A2, smartphone 1317, PDA 1316B1, PDA 1316B2, and smartphone 1317B. DinePOS also provides different applications or functionality that is installed on the kitchen computer 1418A and manager computer 1418B. As a result, different levels of access and functionality can be provided to different users and different computers for each establishment that uses the DinePOS module.

Figure 16:
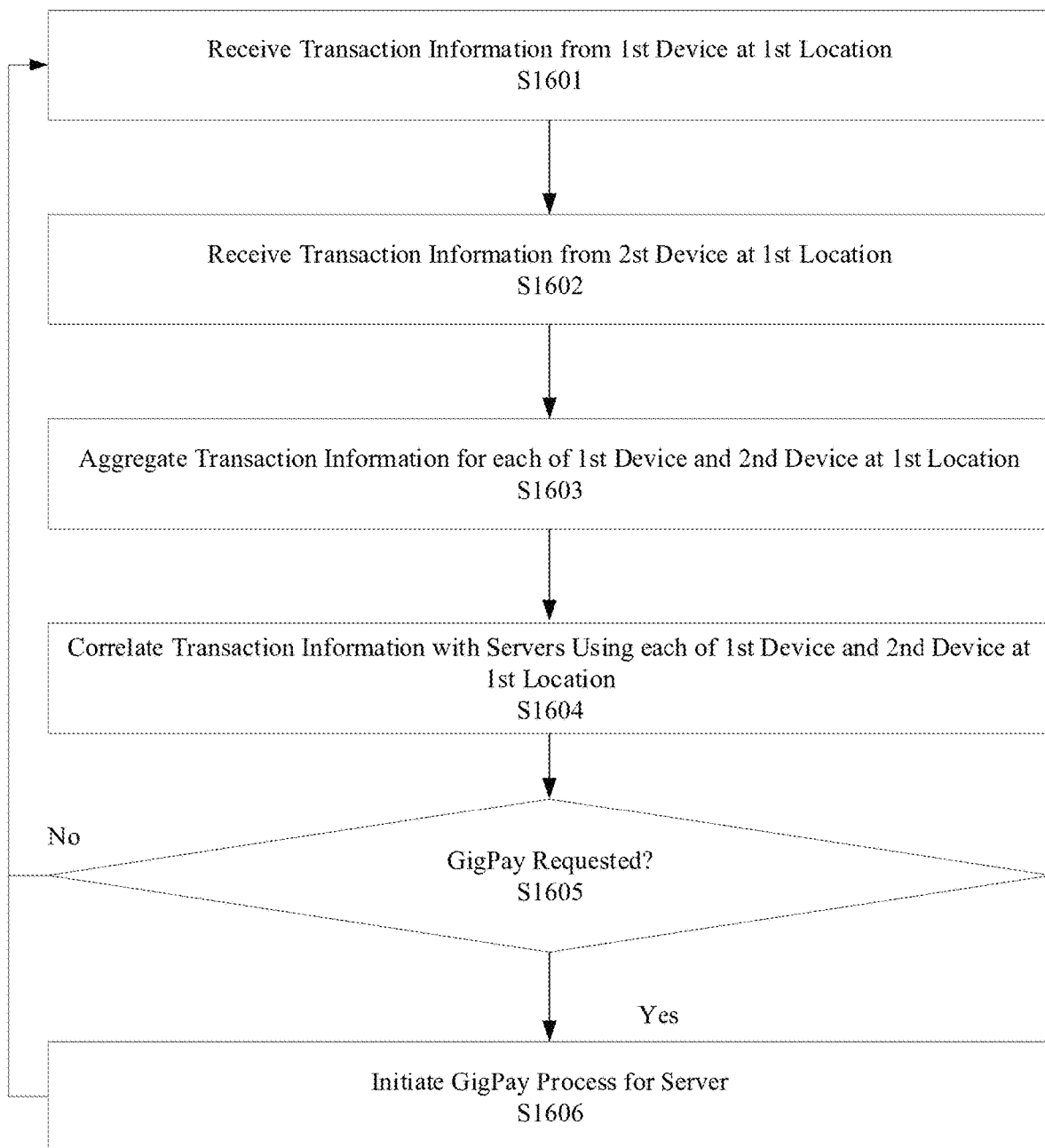
FIG. 16 illustrates a process for coordinating points of sale using multi-level network-based access coordination.

FIG. 16 illustrates a process for coordinating points of sale using multi-level network-based access coordination.

In FIG. 16, the process starts when transaction information is received from a first device at a first location (establishment). The first device may be a POS device, and the first location (establishment) may be an independent restaurant that uses services provided by the application server 1300 or the application server 1400. In the embodiment of FIG. 16, POS applications are customized for each location, and are installed on mobile/portable devices used by employees taking orders from customers at each location.

At S1601, transaction information is received from a first device at the first location. At S1702, transaction information is received from a second device at the first location. S1601 and S1602 may occur once, several times, dozens or times, hundreds of times, or even thousands of times in a single day. The transaction information may be sent and received for each transaction, or periodically, such as every minute or every five minutes.

For example, the DinePOS module can be provided as an application or application version that is installed on or downloaded to legacy touch screen POS systems, tablets, smartphones, and smartwatches. The application can then be configured to match the particular environment where it will be used, such as a particular restaurant, year, season, month, week, day, time, shift, user, manager, or other variables that could affect what is being offered for sale and sold via the DinePOS module.

The DinePOS application or application version may be written in Java and can be run on any operating system (OS) while offering security and encryption. For example, one version of the DinePOS application can be run on a Mac OS, another version on a Windows OS, and another version on a Linux OS. Additionally, orders entered via the DinePOS application can be securely routed to a central computer such as application server 1300 or application server 1400, in addition to different computers used within the respective establishments in which the orders are generated. As noted previously, the information related to an order may be parsed before being sent to other computers, such as to protect customer privacy, to narrow information to that which is used on the other computers, and in other ways.

For maximum speed and robustness, the DinePOS application or application version can be run from an onsite desktop computer, an onsite laptop computer, an onsite tablet, or an onsite smartphone connected to the internet by private LAN, Wi-Fi, and/or cellular connection. Any of these computers may serve as a kitchen computer 1418A or manager computer 1418B. Insofar as the DinePOS application is used to enter orders and obtain payments from customers, the orders and payments can be centrally coordinated and confirmed, such as at one or more terminals provided for a kitchen and another one or more terminals used by managers.

The content provided to a kitchen via DinePOS applications may be different than that provided to a manager. For example, the kitchen may receive only orders confirmed from terminals on which the orders are entered, whereas the managers may receive amounts due and payment details from the terminals on which the payments are entered. Of course, managers may receive both the kitchen information and the amounts due/payments details and other information that is only selectively available to other devices such as a kitchen terminal.

Redundant internet connections and power options can also be provided to allow establishments the ability to continue operation when systems fail. For example, the DinePOS application may run both locally and in the cloud at the same time. In this way, the local application can update the cloud application periodically, such as every 30 seconds, 1 minute or 5 minutes. Additionally, the local application can perform a fast save of current data and attempt to synchronize with the cloud application when a predetermined event is detected such as a power failure, communications connection failure, so that monitoring of conditions helps ensure that data is not lost when power or communications fail.

Orders sent through a POS terminal can travel locally to an onsite server through Bluetooth beacon, private LAN or Wi-Fi network, or through a public cloud such as a wide area network (WAN) provided by a cellular provider. Orders can be dispatched from the local server to the kitchen computer 1418A and copied, partly or fully, to the manager computer 1418B, as well as to the application server 1300 or application server 1400.

In embodiments, establishments may forego local computer servers entirely and rely solely on a cloud-based POS system to dispatch orders remotely to internet connected devices such as ticket printers or order displays for a kitchen computer 1418A. In these embodiments, the functionality provided by the application server 1300 and application server 1400 is primarily used to accept orders and payments by PDA 1316A2, PDA 1316A2 PDA 1316B1, PDA 1316B2, smartphone 1317A, smartphone 1317, and the analogous devices from FIG. 14. Accordingly, information provided to a ticket printer, order display, or even a kitchen computer 1418A or manager computer 1319 may be a full or partial copy of the information being managed by the application server 1300 or application server 1400, rather than the vise versa when the application server 1300 or application server 1400 is copied with information being managed at each location by a local server.

Figure 31:
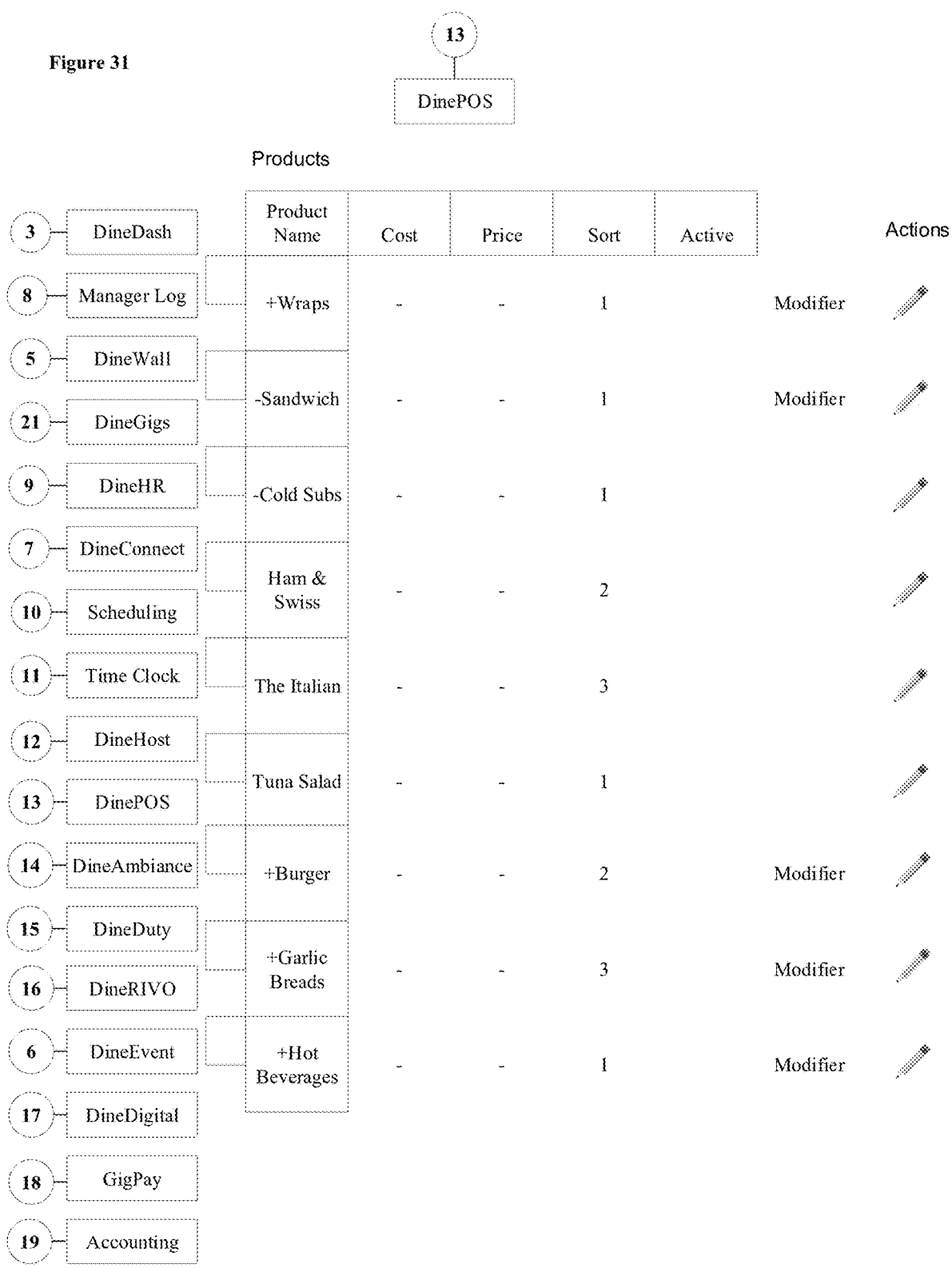
FIG. 31 illustrates an exemplary DinePOS user interface of an application for multi-level network-based access coordination.

FIG. 31 illustrates an exemplary DinePOS user interface of an application for multi-level network-based access coordination.

In FIG. 31, the DinePOS user interface is a user interface that may be used by an employee serving customers. The DinePOS user interface shows products by name, cost, price, number, and whether the products are active (i.e., available) or not. Product types with multiple underlying products may be provided in expandable and contractable sets so that the presence can be minimized on the user interface to reduce confusion when appropriate.

Using the user interface in FIG. 31, the employee can take orders from customers on a POS terminal with the DinePOS application installed thereon. The orders may be automatically routed to one or multiple destinations such as a kitchen computer or even just an electronically addressable kitchen display, so that food preparation personnel can see the order. The order may be arranged in the order it arrives, for instance. Additionally, because the items in the order are described by predetermined recipes, orders may be broken up by recipe for partial display on different displays spread around the kitchen. In this way, the DinePOS module may automatically route specific dishes from an order to appropriate parts of the kitchen so that appropriate personnel can view the dishes. When orders are broken up and displayed in subsets at different areas of the kitchen, the displays may still be synchronized to ensure the order components are made available around the same time and/or in the proper order.

In an embodiment where the establishments utilize local servers, the local servers may transmit all data to the cloud simultaneously when the data is recorded (or vice versa). In this embodiment, the application server 1300 or application server 1400 manages a full set of the information in parallel with the local server, and this may be an additional service provided herein. In this instance, the redundant cloud-based system may be in submissive mode until local systems fail, in which case the cloud-based system intelligently recognizes the failure and becomes dominant and indistinguishably resumes normal operation until local servers come back online.

As for the POS systems, workers may have the ability to download a DinePOS application to their personal device, or the DinePOS application may be installed on a provided device provided from the establishment where the worker(s) work. In this way, an employee can log in to the DinePOS application on a personal device, select their employer, and obtain the menu being offered via the application server 1300 or application server 1400. On the other hand, a provided device may be set to only the configurations for the restaurant for which the provided device is provided and may be updated via a local sever or the remote application servers whenever the menu is updated.

In another embodiment, an employee hired through the DineGigs module and/or the DineHR module may result in the DineGigs mobile application updating the next time the DineGigs mobile application is opened and signed in, reflecting the status change. Devices such as tablets supplied to employees for use as POS terminals can be assigned to the employees on a shift-by-shift basis as an alternative to the personal devices, such as when personal devices are disallowed. Even the provided devices can be protected from unauthorized use, such as by requiring employees to log in during predetermined hours at a predetermined location (i.e., restaurant) from a predetermined (assigned) device. This ensures employees cannot log in using another employee's access credentials as the employees will only be able to access their own order entry interface from the assigned device.

In an embodiment, the DinePOS applications can be downloaded and supported on legacy terminals, using personal identification numbers or swipe credential access.

If an employee is permitted order entry or other DinePOS permissions in the onboarding process, the DinePOS application and/or other DineGigs applications in the suite may update with local keychain information and protocols of the POS terminal as configured. For example, the DineGigs application for the establishment's management may be updated to show the employee as eligible for time and attendance scheduling, network access, and so on. In this way, a new employee can be initially onboarded into the DineGigs system and/or later into a domain for a particular establishment without publicly sharing system access information with the employees and allowing secure end-to-end virtual private network (VPN) encryption.

The DinePOS module may also utilize multiple verification methods to ensure an employee should have access to the DinePOS module and order entry functionality. For example, the DinePOS module may "test" geolocation to ensure the employee is on site. The DinePOS module may also refer to the DineGigs Online Shift Scheduling to confirm the employee is scheduled to work and clocked in via the DineHR module and/or Time Slips. Therefore, entirely different modules with entirely different purposes may cooperate to ensure accuracy of records.

Should an employee be on site but not scheduled to work, the manager(s) on duty may receive a notification via a DineDash module used by a manager when a DinePOS application is opened by the employee at the location. A manager may have the opportunity to override the objection and allow the employee to clock-in and enter orders via the DinePOS module, so that the DineGigs Online Shift Scheduling is updated dynamically.

Whenever an order is entered via the DinePOS application, a check to ensure the employee is "logged in" occurs, to ensure the employee is signed into the DineGigs system. Once an employee clocks-out or leaves the premises, the employee is logged out of the DinePOS application until the employee returns even if the employee is on the schedule. Otherwise, the employee is logged out the DinePOS application until the employee's next shift. This allows employees to work at multiple establishments utilizing the DineGigs system, to experience a seamless, intuitive experience of having the correct POS appear when the application is opened.

Due to costs, most restaurants currently have only a few POS terminals with several employees competing for their use. Overwhelmingly, much of the delay experienced by customers waiting for food or drinks in a busy restaurant is founded in employees needing to wait extended times to input their orders, as this alone can add 3-5 minutes to the wait for food or beverage. Using tablets and smartphones brings restaurants unparalleled efficiency in order flow, and this is true whether the tablets and smartphones are those belonging to the employees or provided by the restaurants. The ability to transmit orders from the table also helps improve order accuracy while eliminating redundancy.

The POS systems (e.g., POS terminals) described herein may also be integrated with a smartwatch. For example, an individual (e.g., employee) may be provided with notifications via a smartwatch, such as that a new table has been sat, that a food order is up, that a drink order is up, and so on. In this way, the smartwatch may provide the notification in lieu of, or in addition to, the POS such as a tablet or smartphone. The notifications by the smartwatch may be physical, such as a buzz, audible such as an alarm or alert, visual such as a flashing screen or flash on the screen, or may be any combination of physical, audible, and/or visual.

The integration of the POS and the smartwatch improves customer experience by allowing staff to communicate the most common notifications without disrupting service. Additionally, the use of a smartwatch attached to a wrist may help alert aloof staff to matters needing their attention urgently, such as with the physical notifications described above. As an example, an establishment may set which notifications are to be made by smartwatch, as the notifications that may require attention most commonly may vary among different establishments. In this way, different establishments may have different profiles stored at an application server 1300 or an application server 1400.

Further, the POS systems described herein can also help ensure payment security. For example, when time for the check comes, those paying by credit card use the phone or tablet interface to complete their transaction, and the phone or tablet interface may record via front facing camera-enabled phones and tablets. This helps hedge against charge-back schemes by those fraudulently claiming their credit card had been stolen to avoid paying the tab.

Users of the DinePOS module may be offered the option to use credit card clearing offered via the DineGigs system, so as to obtain all of the features of the DineGigs system including sponsoring opportunity board advertisements on a local or national basis.

Most restaurants are already paying a fee to process credit cards and are receiving none of the benefits of the DineGigs ecosystem, so this aspect would only provide a benefit to the restaurants for around the same price the restaurants are already paying.

The DineGigs system may be used to service hundreds of thousands of operator-owned restaurants in the United States. Each restaurant in turn may process numerous credit cards every day via DinePOS applications on POS terminals.

In an embodiment, a web module may be used by an establishment (e.g., a manager) to configure the DinePOS module. For example, using a web module a manager may create and input variables for the DinePOS module particular to the establishment. The configuration can be used to allow features such as the DinePOS applications installed on smartphones, tablets and legacy hardware systems.

DineDash Module—005

The DineDash module provides a dashboard for an establishment where a manager can manage daily functions of the establishment involving the DineGigs system. The DineDash module also provides a dashboard for individual users to interact with all application modules the manager uses in the DineGigs system as well of those of establishment. Accordingly, an establishment can utilize the dashboard to manage all aspects of their restaurant business and interact with employees, and individuals can use the dashboard to manage aspects of their experience with the DineGigs system including their employer(s).

The functionality of dashboards will vary for different types of users and different types of permissions are made available to the users. For example, a dashboard will vary depending on whether the user is an employee or manager. Additionally, a dashboard will vary depending on what permissions have been allocated to the user. The permissions allocated to users include some permissions available to all employees (e.g., access to premises and the Time Clock), some determined by employer (e.g., access to DinePOS management functions), and some selectively activated by employees (e.g., GigPay). Accordingly, dashboard features for different users will vary.

Figure 21:
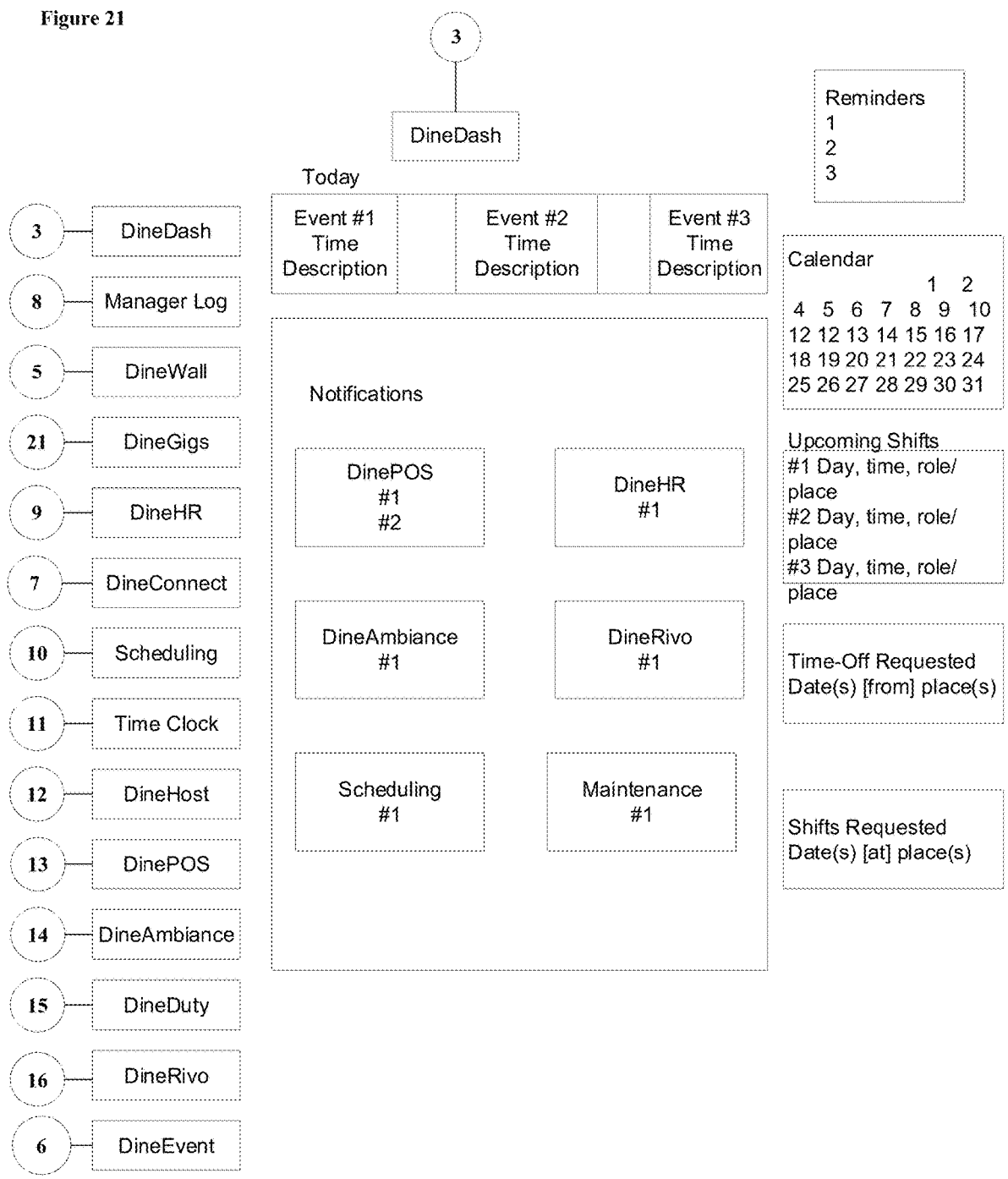
FIG. 21 illustrates an exemplary DineDash user interface of an application for multi-level network-based access coordination.

FIG. 21 illustrates an exemplary DineDash user interface of an application for multi-level network-based access coordination.

In FIG. 21, the DineDash module provides a dashboard for a manager who manages an establishment (Spago). On the left side of the dashboard, selectable links are provided to Manager Log, DineWall, DineGigs, DineHR, DineConnect, Scheduling, Time Clock, DineHost, DineAmbiance, DineDuty, DineRivo and DineEvent. Selection of any of the selectable links here or elsewhere will result in navigation to a user interface for the module of the DineGigs system corresponding to the selected link.

The DineDash user interface in FIG. 21 also includes a calendar of three events for the current day at the top, general reminders at the upper left, a coded calendar on the right, a section for upcoming shifts on the right, notifications for time-off requests and shift requests on the right, and managerial notifications in the middle. The managerial notifications in the middle list which other module of the DineGigs system are involved, and what is involved in the notifications. For example, the DinePOS notifications may be that an employee has sent a checkout request, and that another employee has requested a manager override for a bill.

Figure 20:
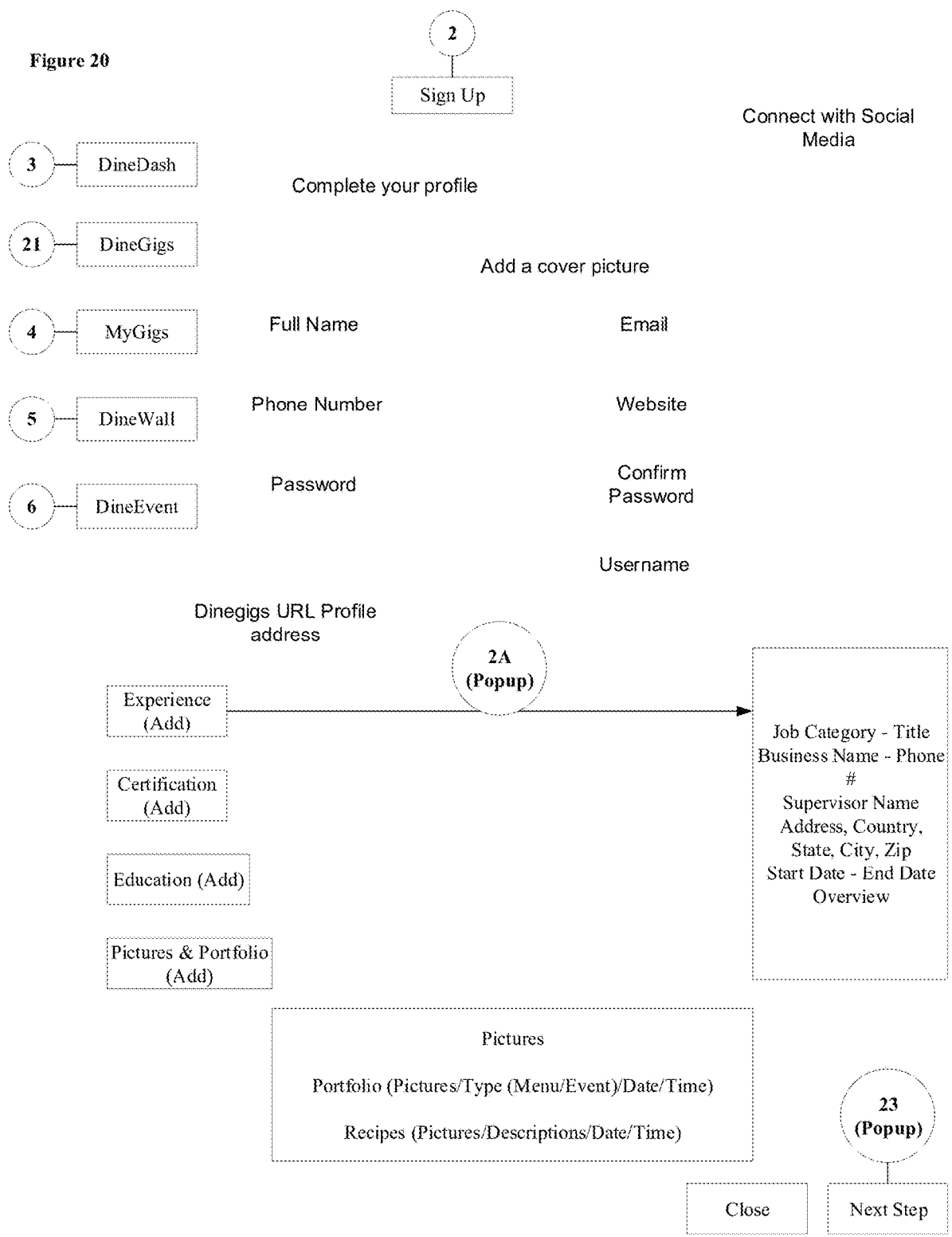
FIG. 20 illustrates an exemplary Sign Up user interface of an application for multi-level network-based access coordination.

For a new individual user, a DineDash user interface may be set up from a Profile Setup module at the very beginning of the DineGigs experience when the new user opens the DineGigs application, lands on the welcome DineGigs home page where jobs are listed and selects a link to log in. On the other hand, if the user does not yet have a DineGigs profile, the user may sign up for a DineGigs profile using a user interface dedicated to facilitating signing up as shown in FIG. 20 and discussed later. Once the user signs up, the new individual user may be redirected to the Profile Setup user interface in order to create a DineGigs profile via a Create Profile menu. The Profile Setup user interface that is used to create a user profile may, like all or almost all other user interfaces described herein, includes selectable links to user interfaces for other modules on the left side. The selectable links on the left side may remain visible throughout the process. The user is next guided through an interactive process via and/or from the Create Profile user interface in order to Add Experience on the next user interface. Once the new user is done adding experience, the user may be returned to a DineDash menu that shows their completed profile as the dashboard starting point, with the menu of selectable links for the user on the left side.

A Profile Setup process parallel to the one described above for new individual users is made available to new establishments, such as once a manager creates or confirms their individual user profile as described above. For new establishments, the Profile Setup user interface may include a selectable Create Business Page tab available from the Create Profile menu described above. The Create Business Page may only be made available for certain types of individual users, such as those who describe themselves as owners or managers in their individual DineGigs profiles. Once the profile for the business page is created, the manager for the establishment is returned to a DineDash dashboard user interface for the establishment. Where the individual user's name previously appeared, the name of the business for the newly-created business page appears.

A manager may be able to switch between their individual Dashboard and the DineDash dashboard for establishment managed by the manager. For example, managers or other classes of users responsible for establishments may be provided with selectable options such as "Switch Profile" or "Switch Dashboard", so that users can switch between their personal profile or dashboard and their establishment's profile or dashboard. When "Switch Profile" or "Switch Dashboard" is selected, the DineDash user interface may change in accordance with the selection. Additionally, in the event that a manager or owner is responsible for multiple establishments, the "Switch Profile" or "Switch Dashboard" selections may allow the manager or owner to view and select among the multiple establishments from their single individual user DineDash dashboard.

As noted above, on the left side of the DineDash dashboard and many or most other user interfaces of the DineGigs system, selectable links are provided to other modules of the DineGigs system. The selectable links to available modules from the DineDash dashboard and other user interfaces may be highlighted by color of text and/or background, while links to links modules unavailable to the user can be made the same color as the background.

When the individual user elects to create a DineGigs profile for an establishment, an option to Create Business Page may be provided even after a page for another establishment has already been created by the same manager. When multiple establishments are to be linked to one manager, an option to create a Business Group may be newly provided upon the selection of the Create Business Page by a manager already associated with an existing Business Page. The Create Business Group link may allow an owner or manager of multiple establishments (e.g., multiple restaurants locations for a chain) to generate a Business Group profile and DineGigs dashboard. The Business Group dashboard allows an owner or manager to quickly view performance and manage all establishments from a single dashboard.

When "Create Business Group" is selected, a new series of questions may appear with a user interface for the Create Business Group option. The questions may include:
Name Business Group
Is this Business Group or Management Company incorporated? Yes (radio) No (radio).
The manager or owner may then be able to select from among a list of establishments associated with the owner or manager.
The manager or owner then selects the establishments to group and can then be taken to the DineDash dashboard for the new Business Group or Management Company.

DineDash Left Menu Categories for Business Users

Examples of the links to modules available on the left side of the DineDash dashboard appear below, though many, most or even all of these links may be made available to the users on the left side of other modules too. Nested Bullet points are some of the links that appear on each page when a main bullet is clicked and are not selections nested under the links on left menu. DineDash page provides all action items for managers and owners. Links on the DineDash menu may include DineDash, a Manager Log, DineWall, DineHR (Human Resource), Scheduling, Calendar, Manager Log, ResConnect (connect to OpenTable and other reservation software), DinePOS, DineRIVO, WeNeed, DineDuty, DineEvent, DineConnect, DineSecure, GigPay, Messaging, Accounting, DineAI and DineOnline.

A scheduling link may provide information of or links to a current schedule, an unpublished schedule, employee availability, time off requests, shift requests, requests to trade shifts, a time clock, and settings. For example, a current schedule may be a published schedule. An unpublished schedule may be used for planning upcoming schedules.

The ResConnect link may allow a connection OpenTable and other reservation software.

The DineRIVO link may be information of or a link to Recipe Management, Inventory Management, and Vendor Order Management.

DineDash Left Menu Categories for non-Business Users may include: DineWall, DineDash, Time Clock, GigPay, Profile, DineGigs, Scheduling, DineDuty, DinePOS, WeNeed, My Gigs, Messaging, and Recipe Book. Additionally, a DineDash page may provide a dashboard for a user such as a manager. The dashboard may include a calendar of scheduled events, a list of reminders, a calendar with color-coded indicators, a notifications section, a scheduling section, and links to numerous other pages. For example, the calendar of scheduled events may include shifts and appointments at different places including different entities that separately subscribe to the centralized services described herein. The list of reminders may include reminders such as to call someone, or to complete a project. The calendar with color-coded indicators may include color-coded indicators for different types of events on different days, and other forms of information used conventionally on paper calendars. The notifications section may include notifications from different parts of the DineGigs system, such as from DinePos, DineHR, DineAmbiance, DineRivo, Scheduling and/or Maintenance. The scheduling section may show upcoming scheduled shifts in advance by day, time and location, upcoming time-off requests submitted and/or approved by day(s) and location, and requested upcoming shifts by day, time and location. The links to numerous other pages may include links that are specific to the user (e.g., specific to a business that employs the user (e.g., DineHR), specific to responsibilities managed by the user (e.g., Time Clock), or other links that would logically provided to the user.

In the notifications section of the DineDash page, notifications from DinePOS may indicate that a server has sent a checkout request or a manager override request, to allow a server to complete a shift or provide a discount. Notifications from DineHR may indicate a collective number of new resumes received for a position. Notifications from Maintenance may include notifications automatically sent from sensors or manually sent from individuals reporting problems such as with a HVAC unit. Thus, a user may have a dashboard that provides both general information and specific time-sensitive information.

Time-sensitive important information may be organized and highlighted to attract the attention of the user, such as by placement at the top of a page or even as a pop-up that appears on top of any page until acknowledged or even until answered by the user. Alternatively, urgent notices for the DineDash page or for any other page may result in a flashing notice in a corner to attract the attention of the user.

A connections page in the dashboard may be linked via one of several links in DineConnect. The connections link may be included among other links such as for email, voicemail, instant message (IM), customer relationship management (CRM) and cloud. The connections page may show links to people and restaurants a user is following, people and restaurants who are following the user, and people and restaurants who the user follows and who are following the user. The connections page may also show colleagues, such as current and/or former coworkers.

Scheduling Manager Module—006

Once an employee has completed all forms and documentation required by the DineHR module including ad hoc acknowledgements, the employee can then be added to the restaurant's employee roster where the employee can be integrated into the shift schedule. From the employee's DineGigs profile the employee may be able to submit requests for time off, availability, or shift swap and managers will be notified of requests on their personal DineGigs profile page (or via the DineGigs application), where the managers will have ability to approve or disapprove requests. An employee user can access information (e.g., view) their upcoming shifts on the employee's integrated private calendar via their DineGigs application or profile page, where the employee can also enter personal calendar details—no employer will be able to access (e.g., view) private entries on employee calendars. If an employee user works for two or more restaurants also using DineGigs online shift scheduling where one employer already has a future schedule published where an employee is scheduled to work, DineGigs Scheduling will not allow that employee to be double scheduled.

Figure 28:
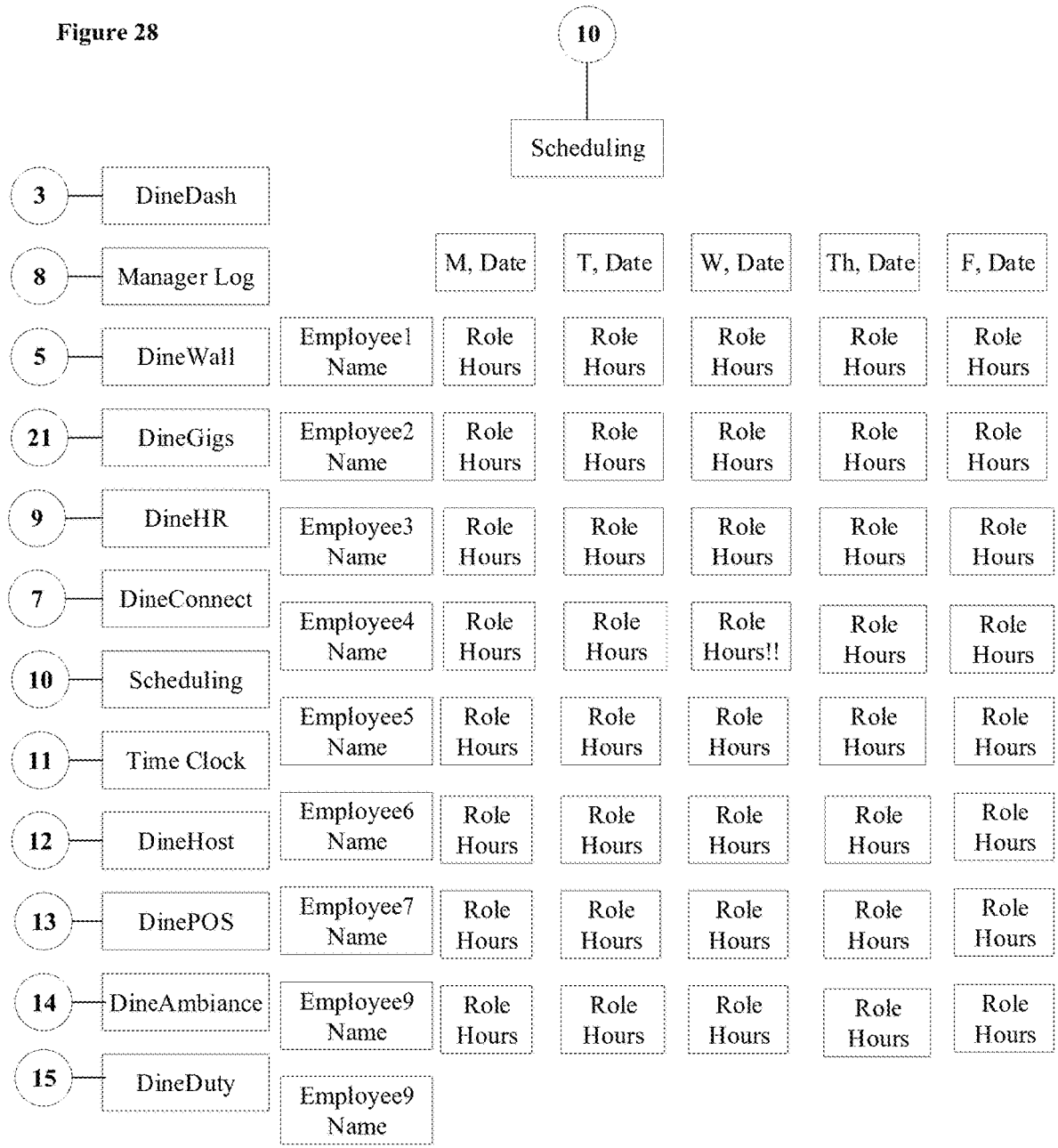
FIG. 28 illustrates an exemplary Scheduling user interface of an application for multi-level network-based access coordination.

FIG. 28 illustrates an exemplary Scheduling user interface of an application for multi-level network-based access coordination.

In the scheduling user interface shown in FIG. 28, employees for an establishment are listed by name, along with roles and hours for shifts on each upcoming day that will fit in the user interface. Employees may be scheduled far in advance, such as when the work every Tuesday as a server starting at noon. The user interface shown in FIG. 28 is a simplified user interface for scheduling and allows a manager to view and revise schedules for employees.

Further, in a situation where an employer finds themselves unexpectedly short staffed, the employer will be able to access (e.g., view) who on their employee roster is available to work based on employee's who've marked themselves unavailable on their personal calendar, are already scheduled to work elsewhere or could be in danger of entering overtime upon shift acceptance. Immediate notifications can be sent out to employee and freelance workers via the Scheduling application to all those qualified/selected and available to work with the push of a button from inside the DineGigs application on a smartphone. For future scheduling, DineGigs can suggest pre-filled future schedules for employees integrating availability, proper skill set, desired weekly hours, and/or employee performance ranking. Where no worker is available, freelance workers who employers pre-determine eligible to fill "pick up" shifts may be suggested to fill certain shifts. Freelance workers or entertainers will see future commitments on their personal DineGigs calendar at various establishments. Online Shift scheduling is a "loss leader" product intended to create a sticky relationship with users.

The Scheduling module may have two similar, but different interfaces dependent on whether the user is a business or non-business user. Each may land on a scheduling dashboard. A business user's dashboard may include the following basic functionality and have an interface that allows a business user to view directly or via links a:

Current Schedule
Upcoming Schedule
Time Off Requests
Shift Requests
Shift Trade Requests
Time Tracking
Reports
Settings A menu on the left may retain the appearance and functionality of the DineGigs left menu. Features listed above (as well as others) may be arranged so that DineGigs retains the overall functionality of the software suite.

The schedule planning section may feature drag and drop functionality, but also have a prominent feature called "AI Planner" that will use a proprietary algorithm to automatically plan the schedule:

Time-off, Shift Requests and Shift Trade Requests can be managed from a single page. For example, all of these can be located under a tab labelled Time-Off or may be provided in a manner similar to a tab labelled Schedule Requests.

Since employees for each location will already be created in the hiring process, the employees do not need to be loaded individually. However, a user interface is provided to manage employee permissions.

A Scheduling Business page may show scheduling for a restaurant from a manager perspective. The Business page may include lines of information for employees listed by name and dates and shifts (start and end times) along with assigned roles for the employee on each date and shift. The information may be shown in a matrix, and reordered by clicking on names, dates and shifts, or roles. For example, clicking on a date and shift may show all employees scheduled to work that date and shift, and what role each employee is assigned.

A Scheduling Employee Claim page may show the schedule matrix for employees, dates/shifts and roles, with a pop-up for a particular date/shift and role that is not yet filled. For example, the pop-up from an open date/shift may indicate that the shift is not yet filled and is available first-come/first-serve for preapproved employees qualified for the role. Alternatively, the pop-up may indicate that the open date/shift is up for auction. Viewers of the open date/shift may click on a link to claim the shift or bid on the shift, depending on how the shift is to be filled.

A Scheduling Employee Shift Request page may show the schedule matrix for employees, dates/shifts and roles, with a pop-up for a particular date/shift and role that is not yet filled. For example, the pop-up from an open date/shift may indicate that the scheduled employee wishes to change their shift, such as from a morning shift to a night shift on the same date. The request may allow the requesting employee to add a note with the reason(s) for the request, as well as to click a clickable button to submit the request as-is for approval by a manager and then presentation to other employees, or to click a different clickable button to submit the request for bidding in an auction so that other employees can bid on the opened shift.

DineWall Module—007

DineWall is a social network for the dining industry and is integrated with the DineGigs system. The social network serves firstly as a tool for corporate communication directly to employees. Once a company "hires" an employee on the DineGigs platform, the employee becomes "friends" with their restaurant employer. Any corporate communication or memos may be shown in a wall feed inside the DineGigs application or tab from desktop. Alerts may be sent requiring users to acknowledge corporate communication to access restaurant systems. Once a user creates a profile on Dine-Gigs and is "employed" by a restaurant that uses the infrastructure, the user will first see the wall feed of the social network on the application and desktop sites vs those not employed will first see the list of available jobs in the area. The opportunity board may be tabbed for user access on all platforms. Employees at the same restaurant automatically friend each other and have access to real time chat. The employees at the same restaurant also can "friend" other DineGigs users at other establishments, or friend a restaurant (as a non-employee) the employees like or may want to work for. In this way, individuals and restaurants may be given the same access to some functionality of DineGigs, while being given entirely different access to other functionality. The differing access may be the result of different applications, or different application versions, or the same applications but with different capabilities depending on the role. Every user can share content to the wall feed to be seen by followers. This offers a unique opportunity for entities to target very specific demographics related to foodservice. Targeting entities will have the ability to create non-food-service DineGigs profiles to access the network to measure their ad campaigns. Entities can also share content relevant to the foodservice industry. For example, an article featuring a recipe can be shared in the wall feed in the proprietary dot recipe (.recipe) file format. If a chef came across the article, the chef could "save to my recipes" and the recipe would integrate with the chef's personal DineGigs recipe book integrating with later Module 6—DinePOS Recipe, Inventory and Vendor Order Management. The social network becomes a critical tool for learning and harnessing the state of the art in haute cuisine.

Figure 23:
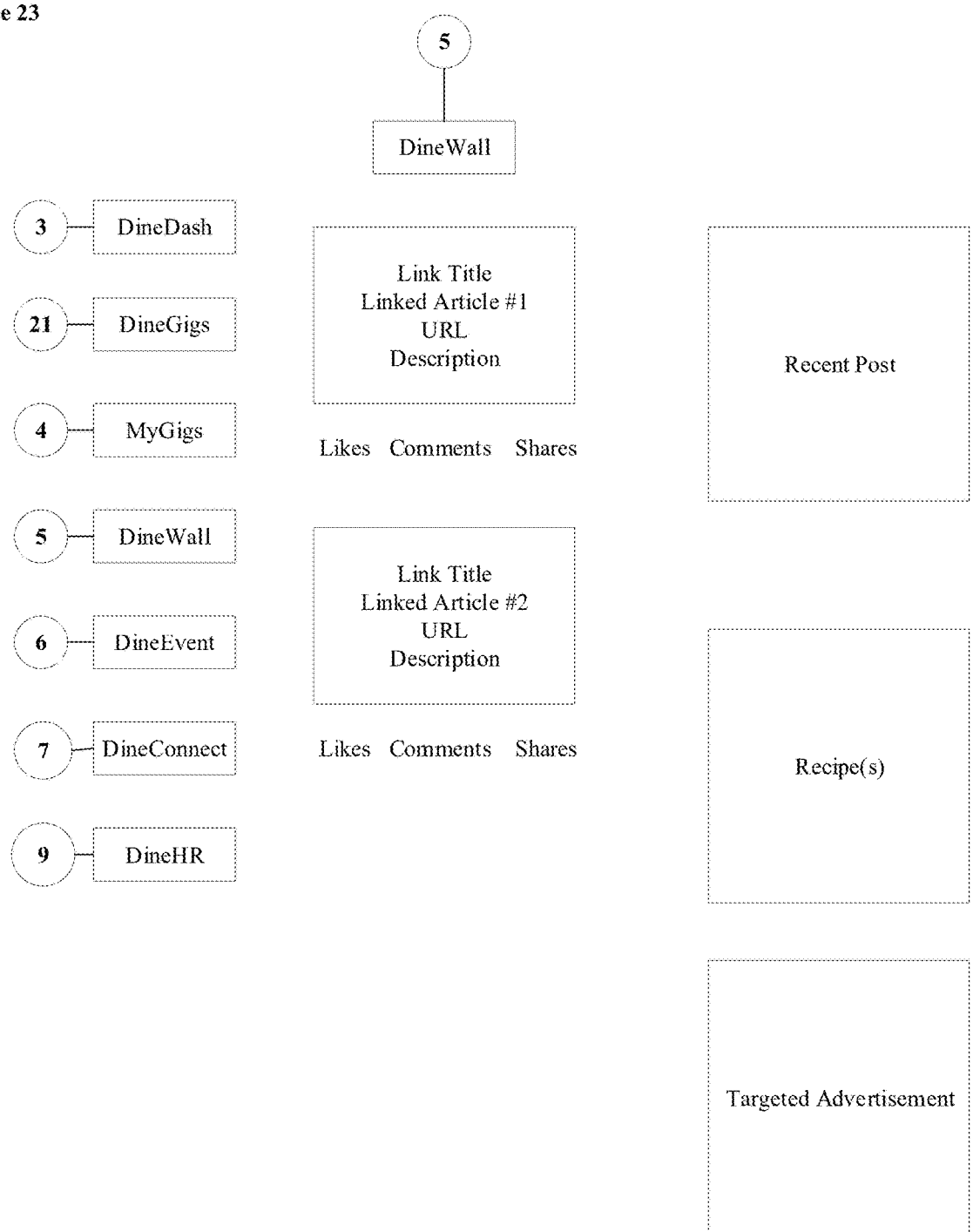
FIG. 23 illustrates an exemplary DineWall user interface of an application for multi-level network-based access coordination.

A DineWall user interface is shown in FIG. 23. As shown, the DineWall user interface may include a set of selectable links for the user on the left side. The DineWall user interface may also allow the user to post content such as links to articles, posts, recipes, pictures, and other forms of content typically posted on social media pages. Friends of the user who have DineGigs accounts and who are linked to the user on DineGigs may be able to like and comment on content posted by the DineWall user who uses the DineWall user interface shown in FIG. 23.

The DineWall module provides a personal page for a user akin to a social media page in the DineGigs system. The DineWall page may allow the user to post content including article links and pictures, describe a job search or a job opening, and generally post content similar to that found in conventional social media settings. Additionally, establishments may be able to view DineWall pages to see content from prospective or existing employees, such as recipes. Establishments may also have their own DineWall page where the establishments can post job openings, pictures, specials, and other forms of content that may be of interest to others in the DineGigs community.

Figure 41:
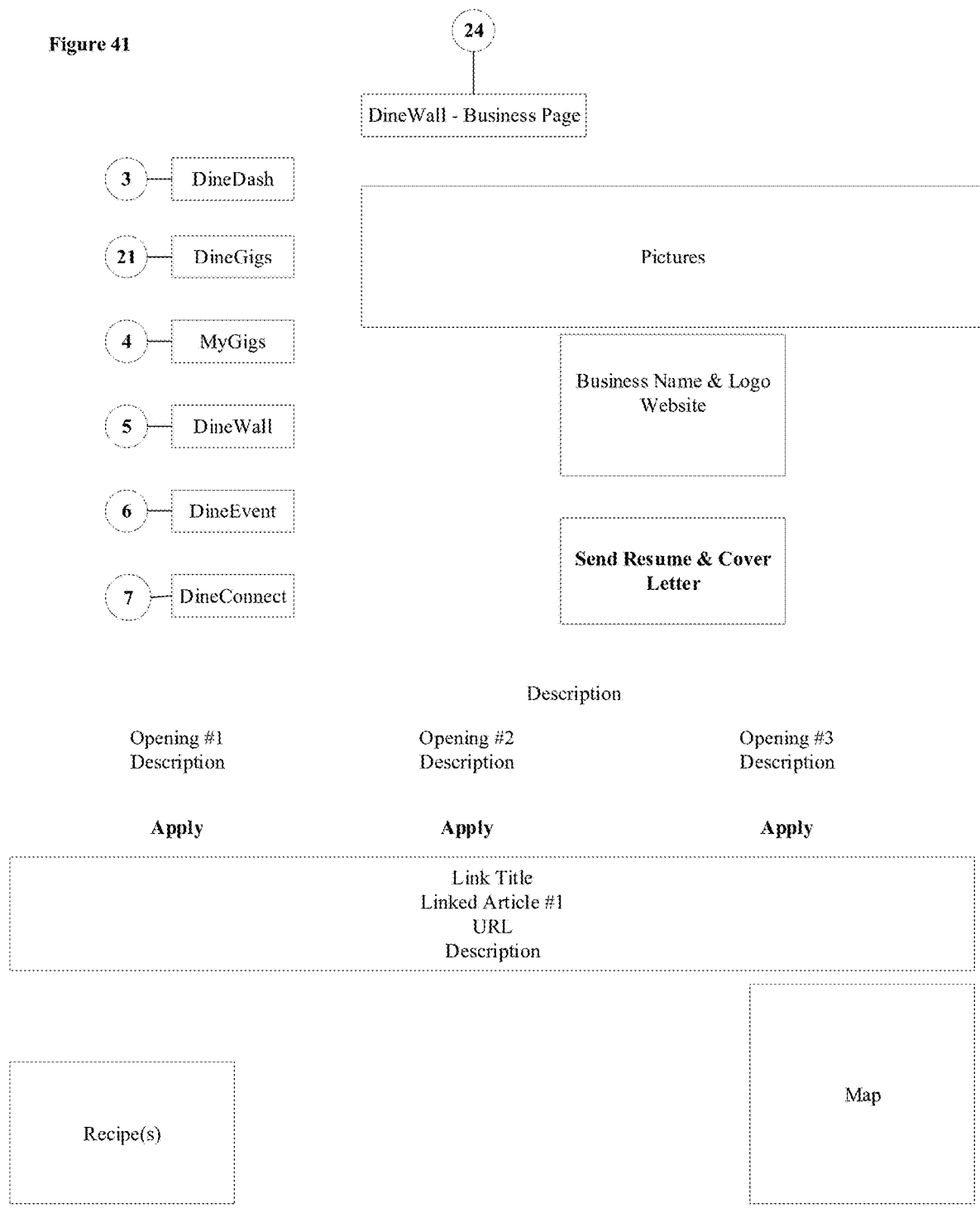
FIG. 41 illustrates an exemplary DineWall user interface of an application for multi-level network-based access coordination.

FIG. 41 illustrates an exemplary DineWall user interface of an application for multi-level network-based access coordination.

In FIG. 41, the DineWall user interface is for an establishment. The DineWall user interface for the establishment may be used as a social media outlet similar to social media pages used on other social media platforms. For example, a manager for an establishment may select pictures, images for a logo, article links and other forms of content to page. Additionally, the DineWall user interface for an establishment may be used to show employment opportunities, a map of the location of the establishment, recipes and menus offered by the establishment, and other forms of content reflective of the nature of the establishment. Functional links on a DineWall user interface for an establishment may be used to collect resumes and cover letters, such as by an email link or by an upload function.

While not shown, the DineWall user interface for an establishment may also reflect personal DineWall pages for employees, managers, owners, fans and other individuals connected in some way with the establishment.

DineTech

DineTech integrates DinePOS—a proprietary next generation POS system—into the Dine infrastructure. The DineTech modules reflect central aspects of the utility of the overall system described herein. The DineTech modules include DinePOS; DinePOS Recipe, Inventory and Vendor Order Management; DineDuty and DineEvent.

Additionally, Partner Developed Applications described herein for DineTech include DineAPI; DineAmbiance; DineOpen; and DineConnect DinePOS Recipe, Inventory and Vendor Order Management Module—008

The DinePOS Recipe, Inventory and Order Management module is also described herein as DineRIVO. DineRIVO is actually three closely related modules of the DineGigs system grouped together, relying on each other and utilizing all of the other modules in the DineGigs ecosystem. The DineRIVO modules are used to coordinate inventory via vendor orders based on knowledge of recipe requirements. More particularly, knowledge of what recipes are ordered and what ingredients and how much of the ingredients are required for different recipes is used to manage inventory by automatically initiating vendor orders when inventory threshold are crossed.

Figure 18:
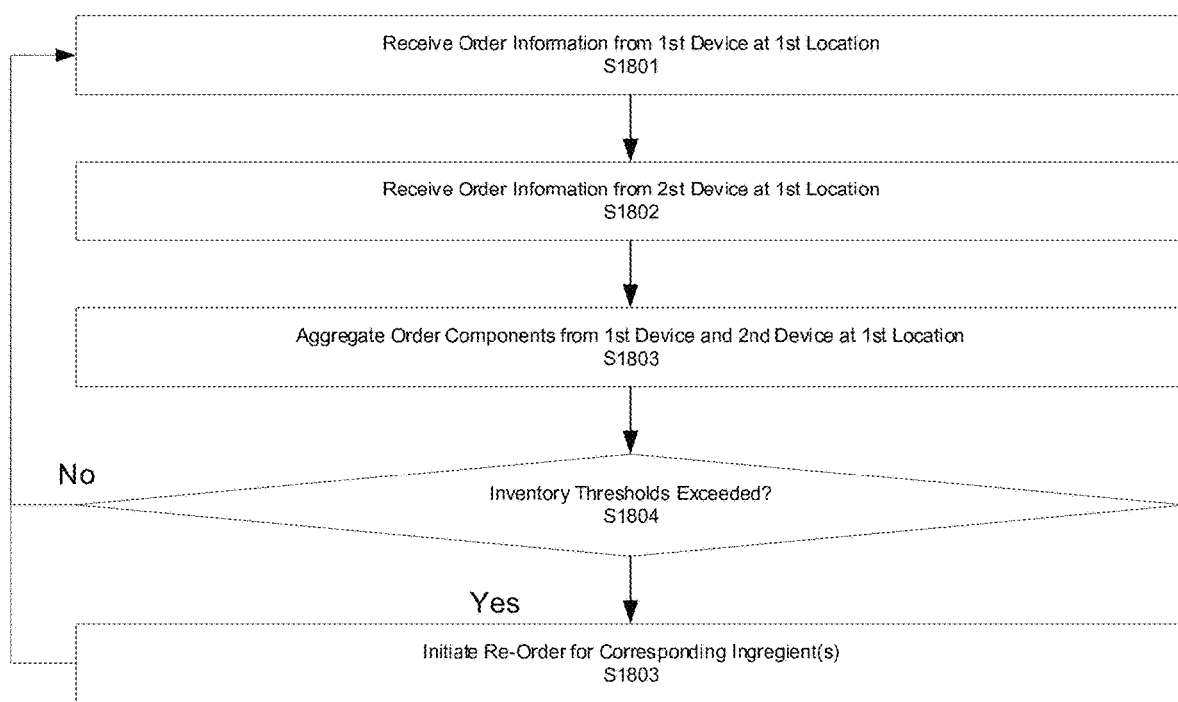
FIG. 18 illustrates a process for coordinating inventory using multi-level network-based access coordination.

FIG. 18 illustrates a process for coordinating inventory using multi-level network-based access coordination.

In FIG. 18, the process starts at S1801 when order information from a first device at a first location is received. At S1802, order information from a second device at the first location is received. At S1803, order components from the order information from the first device and the order information from the second device at the first location are aggregated. At S1804, a determination is made as to whether inventory thresholds are exceeded, based on the order information from the first device and the order information from the second device. If inventory thresholds are not exceeded, the process returns to S1801 to await additional order information from the first device and order information from the second device. If inventory thresholds are exceeded, (S1804=Yes), a re-order is automatically initiated for corresponding ingredients for which thresholds were exceeded.

In the embodiment of FIG. 18, the first device and the second device may each be POS terminals with the DinePOS application installed thereon. Each POS terminal may take orders from a menu with a designated set of recipes available to order. The DineRIVO modules may be customized for each establishment to know what ingredients are used in each recipe. The ingredients are identified and aggregated based on monitoring the POS terminals, so as to initial automated re-ordering of ingredients when thresholds are crossed. Thus, in the embodiment of FIG. 18 knowledge of ingredient amounts used in recipes is leveraged to monitor orders from different POS terminals.

Figure 34:
FIG. 34 illustrates an exemplary DineRIVO user interface of an application for multi-level network-based access coordination.

FIG. 34 illustrates an exemplary DineRIVO user interface of an application for multi-level network-based access coordination.

In the DineRIVO user interface of FIG. 34, a set of selectable links are shown on the left. The selectable links in FIG. 34 include user interfaces to numerous modules of the DineGigs system that are typically used by managers, as well as generic modules of the DineGigs system that might be used by any DineGigs user. Tabs on the top of the user interface allow the manager to select a recipe user interface, an inventory user interface, and a vendor order management user interface. Additionally, three categories of recipe are shown as category #1, category #2, and category #3. Each category shows pictures, a number of servings for each picture, and a preparation time for each picture. Thus, the user interface in FIG. 34 shows when the recipe user interface is active.

A separate inventory user interface for the DineRIVO module may show categories of specific items, specific items in each category, tags, starting quantities, ending quantities, usage and unit costs. The inventory shown in the inventory user interface may be searchable by name or type, sortable, and editable. As noted above, re-orders may be initiated based on monitoring actual orders on POS terminals. However, a manager may be required to authorize an initiated re-order and may refer to the inventory user interface for the DineRIVO module to check actual inventory before authorizing the re-order.

A separate vendor order management user interface for the DineRIVO module may show a log-in page for an external vendor management system such as vendIO. Alternatively, the vendor order management user interface may provide selectable links to different vendors for different types of ingredients and goods and may be configured to require only minimal or no input in order to initiate a re-order request over the internet from a vendor.

Each profile created on DineGigs will have a "recipe" repository. Most commonly, chefs/cooks will be frontrunners to enter and store their favorite recipes to their DineGigs recipe book. The chefs/cooks won't realize that the format in which the recipes are entered become standardized across the POS, Inventory, Order Management, Social Network and the web in general in the proprietary recipe format for dot recipe (.recipe). If a chef shares a recipe with a friend via the chefs DineGigs recipe book, if the friend also utilizes DineGigs then the chef s recipe can be formatted into the friend's DineGigs recipe book. Digital content creators such as blogs or food magazines may be able to enter recipes into their content via backend widgets for all web publishing platforms and DineGigs users will have the ability to download recipes while browsing the web. Not only does the ability to download recipes make life easier for a DineGigs user, but it also ensures adhesion to one "file language" that will work across DinePOS systems. DineGigs will open source the format so application makers and others can distribute the format to hobbyists.

Say a chef has been using the entire DinePOS Recipe, Inventory and Vendor Order Management ecosystem for a while has downloaded hundreds of recipes alongside his own that've been added to his/her personal recipe book. The chef has the option inside the recipe book to have a recipe suggested.

All of the chef's recipes in their recipe book, or those refined by a protein such as salmon may be compared against current inventory. The output will suggest recipes in descending order by number of missing ingredients i.e. no missing ingredients listed first at the top. Missing ingredients can be browsed from integrated vendors and added to the order cart for the restaurant, which the chef can view, edit and transmit from their personal DineGigs page (assuming the chef has been granted this ability Inside DineHR by an owner/manager).

There's no way to get around doing inventory manually. However, this can be sped up. All vendors integrated with DinePOS Vendor Order Management will have SKU's imported into inventory and divided by location inside restaurant (if applicable). For example, beer could be stored at the bar, in a walk-in cooler and also kept warm in a dry storage area. When an employee is conducting inventory, the DinePOS Inventory application on mobile device automatically lists SKU's by location with the option to add products not listed by scanning the bar code and manually entering details not imported by the barcode scan (if applicable). Upon completion of inventory details are saved and queried against the current menu. Counts for numbers of servings of a dish automatically update in the DinePOS system for order entry and managers are alerted of crucial ingredient shortages.

The manager dashboard reflects information on food cost, loss, missing inventory, etc., and provides them a window of time since the last inventory was completed displaying how many units were sold and what times sales occurred, and employees who worked when missing inventory disappeared. Getting to the bottom of how missing inventory occurs is often a matter of triangulating when the inventor likely went missing and who was working at that time.

Vendors wishing to be featured on the DineGigs ordering platform can use the DineAPI allowing managers to place orders for goods directly from their personal DineGigs dashboard. The dashboard ordering allows managers to compare prices of same/similar products from multiple vendors next to each other. DineGigs will integrate vendors into the DineAPI for a percentage charge added to the costs of items displayed. Numerous purchasers may use DineGigs for purchases, and incur a fee based on the total cost of purchases.

DineRIVO is an acronym for "Recipe, Inventory and Vendor Order management" and is an extension of DinePOS.

The Recipe sub-module may feature a rich text editor user interface. Recipe name, cook time and quantities created be the first 3 default fields visible in the text editor. Editor may support all features of Markdown including link upload of photos and video content to show the stages of preparation. Users may have the ability to format and share articles in a proprietary file type native to the DineGigs platform named ".recipe", which may be a lightweight markup language library for Markdown. When users (including content creators and publishers on other platforms) write recipes in the ".recipe" language, files will automatically load into DineRIVO and consumer-grade recipe book applications, with the ".recipe" language automatically formatting ingredient measurements.

DineGigs users are able to create, save and share recipes via their DineWall profile in the Recipe section, the DineWall feed, other social media, websites, and with restaurants to be integrated into DinePOS. Media companies such as Food Network can create digital web content in .recipe that can be downloaded right from the media in the LML library that POS and Inventory systems can decode. Recipes created in DineRIVO may have the ability to be saved as Public or Private. Public recipes will appear to everyone in the recipe section of their DineWall profile, Private in the same section but with the note that the recipes are only visible to the creator.

Inventory management module is where inventory on hand is measured and recorded by location. Often Location 1 may be Dry Storage, location 2 Prep Kitchen, Location 3 Hot Line. Users may create the location names and may have the ability to create as many locations as needed. Inventory may be searchable, with locations of product on hand returned in the query. Inventory may be sortable alphabetically, by inventory category (i.e. "Spices, Beer Wine, Liquor") or by location, and each product may be able to be taggable i.e. if a product's formal name is "Brioche 3.75" Roll", user may have the ability to tag the product by its more common name, "Hamburger Buns". This will help employee users locate the correct product in WeNeed to reorder.

When inventory is recorded, three systems may be provided. One is the tenths system i.e. $9/10$ths, $5/10$ths, etc. Another is the points system i.e. —0.75, 0.4, 0.25, etc. The way levels are recorded is along the lines of "This product is 0.5 or $5/10$ths full". Both measurements may be provided since many businesses choose one or the other, but don't want to change the way the businesses currently record, so the businesses are given the option to enter in either format. The systems are able to manage whole numbers as well i.e. "5.75" meaning "we have 5 whole bottles and one with 0.25 missing". The final system is for recording by weight and sku. Therefore, connectivity to a wifi or Bluetooth scale may be provided for weight, connectivity to a barcode scanner may be provided for the mobile application that can report both to the inventory system instantly. These are most often used to measure liquor inventory. Sometimes, all three systems can exist in the same establishment.

Finally, for Vendor Order management, VendIO may be provided for the DineRIVO module as an interface for vendors of products and services to restaurants and other businesses. Restaurants create vendIO accounts and enter credentials to access the API and client user interface within DineRIVO.

A DineRIVO Recipe page may show pictures and descriptions for recipes created by a user or available at an establishment. The recipes may include preparation time, serving size and a description, and may be edited, marked as active or inactive, shared, and otherwise managed via the Recipe page. A user may be able to save recipes from other users or establishments for reference.

A DineRIVO-Add-Recipe may allow a user to add a recipe, such as by entering a recipe name, cook time, serving size, a label for a food-type for the recipe, key ingredients, and whether the recipe is public or private. Additionally, a user may be able to start the recipe from a template selected from different templates. A picture or video of the food created by the recipe may also be linked.

A DineRIVO Inventory page may show categories of food, individual items, tags, starting quantities, ending quantities, usage quantities, unit costs, and other information. Examples of categories may include bakery, dairy, grains. Examples of an individual item may include a type of roll or bun, butter, buttermilk, cream, wheat, rice, and so on. In this way, inventory can be tracked by an inventory page so that a manager knows when to arrange for more of an ingredient. As explained herein, the DineGigs system may also monitor an Inventory page and provide notifications to a manager suggesting an order for one or more ingredients that are running low. In an embodiment, the DineGigs system may also automatically initiate orders for certain types of ingredients when pre-authorized by the establishment to initiate the orders. For example, an establishment may authorize the DineGigs system to automatically replenish stocks for ingredients that are rarely used, so that in the rare occurrence that the ingredient runs out the manager may be notified that the ingredient has been automatically reordered.

An DineRIVO Inventory Sort page may pop-up to allow the Inventory page to be arranged alphabetically a-z or z-a, by category, by location, by cost, by quantity, or by other metrics available on the Inventory page.

A DineRIVO Inventory Setting page may allow a manager to set inventory for an ingredient. For example, an ingredient may be recorded by weight or SKU, by a points system such as percentages or fractions, at a selectable location, and at a particular barcode scanner. The points system may allow the manager to select the fraction of weight for the ingredient in a drop-down menu. A barcode selection drop-down menu may allow a manager to select which barcode scanner is used to track the inventory.

A DineRIVO VRM page may allow a manager to log in to a vender order management system, so as to manage orders from vendors. An example of a vendor order management system that can be accessed by the VRM page is a vendIO vendor order management system.

DinePOS is where active menu items are created. Recipes can be created and stored in DineRIVO but must be imported into DinePOS by marking the item Active. When an item is deleted from DinePOS, it remains in DineRIVO where it can be marked active again and exported to DinePOS. DineRIVO recipe creation features a field Menu Description where chefs enter the item description that will be featured on the menu and Ingredient Summary. DinePOS becomes the data repository from which menu data is pulled for new menus in DineDigital. Users are also given the option to schedule a future menu. Recipe data in DineRIVO can be used as a repository from which menus are built.

DineDuty Module—009

Operating on the back of the DinePOS Recipe, Inventory and Vendor modules and DineShift, DineDuty allows chefs and food managers to plan preparation based on product in-house and ordered as well as the next day's menu. When a menu is determined and desired number of servings for each dish stipulated, DineDuty automatically consults DineShift to see which workers are coming in and assigns preparation duty to the incoming workers automatically based on inventory scheduled by whether items are in-house or due to come in later that day by delivery. For workers in the front of house, managers can assign opening duties across staff and communicate notes about service. When a worker clocks-in, their DineDuty assignments appear.

Figure 33:
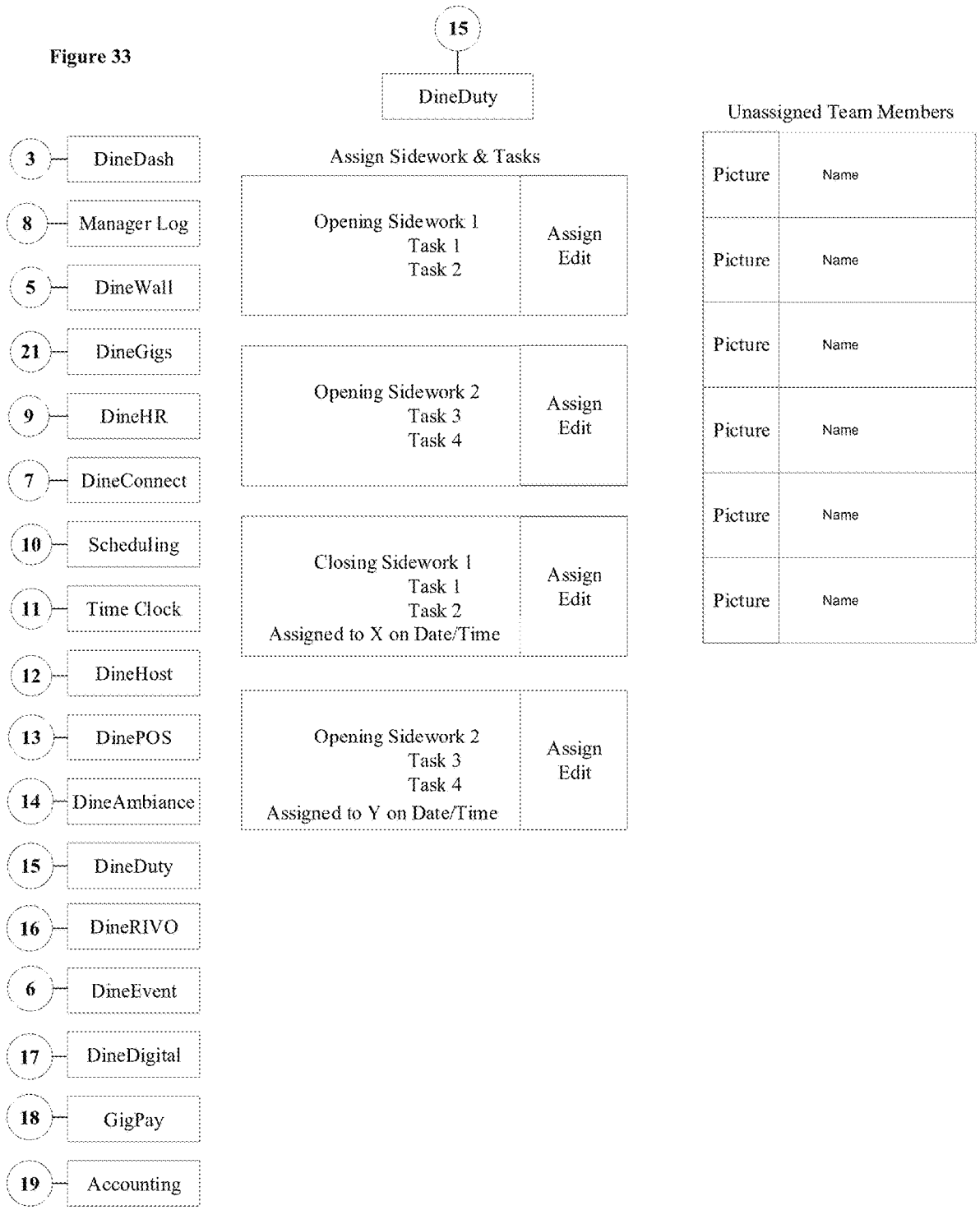
FIG. 33 illustrates an exemplary DineDuty user interface of an application for multi-level network-based access coordination.

FIG. 33 illustrates an exemplary DineDuty user interface of an application for multi-level network-based access coordination.

In the embodiment of FIG. 33, assigned sidework and tasks are organized in the middle of the page by opening types of sidework and closing sidework, along with who the sidework and tasks were assigned to. Unassigned team members available for assignment are listed on the right side of the page by profile picture and name.

As completed, the worker marks each task complete and a manager receives a notification and can verify the task has been completed if so desired. When a manager assigns side work at the end of the shift the DineGigs system provides an ability for the manager to then verify that each assigned task has been completed. For employees handling cash, after side work has been completed, the DineManager application will allow managers to process checkouts from their phones. When checkout is accepted by a manager, the employee will receive a notification that the employee has been clocked out for the shift via push notification from the DineHR app.

DineDuty is a module where managers create, save and assign opening, closing and shift duties for each shift and employees mark tasks as completed from each of their respective user interfaces.

In restaurants, some positions have sidework, which are the opening and closing duties for each shift and are often split between all employees working those positions. Each restaurant has unique sidework duties. Therefore, managers are provided a way to build their sidework lists. Once built, managers must have the ability to assign the duties to the employee. The employee must have the ability to mark each responsibility completed within their DineDuty user interface. The manager then confirms via their DineDuty user interface that the responsibility has been completed. Sidework assignment and completion is then recorded so managers can review who-did-what in a backward-looking fashion if necessary.

Examples of side work categories for non-kitchen employees may include opening sidework and closing sidework. Examples of sidework may include:
Opening Sidework 1
  Wash Windows
  Dust
Opening Sidework 2
  Fill Salt and Pepper Shakers
  Replace Ketchups
Closing Sidework 1
  Roll 25 Silverware
  Wipe menus
Closing Sidework 2
  Sweep
  Mop Jobs located in the kitchen usually don't have sidework. Instead, this is where those employees will find their daily responsibilities. Chef managers will need to create and assign their various preparation work amongst their kitchen crew and are given a similar user interface where the chef managers can build their food preparation lists and assign each to employees scheduled to work.

Artificial intelligence may be used to project the number of guests dining on a particular night in the future, what time the guests will likely arrive, schedule non-kitchen staff accordingly, intelligently determine items the guests will order, intelligently order items needed from the vendor to meet demand, determine what time delivery trucks will arrive with product, schedule kitchen employees to arrive at the same time the items to be prepped will arrive, intelligently determine which employee should prep what item based on their speed and/or skill level, deliver the employee their prep list, and have employee complete prep list in time for service.

A DineDuty Business page may show a set of tasks to be assigned to users, as well as links to allow a manager to assign each task. A summary of unassigned team members may also be provided on the DineDuty Business page, to enable the manager to see who is available for assignments. Work that has already been assigned may show who the work as assigned to, as well as a date and time of assignment.

A DineDuty Business Add Task page may allow a business to add a task to be completed to the DineDuty page. For instance, the DineDuty Business Add Task page may include windows to allow a user to specify the title of the task and the details of the task. Clickable links may allow the business to add or save the task.

A DineDuty Employee page may show a variety of tasks assigned as duties to an employee. Each task may be marked completed when completed and may show who assigned the tasks to the employee as well as a description of the tasks.

DineEvent Module—010

The DineEvent module is where restaurants plan for large buyout type events, like wedding receptions. These are events outside of the normal scope of operation that would be covered by reservation service. These events are often booked six months or further in advance and require a unique platform to manage their complexities.

The DineEvent module will be used by the restaurant to plan special events open to the public as well as private events where a portion or the entire restaurant is closed to the public. A notes section where managers or event planners can write unstructured details about the event and guests may be included.

The DineEvent module is therefore an event planning module allowing large groups, private parties and buyouts to plan their events in the same architecture as normal operations within DineGigs. When an event is booked, all relevant parties are included in the event planning page. Tasks are assigned to other participants to be accomplished by certain dates. For example, when a menu is decided upon for the event, the estimated number of servings of each dish is calculated and ingredients necessary to prepare each dish are referenced against inventory prior to the respective delivery date ahead of the event and added to the order cart to ensure the ingredients are in stock with enough preparation time. Special staffing requirements can be met by adding to the schedule for the event date into DineGigs Scheduling from within DineEvent. Deposits can be taken and recorded through DineEvent and referenced against final payment in DinePOS. In the event of a buyout, the DineOpen API (referenced later) will automatically close the day to future reservations in OpenTable and alert managers to any reservations requiring cancelation in their DineGigs dashboard. All notes and contact information for the event are accessible to managers and can be shared with scheduled staff to the DineDuty app.

Figure 24:
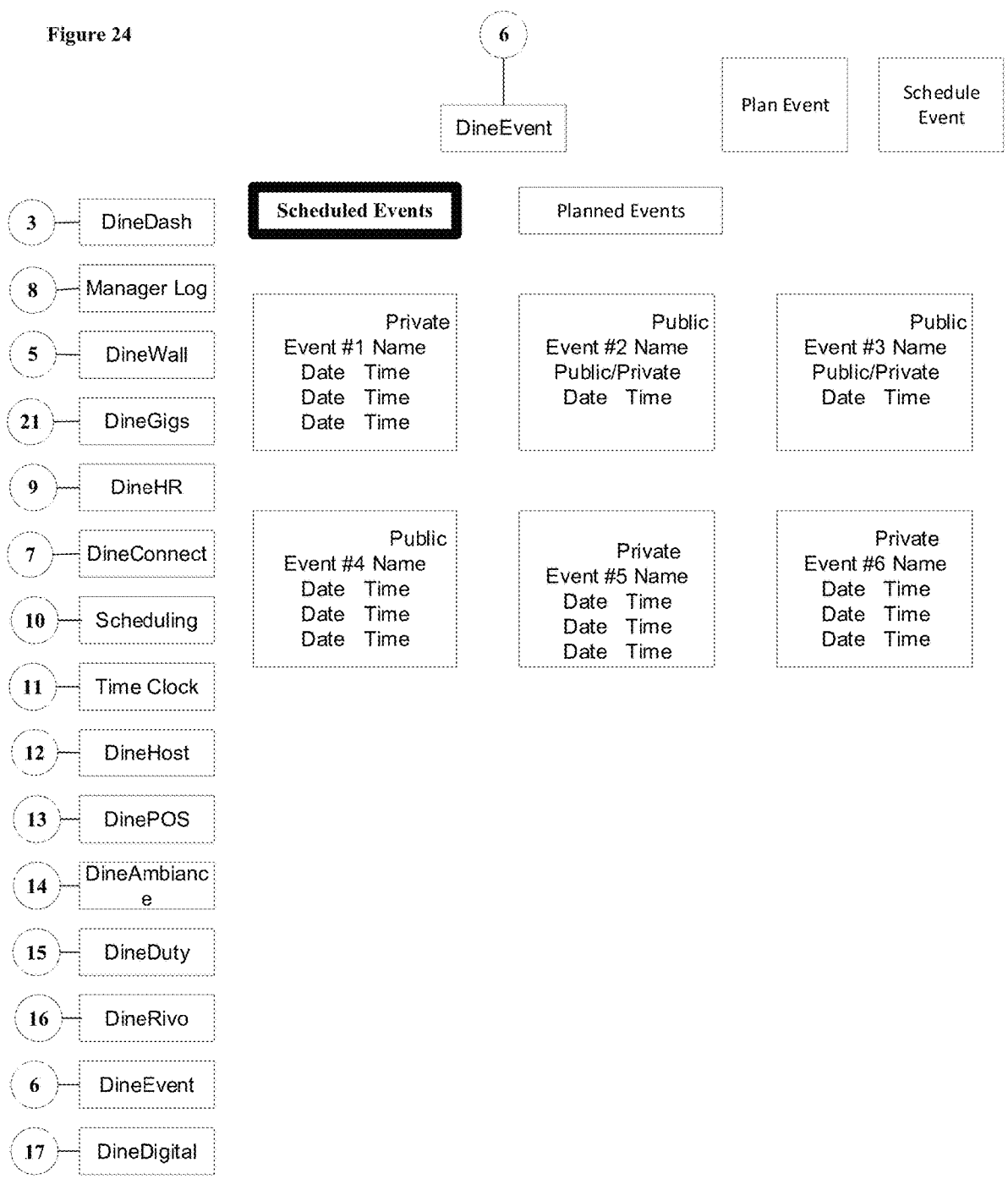
FIG. 24 illustrates an exemplary DineEvent user interface of an application for multi-level network-based access coordination.

FIG. 24 illustrates an exemplary DineEvent user interface of an application for multi-level network-based access coordination.

In the DineEvent user interface of FIG. 24, event planning for an event is coordinated in sections. Two tabs at the top are for scheduled events and planned events. In FIG. 24, scheduled events are selected, and six events are shown with names, dates and times. Each event may be selected to view and edit expanded information for the event. Additionally, selectable links to new user interfaces are shown for planning a new event or scheduling a new event.

From the DineGigs webpages, a user can navigate to many different functional modules presented via webpages. The navigation options may vary depending on what role the individual has in one or more establishments supported by the DineGigs system. For example, all users may have access to a DineWall page with functionality similar to a social network page. Employees and/or potential employees may have access to a MyGigs page with functionality relating to their own personal employment search. An employee may have access to a DineDuty page showing duties assigned to employees of an establishment. A manager may have access to a Manager Log page used to keep a log for an establishment over time. These and many other functional modules are described below. The DineGigs system may support many establishments and individuals, so that each establishment and individual can customize aspects of their experience on the DineGigs system.

Each suite of products may build upon the next. The first suite of products is known as DineGigs. DineGigs provides an online opportunity (e.g., jobs/help wanted) board at DineGigs.com. The ability to both post opportunities and apply for opportunities may be provided through Android and Apple iOS software applications available in the Google Play Store and iTunes.

Dashboards may be provided for both a manager and client users. Both dashboards have a connected communication chain feature for client and staff to communicate in a structured way throughout the event planning process.

A restaurant may share custom menus, pricing and other details with the client on the DineEvent module, so the ability is provided to make attachments in notes. As the event date approaches, the feed automatically updates with details such as "food for party 3/25 has been ordered and will be delivered for prep 3/24", "staff has been scheduled for event 3/25", etc.

The DineEvent module captures numerous events such as those that follow on the internal event dashboard. Additionally, the DineEvent module is connected to other modules so all work together to simplify overall management of the entire restaurant. Some of the items that are reflected on both DineEvent dashboards as described in the following paragraphs.

The DineEvent dashboards may provide an ability to plan new public or private event. A radio check box may be provided next to a label for a public event and another radio check box may be provided next to a label for a private event. Other radio check boxes may be provided to allow a user to use a previous template (Yes and No checkboxes) and save a template (Yes and No checkboxes). The user may also be given the ability to name the event such as the Jones Wedding or the Valentine's Day Prix. The user may also be given the ability to specify the type of the event, such as wedding, special menu. Establishments may be able to create and specify the types of available events for the DineEvent dashboards. If an event is private, the user may be asked to specify name(s) of the event host(s), addresses, phone numbers, social media profiles (including on the DineGigs system), and email addresses. The user may also be asked to specify hours of the event. A manager may be provided the ability to add managers/employees/hosts to the event to allow selected people to access event details.

A shift scheduling adjustment page may be provided from the Dine Event dashboards. For example, the manager may be able to specify that there are no adjustments to the regular schedule. The manager may be provided with a list of employees, and a schedule that is a matrix of days and shifts similar to a calendar. The schedule may show each employee working for the event, and the role the employee will take. A pop-up box from the scheduling adjustment page may allow the manager to create a schedule, such as by specifying a start and end time, a day of the week, and checkboxes to specify: No Adjustment to Regular Schedule; Cancel Regular Schedule now and add Event Staff Shifts, Reduce Non-Event Staff (for limited public seating), Add Event Shifts to schedule (for Public Events and Full Buyouts of the establishment); and Guest List Access. A window may be provided to add an event reminder note to the schedule. The option to reduce Non-Event Staff (for limited public seating) may provide options to FOH (front of house) Staff Positions or BOH (back of house) Staff Positions, either of which results in subtracting shifts from the schedule. The option to add Event Shifts to the schedule (for Public Events and Full Buyouts) may provide options to FOH staff dedicated to the event by position or BOH staff dedicated to event by position. The FOH staff option loads a restaurant's custom job categories and solicits a number next to each type of job to add shifts to the schedule. The manager may be able to edit shift start/end times in the FOH staff option or in the BOH staff option.

A custom menu may be designed via the DineEvent page(s). For example, the manager or even the customer may be able to build a custom menu item, add custom menu items to orders for supplies referencing the event number, and reduce regular menu inventory requirement for the day of the event. The manager or customer may be able also to set an alcohol policy (open bar, beer and wine only, open up to $xx, open bar before dinner, cash bar), upload an event contract, set a number of anticipated guests and a cost per head with a minimum charge, and other forms of information required to engage an event at a restaurant.

The DineEvent dashboard may also provide links and functionality to enable the establishment to upload an event contract, generate and save detailed statements of goods and services ordered for the event, and conduct credit card transactions and recordings of deposits.

A DineEvent Business page may show a schedule of scheduled events including name and type of event, whether the event is public or private, the date(s) and time(s) of the events, and other relevant information. The Business page may include clickable buttons to plan an event or to schedule an event. The Business Page may link to other related pages that allow a business to schedule a new event, and plan a new event including entertainment scheduling. An event planning dashboard may have a series of links for different categories of activities that may need to be planned, including participants, needs, scheduling, a menu, entertainment, ticketing, advertising, and service providers. A Participants page may list the employees scheduled to work the event, a number of anticipated guests, and needs for additional employees by role such as a need for 2 managers and 3 chefs. A WeNeed user interface page may list the amounts of goods needed for the event, such as an amount of coffee and where it will be stationed, an amount of sugar and where it will be used, an amount of water bottles, tea, sodas and other types of products expected to be consumed at the event. A Business Scheduling page may show a schedule for the event by listing each employee and their scheduled times and roles in the event. A popup page may be used to create the schedule, such as by adding an employee to a role at the event for a particular time period during the event. A Business Menu page may be used to populate the menu for the event, by product and course in which the product will be served. The manager may be able to add or subtract information for any of the DineEvent Business pages relating to planning the event.

DineTech Partner Developed Applications
DineAPI Module—0011

Modern applications require the ability to communicate with third party applications through Application Programming Interfaces (APIs). DineAPI is representative of a proprietary platform that allows certain information within to be accessed by developers wishing to add capability to the DineGigs infrastructure. DineAPI may act as a switchboard that manages permissions for access within the DineGigs infrastructure to DineGigs modules, 3rd party modules managed by DineGigs in the DineGigs infrastructure, and independent 3rd party modules tolerated by DineGigs in the DineGigs infrastructure. As described below, a Data Collection division therefore is in charge with upstream transfer of information requested by an DineAPI call. Data Dissemination is the downstream transfer by the requestor. Data Security manages the data switchboard in-between.

Modules described herein are based on software applications of stored instructions executed by computers. Many of the modules created by DineGigs have two purposes as described below and elsewhere herein. First, modules are created to offer new competitive products with capabilities that do not currently exist. Second, DineGigs includes an infrastructure of dedicated network resources that include computers (e.g., servers, personal computers), storage (e.g., databases) which is separate from the modules. The DineGigs infrastructure is based on application programming interfaces (API) referred to herein as DineAPI. The modules may all utilize a uniform application programming interface (API) to make calls to the DineGigs infrastructure than with other modules. The differentiation between making calls with infrastructure rather than with other modules is analogous to the difference between how tumors grow in an organism versus how cells arrive at the tumor site. Software utilizing APIs to communicate directly with other sovereign software applications may utilize custom APIs to do so. The communication network between software applications then grows similar to a tumor, in that multiple applications daisy chain to create a haphazard and inefficient network subject to failure. The DineGigs infrastructure is different in that any application with proper permissions can be given access to data created by any DineGigs or 3rd party modules or other applications by utilizing one uniform call directly to an DineAPI data directory. This allows information to flow from any one point to any other point using a single vocabulary without the need to directly integrate applications that may seek to communicate immediately or at some point in the future. Applications may still communicate directly with one another should they choose to do so, but not independent of the DineGigs infrastructure.

DineAPI therefore has three distinct divisions: Data Collection, Data Dissemination, and Data Security. Data Collection focuses on collecting, cataloging and storing data created by applications connected to the DineGigs infrastructure. Further, the Data Collection division is also responsible for monitoring (reviewing) and supervising 3rd party software connecting to the DineGigs infrastructure to ensure all information generated is collected and transmitted properly to the data collection warehouse. Data Dissemination creates standardized APIs for this information to be accessed with a uniform, standardized API call regardless of where (or by whom) the information is created, and acts as curator of the API catalog. Data Security is tasked with encrypting the partner application handshake ensuring only allowed applications may access the infrastructure. Other duties include monitoring database stability, quality control and threat succession planning, as well as, monitoring network API calls to the data directory. Only applications permitted to access the infrastructure can generate API calls, whereas the Data Security division sets what calls each application is permitted to utilize and how often the applications are permitted to make the calls. This design allows network traffic to be easily monitored and threats to be quickly identified. In this design, an attacker would need first to infect a partner application to access the data store, and protections against this happening are provided. Partner applications are only allowed to make API calls in which the partner applications have been given permission to do so at a frequency rate unknown to them (set by DineAPI Data Security division). An attacker attempting to access the data directory would generate API calls inconsistently, too often, or not allowed by the partner application, alerting Data Security of the infection. Data Security then has the ability to terminate the application connection and alert them to their security breach.

Notably, DineAPI may allow for 3rd party competitors to interoperate with DineGigs' software modules so as to compete directly modules provided by DineGigs and to extending better, more innovative products to the end user. Indeed, DineGigs may cease operating modules or individual software applications when competitor products better address consumer needs, so that competitor products use the DineGigs infrastructure to replace DineGigs software applications. This allows for the DineGigs infrastructure to be utilized by software developers to create custom applications catering to any line of business.

Though the description herein focuses on the foodservice industry, the DineGigs infrastructure is a universal management tool independent of business line and/or any particular data or even any particular type of data. DineAPI may provide a uniform data access system allowing any software developer to operate on an even playing field with established entities including large corporations by eliminating the overhead involved in creating a unique library of APIs, each specific to a singular application to effectively compete in a software release. DineAPI will not claim to own the data created by the partner applications; that data is owned dependent on the user agreements with the software creator. However, in order to access the infrastructure, the owner of data wishing to connect to the infrastructure must approve which applications have access to the data generated by the owner. The applications utilize the standardized DineAPI calls to retrieve information. DineAPI, by agreement, may warehouse some information, but overall provides a roadmap to where a specific piece of information is located in a 3rd party application, regardless of the application, and return the requested information with a single universal API call.

DineAmbiance Module—012

The DineAmbiance module is representative of a security and environmental suite to monitor operations remotely. The name DineAmbiance was chosen due to how often managers and owners leave a comfortable night off to turn down the lights or change the music at their establishment. With the DineAmbiance module, managers and owners are able to dim lights, change television channels, music, adjust volume, monitor cameras, equipment outfitted with sensors, and more. Keys no longer need to be distributed, employees may be provided with permissions in the DineGigs system so that the employees can unlock doors via a mobile device with a DineAmbiance application installed thereon. Entry and exit times may be recorded on DineDash dashboards for the establishment.

Figure 32:
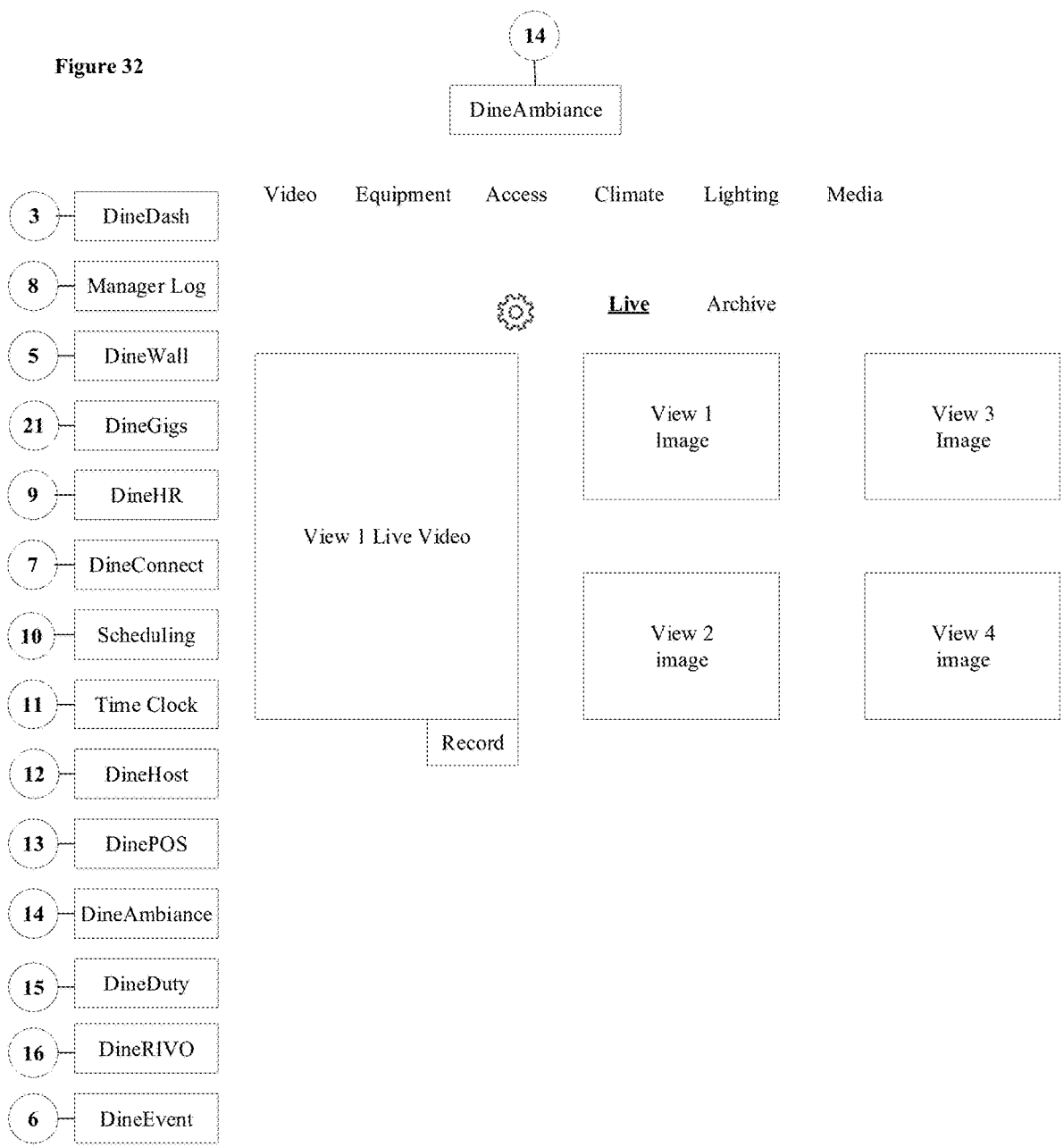
FIG. 32 illustrates an exemplary DineAmbiance user interface of an application for multi-level network-based access coordination.

FIG. 32 illustrates an exemplary DineAmbiance user interface of an application for multi-level network-based access coordination.

In FIG. 32, multiple selectable tabs at the top result in different user interfaces for video, equipment, access, climate, lighting, and media. In FIG. 32, the video tab is selected, so that a large live video feed is shown as View 1 Live Video, and four smaller thumbnail videos are shown to the right. Video may also be archived on-side and/or in the cloud, and the video may be maintained permanently, for a fixed period such as 2 days or a week or based on corresponding sensor detections such as motion detections or lock/unlock detections. Using the DineAmbiance application and DineAmbiance user interface in FIG. 32, a manager can change access permissions, climate (temperature) lighting, video (security), media (television or music displays) and more. Additionally, predetermined templates of settings may be selected from the DineAmbiance module, such as standardized day time temperatures, music playlists that vary by the time of the day and time of the year, lighting that varies by time of the day and time of the year. As a result, a manager may customize the environment within an establishment, or the environment can be set to automatic settings using the predetermined templates.

Although this technology is not proprietary, the ability to monitor several products from different manufacturers in one place is a newer capability. Commercial security products may be integrated with the DineGigs system in order to work seamlessly with other aspects of the DineGigs system.

DineAmbiance is a client module for managing security video and secure access systems, lighting, equipment monitoring, climate, and media such as music and television. The platform allows users to purchase hardware products from multiple vendors and manage them for a single convenient platform within the DineGigs infrastructure. DineGigs may also include a branded line of DineGigs merchandise with plug and play setup functionality integrated into the DineGigs platform.

When a user clicks on the left menu DineAmbiance tab, the user sees a series of six or more labeled icons, including Video, Access, Lighting, Equipment, Climate and Media. Clicking on Video, the user may be presented with security footage from an arrangement of one or more security cameras each labelled with a location of the camera. Menu functionality may be provided to allow the user to add a camera, find and play footage, adjust a camera by remote control, and so on. Clicking on Climate, the user may be presented with multiple thermometer readings and temperature settings from different areas of the restaurant in a graphic depiction with options to increase or decrease temperature, create climate schedule, and outside humidity and temperature alerts:

1) Front Dining Room (i.e. Set at 72, Temp at 72) 2) Back Dining Room Set at 72, Temp at 73) 3) Office (set at 72, Temp reading 69).

A DineAmbiance Business-Video page may show video feeds that can selected from multiple live and/or recorded cameras. For example, a main feed may show a video feed of a front dining room, and other thumbnail views may be show selectable options such as a video feed of a rear dining room, an office, a kitchen, a waiting/reception area, a bar, a parking lot, or any other views covered by a video camera at an establishment. When the main feed is selected, the user may have an option to record the main feed selectively if the main feed is not always being recorded. Additionally, video feeds may be automatically recorded at predetermined times or based on specified events such as when a safe is opened or when the establishment is closed.

A DineAmbiance Business-Equipment page may show parameters for different equipment at an establishment. For example, parameters from equipment such as a walk-in refrigerator, a walk-in freezer, a first reach-in refrigerator, and a second reach-in refrigerator may be shown, as well as statuses of sensors for each.

Additionally, the DineAmbiance Business-Equipment page may show statuses of HVAC units and sensors monitoring the HVAC units, a fryer, bar coolers, a water heater, a hood temperature, a carbon monoxide alarm, a smoke and fire alarm, water pressure, a main gas connection, lighting, oven temperatures, water collection, drainage, audio equipment, video equipment, locks on different doors, printers, connected device power levels, phones, internet, cameras, and points of sale. Sensors on these and any other type of equipment at an establishment may be monitored on a single page provided via the DineGigs system and accessible to an authorized user at the establishment. Examples of faults that can be notified via the page include when Freon is too low for an HVAC unit, when light bulbs are out, when paper at a printer is low or out A DineAmbiance Business-Access may show statuses for entrance alarms and other types of alarms for an establishment. For example, sensors may feed statuses of Ajar or Closed, Locked or UnLocked for each of a main entrance, an emergency exit, a back door, an office, and a liquor room. Additionally, an alarm system may feed into the Business-Access page, to show one of several statuses such as OK—Not Set, Set, and Stay Away. Additionally, biometric systems may feed into the Business Access page, so that a status of a biometric system such as an Ionix Facial Recognition Keyless Entry may be shown on the Business-Access page.

A DineAmbiance Business-Climate page may show temperatures of different rooms in an establishment, such as a front dining room, a rear dining room, an office and a kitchen. Temperatures for each room may be set by the Business-Climate page, including a temperature schedule for each room. Additionally, outside temperatures may be shown including projected daily highs and lows, rain expectations, dew points, weather alerts and other weather information relevant to an establishment.

A DineAmbiance Business-Climate-Schedule page may allow a manager to create a schedule for temperatures. As an example, a schedule set on the Business-Climate-Schedule page may be 68° from 8 AM to 6 PM, and 62° from 10 PM to 6 AM. The Business-Climate-Schedule page may allow the manager to add another time slot, to apply the temperature schedule to a room, or to apply a temperature schedule to other rooms.

Another DineAmbiance Business-Climate-Schedule page may provide supplemental information and options, such as checkboxes to specify which other rooms a temperature schedule should be applied to. Other rooms may be indicated by checkboxes that, when checked, have the temperature schedules applied.

A DineAmbiance Business-Lighting page may show lighting levels for different rooms, such as 40% for a dining room, 38% for a bar, 100% for a kitchen, 100% for a front exterior, and 100% for a back exterior. A 0% reading may be shown for an office. Each lighting level may be controlled from the Business-Lighting page, such as by moving a slide bar anywhere from 0 to 100%.

A DineAmbiance Business-Media page may show links to media accounts for the establishment. As an example, video content such as cable television or a streaming service may be linked to this Business-Media page, so that the DineGigs system enables a manager to sign in and control selections of content displayed on television monitors. Similarly, music or other audio content from an audio service may be linked to the Business-Media page, so that the DineGigs system enables the manager to sign in and control selections of content played on speaker systems.

DineOpen Module—013

OpenTable has been the leader in online reservations for many years and does an extraordinary job capturing this niche. Rather than compete with OpenTable, complementing OpenTable is preferred. DineOpen is aimed at integrating OpenTable with DineGigs.

DineConnect Module—014

The DineWall social network may include a suite of messaging products allowing email communication within the DineConnect module. The DineConnect module may also provide for cloud-based VOIP call routing sending outside calls to the restaurant's main phone number through a central company switchboard to the user's mobile phone utilizing the DineConnect module. Work related emails, calls and voicemails will be able to be accessed from the user's dashboard and all calls from switchboard channels can be recorded and monitored at the employer's discretion. DineConnect may integrate a third-party communications platform into the DineConnect Module.

Figure 25:
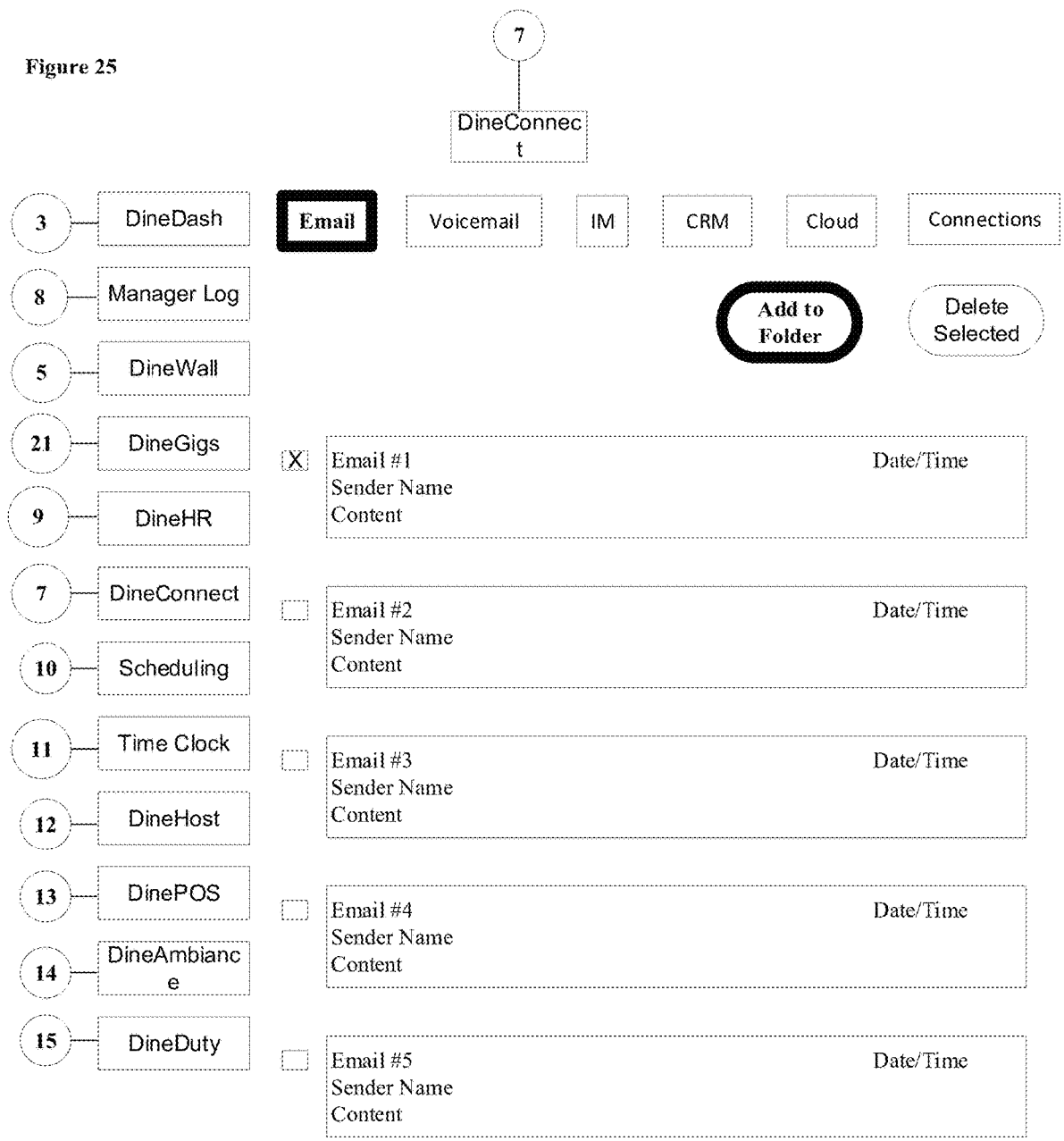
FIG. 25 illustrates an exemplary DineConnect user interface of an application for multi-level network-based access coordination.

FIG. 25 illustrates an exemplary DineConnect user interface of an application for multi-level network-based access coordination.

In FIG. 25, selectable tabs at the top of the DineConnect user interface allow a user to view user interfaces specific to emails, voicemail, instant messaging (IM), customer relations management (CRM), cloud, and connections. In the user interface of FIG. 25, the email tab is selected, and five emails are shown with the conventional configuration of date/time, sender name and the content. Similar arrangements for communications may be shown for the voicemail and IM tabs.

DineConnect is provided as an integrated communications module. DineConnect may include email, PBX voice integration, extension call routing to mobile phones via the DineGigs application, visual voicemail, instant messaging, web hosting and domain registration. The benefit of Dine-Connect to businesses is that the businesses receive the ability to have a robust, professional and compliant communications platform inside of the DineGigs ecosystem. As a result, appropriate employees of a restaurant can be contacted via DineGigs. Restaurants can transition legacy phone systems into an integrated PBX cloud-based system inside of their DineGigs cloud storage allocation, which allows calls to be easily transferred or sent to an extension. Most restaurants need no more than a few (e.g., 5) extensions, which means this can be integrated for very low cost.

The DineConnect module may includes a dashboard with tabs cleanly distributed across the top of the web page, such as Email, Voicemail, IM, CRM, Cloud, each of which activates corresponding functionality.

For the email inbox, an interface may lay out messages chronologically with a scroll option. Options above the messages but below the navigation tabs may include New, Folders, Search. When someone selects any of these fields, the right menu may pop out with a corresponding user interface. When a message is selected from the inbox, the right menu may pop out with message details and options Reply, Reply All, Forward, Delete.

When Voicemail is selected, the corresponding user interface may list recently received voicemails decoded visually. When a message is selected, the right menu may pop out with voicemail decoded in writing with the option to play message sound. A user may be provided with options to Call Back, Send Email, Send Text, Add CRM Contact, Forward Message, Delete The IM tab may list messages much like the email user interface. Selecting a message may pop the right window out with message details and the ability to chat. An optional Chat window may be detached/unanchored so as to allow a smaller pop-up window to free-float on the bottom of the page; as a user navigates across the ecosystem the user can carry-on a conversation in a chat window. Options for IM may include Audio, Video.

A CRM tab may have two selectable fields Business Contacts, Customer Contacts. Selecting business contacts identifies those who are not primarily customers. Customer Contacts, when selected, may bring up all customer data alphabetically. When a user selects a contact, the right menu may pop out with all customer contact data, including social profiles, email, phone, and address. DineGigs may scrape customer data from 3rd parties. Additionally, facial recognition software may allow the DineGigs system to list every time the customer has been to the restaurant and document what the customer ate, who the customer was with, payment data and receipts, email communications, phone calls to the restaurant, past reservations, and more.

The Cloud tab may have secondary navigation Hosting, Cloud Phone Setup, Cloud Security Setup, Cloud File Storage with Hosting tab active.

The Hosting tab may list current package details for the user. The Package may show as DineConnect Total Solution with price Included Free with DinePOS. Below it may list features such as Cloud Phone with 5 Mobile Extensions, Hosted Email with 5 Accounts, 1 Free Web Domain, Free Cloud Website Hosting, 10 Days Security Video Storage with CCTV Access, OIT Management, 1 TB Cloud File Storage The Cloud Phone Setup tab may feature Port your number to DineConnect with a field to enter the phone number to be ported Format (xxx) xxx-xxxx. Additionally, a Current VoiceMail Greeting with Record New Greeting may be provided, along with functionality to Assign Extensions where the user can select 5 employee DineWall profiles and assign 1-5.

The Cloud Security Setup tab may feature first an option to Connect your Security System with login credentials. Other visible tabs may include IOT Device Setup, Security Camera, and DVR Setup The Cloud File Storage may show the amount of file storage available, together with an option to upgrade. Also, the file system with all stored documents and paths to their location(s) may be provided by the Cloud File Storage.

An Email page may allow a user to manage emails on the DineGigs system. The Email page may provide a link to emails at a DineGigs account as well as emails for the user at other email accounts such as Gmail. The emails may be organized in a conventional manner, such as by inbox, sent, drafts, in folders, by correspondents or category, and so on.

An Email Popup page may pop up when an email exchange is selected on the Email page, and may provide the user the ability to reply, reply all, forward, delete, or otherwise handle an email.

An Email Composer page may show a form for a user to compose an email, including a title, destination and content for a new email, or content for a replay that already has a title and destination. The Composer page may allow the user to send an email from a DineGigs email account, an email system belonging to an establishment served by DineGigs, or an outside email service such as Gmail.

An IMs page may allow a user to view and compose instant messages via the DineGigs system. For example, the IMs page may show a series of instant message exchanges with different correspondents arranged from the most recent to the oldest.

A Cloud Phone page under DineConnect may allow a user to port a number to DineConnect and thereby set up cloud phone services. The page may allow the user to specify a number, a security setup such as PIN and password, record a voicemail greeting, and assign extensions.

An IM Opened page may show an individual instant message exchange with a correspondent. The IM Opened page may allow the user to type a new message in the exchange, record audio content or video content to send in the exchange or attach a document to send in the exchange.

A IM Chat Detached page may allow a DineGigs user to create and interact in chat conversations, including group chat conversations. The IM Chat used by the DineGigs system may allow the DineGigs user to select from a series of existing chat systems.

A Cloud Security page may allow a user to configure cloud security for their communications accounts. For example, the Cloud Security page may allow a user to set an email address and password, connect to a security system, and set up an internet of things (TOT) system. The IoT system may connect a series of internet-connected devices such as security cameras and other sensors, door monitors, and other systems connected to a common internet system. Thus, the cloud security allows a DineGigs user to configure an IoT system for an establishment.

A Cloud Host page may show hosting options provided by DineGigs via DineConnect. The Cloud Host page may show a subscription package for an establishment, such as an account that includes:

a cloud phone with 5 mobile extensions
hosted email with 5 accounts
1 free web domain
free cloud website hosting
10 days security video storage with CCTV access
Internet of Things (IoT)
1 TB cloud file storage As should be clear, a variety of communications and storage services can be provided as a service by DineGigs insofar as DineGigs provides a centralized infrastructure that can be scaled flexibly depending on the volume of subscriptions requested by establishments.

A Cloud Storage page may allow a user to store content in the DineGigs infrastructure. For example, a set volume of storage may be made available to each user, and the Cloud Storage page may show how much of the allocated storage is available or used. The Cloud Storage Page may also show the largest and/or most recent items being stored by title, size, and date/time of last update.

A CRM Opened page may show information of customers such as guests. That is, the DineGigs system may allow an establishment to remember information about specific information for customers. Information may include allergies, customer preferences, whether the customer has a preferred seating arrangement or server or cocktail and so on. The CRM opened page may synchronize with reservations so that when a customer makes a reservation, the personnel serving the customer may be notified of their arrival and their preferences. Additionally, different DineGigs users may have different versions of a CRM Opened page for the same customer. For example, a manager may know how often a customer comes into an establishment, spending patterns and so on, whereas an employee such as a bartender may only be notified of birthday and favorite beer or another cocktail.

A customer relationship management (CRM) page may be linked via one of several links in DineConnect. The CRM link may be included among other links such as for email, voicemail, instant message (IM), cloud and connections. The CRM page may separately group several categories of contacts, such as business contacts, customer contacts, DineEvent contacts, and event coordinators. Each contact may be identified by name and picture, and linked via a link to their wall page, communications addresses such as phone numbers and email addresses.

Accounting Module—015

The Accounting module is used to record and reconcile transactions occurring in the DineGigs ecosystem. The accounting module may be added as a supplement to other modules and promises to simplify management of new concepts in modern restaurant management such as the GigPay module.

Figure 37:
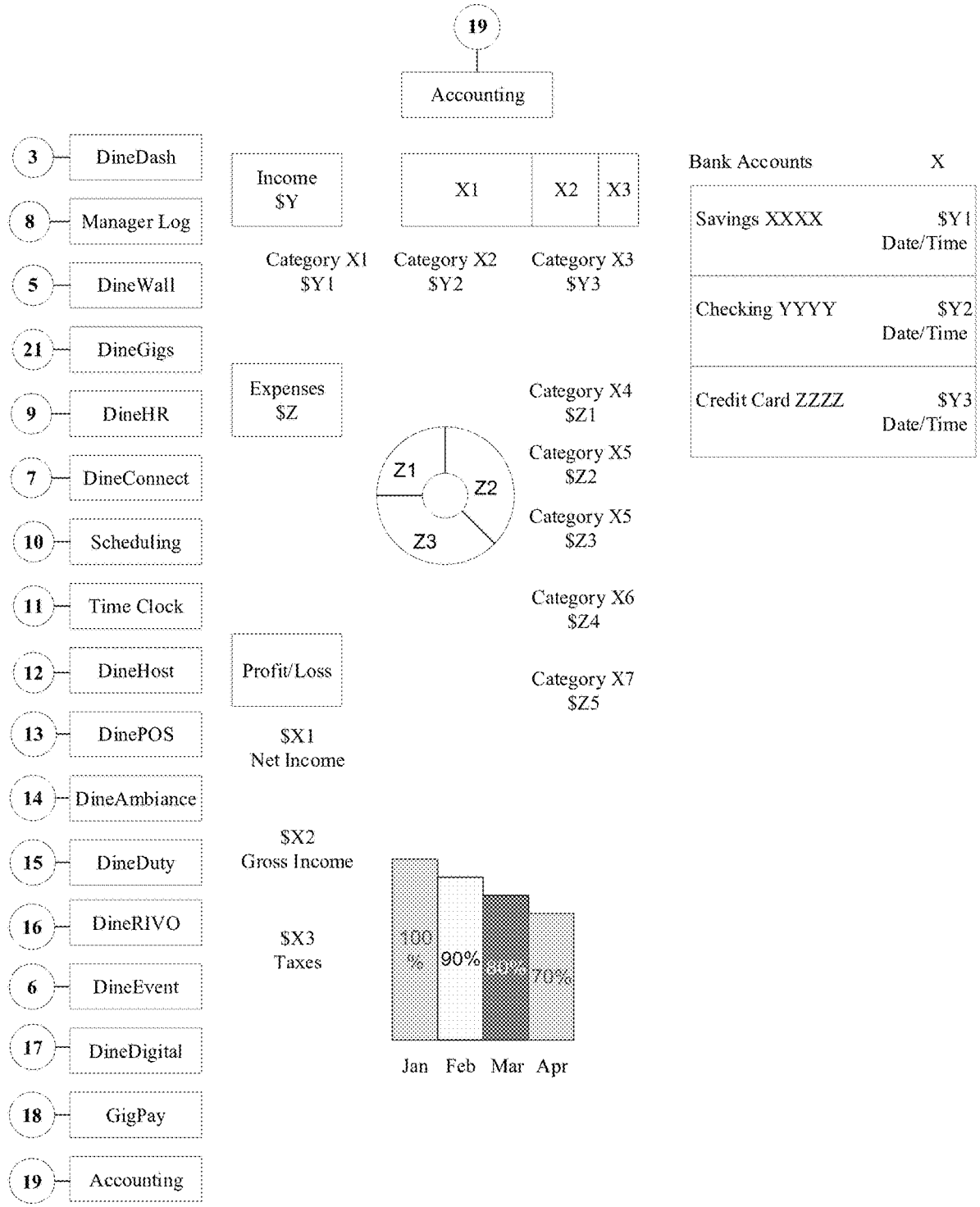
FIG. 37 illustrates an exemplary Accounting user interface of an application for multi-level network-based access coordination.

FIG. 37 illustrates an exemplary Accounting user interface of an application for multi-level network-based access coordination.

In FIG. 37, various aspects of accounting for an establishments finances are visualized. For example, income, expenses and profit/loss can be visualized using tables, pie graphs, bar charts, and other forms of visualizations. The numbers used to generate the visualization may be derived from standard accounting formats such as electronic spreadsheets and electronic ledgers. The displays may break income and spending up by category, by time period, and by other characteristics that can be selected by the manager in order to visualize performance of the establishment.

Additionally, on the right side of the user interface in FIG. 37, information from accounts for the establishment such as bank accounts, checking accounts and credit card accounts is shown. These accounts may be updated periodically or on-demand when a manager logs into the Accounting module of the DineGigs system. Additionally, as is true of known electronic account coordination systems such as Mint, usernames and passwords for external accounts may not be stored locally on any particular computer used to access the linked accounts from the accounting module. Additionally, functionality may be limited to reviewing balances and transactions, so that if a manager wants to interact with any external account, the manager will still have to log in to the external account separately from the Accounting module.

A Dine Accounting page may show accounting information in any number of forms such as charts or graphs or matrices of information. For example, accounting information may include income broken up by categories, expenses broken up by categories, profit and loss, net income over variable timeframes such as day, week and/or month, and bank account and credit card balances.

The DineGigs accounting module may integrate the most common accounting software from brands such as QuickBooks and Xero into the DineGigs infrastructure via API.

The accounting tab is one of the tabs often available to, e.g., managers, on the left menu. Once a manager clicks the Accounting tab the manager will be brought to a page that welcomes the manager to fully integrated accounting and allows selection of a provider. The accounting module is integrated with the DineGigs architecture, and thus with complementary products such as GigPay.

A Dine Accounting Login page may provide a link to an accounting program. A user may login with a user identification and password or other forms of identification and security measures, and then access the software used for accounting by the establishment.

DineEconomics Module—016

The DineGigs ecosystem collects a significant amount of real time data. From sales and ordering (not just what is sold or bought, but by whom, when and the rate of consumption versus waste), the number of employees unable to work in a given day (which could help governments monitor real time the spread of infectious diseases in any geographic area), the effects of adverse weather, natural disaster, or other catalyst (monitoring in much finer resolution the wealth effect of populations displaced during natural or manmade disasters such as terrorist attacks). DineGigs seeks to utilize DineAPI to provide sovereign governments and large, critical public and/or private institutions (i.e. the Federal Reserve) the ability to subscribe to a real-time data feed. Other possible integrations include algorithmic monitoring of accounting data in DineAccounting to flag potentially fraudulent activity to the IRS. Due to the potential of an extremely large sample size of data, the artificial intelligence software is expected to be greatly effective in determining which behaviors are out of sample, reducing false positives. DineEconomics may release economic indicators weekly to the public that will help illustrate a three-dimensional (3D) view as to economic behavior of national economies at the local level. Of course, this information can be monitored in real time by subscribers to the data, so the data releases shouldn't be particularly market moving.

DineAI Module—017

DineAI may utilize all of the data collected in the infrastructure to monitor trends with granularity down to the street level. Using predictive technology, DineAI can help restaurants plan for the number of guests the restaurants should expect to serve per day, what the guests will order and how long the guests will stay. This helps establishments reduce waste by ordering more effectively, reduce payroll by intelligently staff stations based on the amount of pre/during/post shift tasks anticipated, predetermine the effects of adverse weather (or even effect of a bad weather forecast) from a user dashboard online. Other ways of utilizing DineAI may include real time monitoring of business cycle projections, predictive behavior modeling of residents in an area in the path of a hurricane (i.e. Birds often leave the area a hurricane makes landfall several days before the event, human behavior ahead of such an event has not been monitored economically and may help forecasters hone in on a "collective consciousness", improving public safety.). Of course, all algorithms are only as good as their creator. Asset flows can be modelled, potentially worldwide, and laws of physics and astrophysics can be applied to binary decisions made over a sample size of millions of people. Cycle theory can be used to determine the fourth dimension (time) of when a catalyst manifests. The algorithm may assume that Pi determines time, Phi determines amplitude reaction of free will, binary decisions charted on an X axis of "price" and Y axis of "time" on any desired time frame behave according to laws of geometry, the highest (longest) time frame in control of each subsequent behavior occurring at shorter time resolution. Millions of cycles monitored by wavelength can be calculated and monitored to help determine "rogue wave" behaviors that tell a system when to expect surprises (e.g., the rush of customers that arrives out of nowhere for dinner at a restaurant on what would normally be expected to be a slow night.). This information may be analyzed by an algorithm so that the system uses self-learning based on so-called "big data" from numerous sources and over long periods of time. The system may use artificial intelligence and learning capabilities to become more intelligent over time and may even be used to help governments determine where and when events (e.g., criminal or terrorist attacks or natural disasters) will occur and how long their effects will last, potentially years ahead of time. For example, if a model shows that for no particular reason, economic activity was expected to come to a standstill in a specific geographic region in the future, the system may be able to note the size and severity of the reactions, and therefore ascertain the type of event to expect.

DineOnline Module—018

DineOnline is an auto-generating web page code and application creator. Restaurants can use the code generated to publish web pages where consumers order products from a business's own web domain that are directly integrated with DinePOS. Further, should a restaurant choose to allow patrons to order by application on an in-store device or on a mobile device, DineOnline offers this functionality natively. For a restaurant that fully utilizes the entire suite of DineGigs applications, PHP APIs in-code allow current menus and stock inventory to be examined and automatically update item availability. Users can then purchase items through web store or mobile checkout through the DineOnline module and the order is immediately transmitted to the designated to-go order taker's POS register and sent to kitchen printers and/or order screens. DineOnline may also exist as a stand-alone application utilizing geolocation to automatically sense a customer user's current location via the DineOnline application when the DineOnline application is open. The DineOnline application may intelligently display the current restaurant's menu (when in-store) or allow users to search for any participating restaurant and order directly from the DineOnline application instead of needing to download a proprietary application for each restaurant the user wishes to visit.

DineGraph Module—019

DineGraph is a user modeling program utilizing open source Facebook Graph technology. When users order from DineOnline, the users must create a profile and enter certain details such as their name, address (for delivery), telephone number and payment information to be stored for future purchases. Additionally, when a user enters an order either online or using the DineOnline application with their DineOnline profile, certain information is collected from their mobile device at this time such as IP address, type of device, location, etc. This information is then used to create a profile of what items the customer orders, where the customer orders from, times of day the customer typically order and other pertinent information. This information will then be shared with DineAI and DineEconomics modules to build predictive modeling of who will go out to eat, where the customers will likely go, where the customers will leave from, what time the customers arrive, what the customers will likely order and the length of duration of the customer's visit. In time, this information can be offered to restaurants in advance to help them better prepare for spikes in customer arrivals (rushes) with proper staffing, intelligent staffing to help pinpoint exact timing of when and which employees to cut, exact amounts of product on hand to meet demand ordered days in advance. Additionally, API's of this predictive data can help model vehicle traffic flows and help companies like Uber and Lyft prompt promotional rates for drivers to ensure there will be enough supply on hand to meet demand. When the model has enough data points to project outward 12 months or more, farmers and producers of agricultural commodities will be able to use the DineAI projections in planting produce and breeding feedstock to meet demand. This could help shippers allocate proper resources in geographic regions ahead of demand.

DineIn Module—020

DineIn is location sensory Bluetooth beacon technology for use inside of establishments utilizing the DineGigs software suite. Several beacons placed inside of an establishment determine the location of users dining-in based on the IP broadcast by their smart device. When a device remains stationary for a period, DineIn then determines the location of the device to be the user's seat assignment. A server (waiter) or bartender enters an order into, or checks and confirms an entered order for, the DinePOS based on layout of the dining room and seat number of the table. DineIn then integrates with the POS, assigning the broadcast tracking beacon to the seat number, recording items ordered. At the time of payment, if/when the user has a DineOnline account, this will be noted through cross referencing IPs broadcast against DineGraph, matching the user and transmitting the selections ordered and other relevant information captured to the user's DineGraph profile.

DineSplit Module—021

DineSplit is a solution to splitting checks between an unlimited number of guests. Utilizing the information captured by DineIn and matched by the server (waiter) in DinePOS by seat number, there are several options for settling the bill at the end of the meal. Each split check can be delivered traditionally to each guest with a QR Code printed at the bottom of the receipt. The customer then has the option to pay cash, display a credit card for local payment, pay the check using a QR scanner inside DineOnline mobile app, or scan multiple QR codes to pay in-app. In circumstances where one pays for several individually printed checks or a combined check, the customer paying receives an itemized bill for all items ordered. Those users with a DineOnline profile identified via DineIn who opt to share their information in a check split situation automatically match the items ordered to the customer who ordered them. This matching is useful for expensing business meals. In situations where users do not have a DineOnline profile, or in a hybrid where some users have a DineOnline profile and some do not, the customer paying the bill can enter the guests' name next to their seat number. The broadcast IP address is recorded. If at a future time the user opens a DineOnline account, or is identified via DineGraph, the previously anonymous information collected will port to the DineGraph profile.

Figure 19:
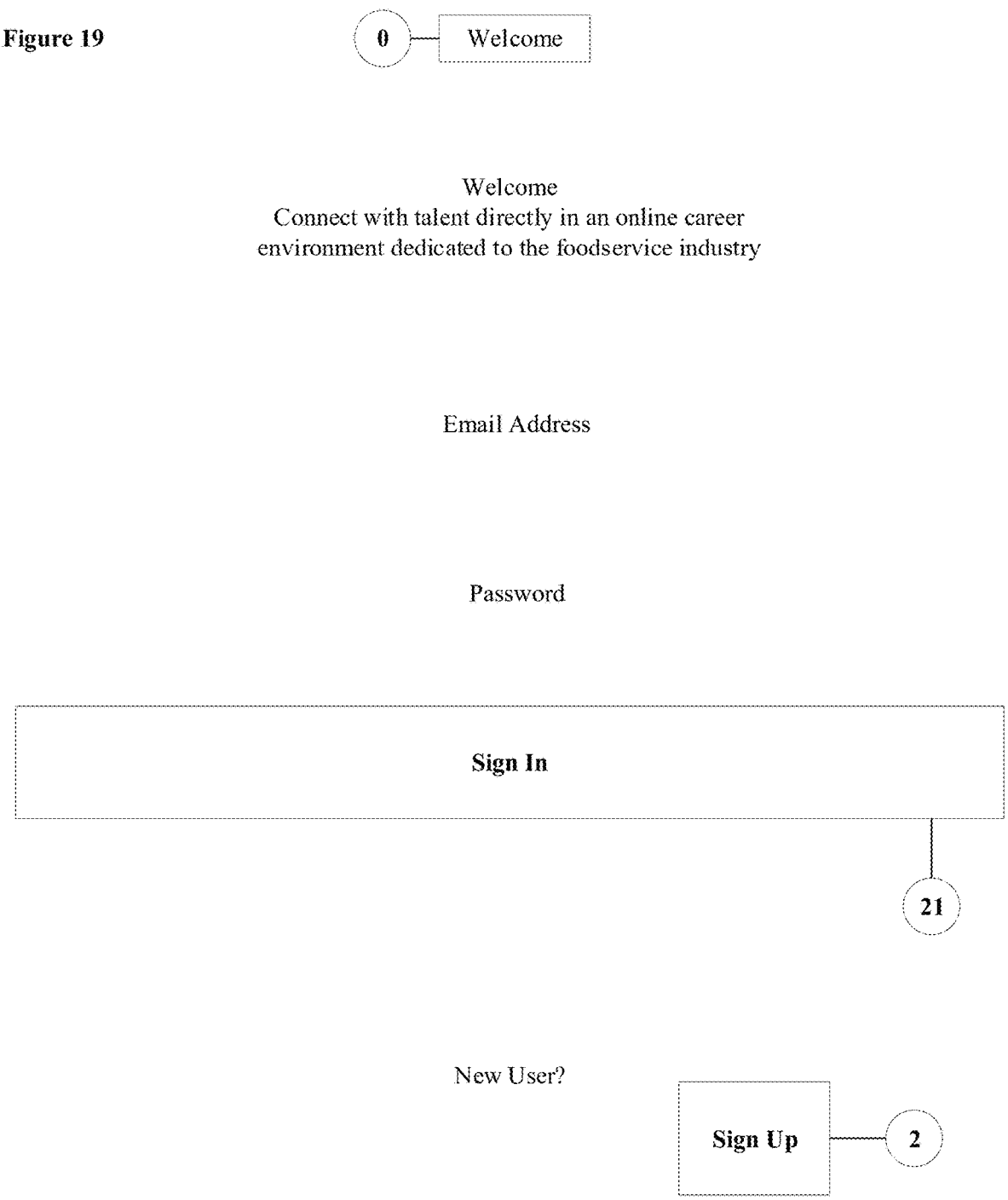
FIG. 19 illustrates an exemplary Welcome user interface of an application for multi-level network-based access coordination.

A login user interface for the DineGigs system is shown in FIG. 19. As shown, the page includes a welcome message to welcome a new or existing user. The login page invites the user to set an email address and password and sign in if the user is an existing user or sign up if the user is a new user. Depending on whether the user is new or existing, the user may be redirected to a user interface for creating their profile as shown in FIG. 20, or the DineGigs user interface of FIG. 39. That is if the user already exists in the DineGigs system, the user may be taken to a default module when first signing in, though the user may also be given the ability to change their starting module upon sign in such as if the user is not actively searching for an employment opportunity.

A DineGigs Sign Up user interface is shown in FIG. 20. The DineGigs Sign Up user interface is the result of a selection from the login user interface in FIG. 19. As shown, a variety of links to other DineGigs pages are shown on the left. The user is invited to complete a user profile, link to social media accounts, add a cover picture and profile picture, provide communications addresses such as a phone number and email address, and set a password and username. The new user is also invited to complete information similar to a resume, such as by filling in experience, certifications, education and pictures and a portfolio. A popup user interface may appear each time the user selects an experience button, so as to allow the user to add experience information. Pop-up user interfaces may also appear each time the user selects the selectable certification link, the selectable education link, and the selectable pictures and portfolio link.

Figure 42:
FIG. 42 illustrates an exemplary user Guest interface of an application for multi-level network-based access coordination.

FIG. 42 illustrates an exemplary user Guest interface of an application for multi-level network-based access coordination.

As shown in FIG. 42, the guest user does not have a profile picture since the guest user is not recognized by the system. A variety of links are provided on the left for the guest user to see functionality provided by the DineGigs system, though functionality such as MyGigs and DineWall may lead to unpopulated or sample linked pages, again since the guest user is not recognized by the system. The guest user will see example information such as employment opportunities, to show aspects of the DineGigs system that will encourage the guest user to join DineGigs.

The DineGigs guest interface also defaults to functionality of the DineGigs module and shows employment opportunities for Top Gigs and Gigs Around You, so as to show the guest the original functionality of the DineGigs system. The DineGigs guest may be able to filter employment opportunities using a filter button shown on the upper right, though the DineGigs guest cannot apply for any positions through the DineGigs system without creating a DineGigs profile.

FIG. 43 illustrates another exemplary DineWall user interface of an application for multi-level network-based access coordination.

In the DineWall user interface of FIG. 43, the DineGigs user (not a guest) is informed that the DineGigs user is applying for a position, and that the DineGigs user's DineWall profile is their resume. The DineGigs system may provide a text interface to create a cover letter, as well as the ability to select from templates to create the cover letter. The templates may give the DineGigs user a format for presenting a cover letter, and even minimal populated content to ensure the DineGigs user can focus on the proper content to present in the cover letter. Additionally, a DineGigs user may be able to upload a formal cover letter as an image or document. The DineGigs user is provided a functional button to select when ready to Apply once the cover letter is complete. The application presented to an establishment may be received as an email or other form of electronic message, with links to the user's DineWall profile and the cover letter.

If the guest user decides to create a profile, a DineGigs Create Profile (Sign Up) user interface is shown in FIG. 20. The Create Profile user interface allows a user to create a profile on the DineGigs system. The page may allow the user to add a cover picture and a profile picture. The Create Profile Page may ask the user to enter their full name, email address, phone number, a website link, a password and a confirmation of the password, a custom DineGigs uniform resource locator (URL), a username, and a description similar to a free-form resume description. The Create Profile page may also allow the user to add experience, certifications, education, pictures and a portfolio, and other forms of content. Experience may be added by listing employer categories, job titles, establishment names, establishment phone numbers, supervisor names, street addresses including city, state, country and zip code. The added experience may also list a start date and end date, and a check box may be provided to show when the candidate is currently employed.

Figure 44:
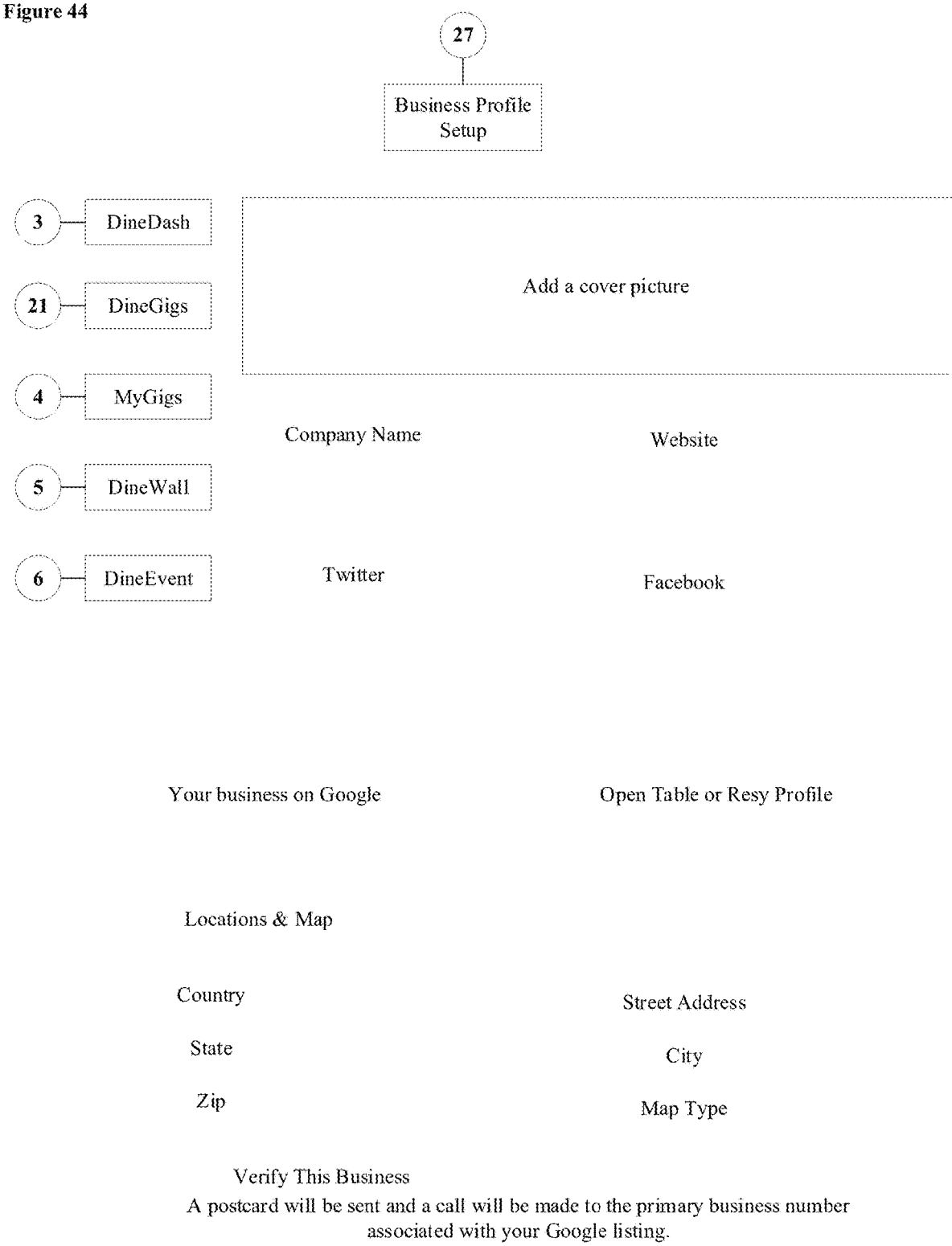
FIG. 44 illustrates an exemplary Business Profile Setup user interface of an application for multi-level network-based access coordination.

A Create Profile page for a business is shown in FIG. 44 and allows an establishment to create a profile on the DineGigs system. The page may allow the establishment to add a cover picture and a profile picture. The Create Profile page for a business may also ask the creator (e.g., a manager) to enter the business name, and social media links for the business, as well as profiles on Open Table and Resy or other online reservation systems. The Create Profile page for a business may also ask the establishment to specify the location of the establishment on a map. An establishment may be verified by sending a postcard to the establishment and by calling a business number listed by the establishment.

A Business Page Manager View page may be provided to allow a manager of a business to manage a Business Page for the business. The Business Page Manager View page may include pictures of the business, the name and web domain of the business, a clickable link for visitors to send a resume and cover letter to the business, a description of the business, and job openings posted by the business. Information of the Business Page may be edited via the Business Page Manager View page. For example, the manager may be provided a clickable link to edit the Business Page and clicking the clickable link with allow the manager to change any of the information on the Business Page.

Once created, a Business Page may be a DineWall page that provides many different types of content and information for an establishment. The Business Page may show pictures of the establishment, a description of the establishment, recent posts on the DineGigs system by the establishment or owners or employees of the establishment, job openings at the establishment including descriptions and job titles, and other information. The Business Page may also show summaries of and links to articles describing the establishment and a map of the location of the establishment.

A Business Page for a business owner associated with an establishment may include some information similar to the DineWall page for the business, such as pictures of the establishment and a description of the establishment. However, the Business Page for the business owner may be more personal, showing online friends who the owner follows, online friends who are following the owner, online friends who are employed by the business, and other users who have confirmed relationships with the owner.

A Post A Job One Click page may allow a manager to post a job opening for a restaurant. The Post A Job One Click page may include windows for the manager to select a category for the restaurant, a preview description of the job opening, a title of the job, details of the job, an email address to use for applications to contact the manager or a designee, checkboxes for full time or part time, a job category, and a full job description. The manager may be allowed to upload images, such as of the restaurant. The Post a job One Click page may also allow the manager to select from warnings that an applicant will have to acknowledge, such as for drug testing, a requirement that the job requires the employee to have a smartphone or tablet with the DineGigs application installed thereon, or other requirements.

A Post a Job page may allow an establishment to create and post a job on the DineGigs system. For example, an establishment may be asked to specify a type of the establishment, a job title or type, a job preview, a job description, an email address to contact the establishment, whether the job is full time or part time, whether the job is front of the house (FOH) or back of the house (BOH), notices to candidates of job requirements, and an image the might be useful for a candidate.

A Job Detail page may list a specific job opening for a business. The page may include a clickable link to allow a visitor to apply for the job and another clickable link to save the job opening for later. Separate links may allow the user to share the job opening on the user's page, mail the job opening to one or more friends/contacts, inquire about the job opening by text or email, or print the job opening. The job opening page may include the name of the business, the type of job, a description of the job opening, a description of the business, a location of the business on a map, photos of the business, and listings of other job openings for the business.

Additionally, related job openings may be listed on the bottom or side of the Job Detail page, such as other job openings at the same business or nearby businesses, or similar types of job openings in the same region. The related job openings may include types of the jobs, locations of the jobs, whether the jobs are full time or part-time, and how long the job openings have been posted on the system.

A Profile popup page may show a user's name, phone number, email address and several clickable links. For example, an individual user may be able to access a page to view/edit their profile by clicking one clickable link or change their password by clicking another clickable link. The individual user may also switch to their employee profile, or a business profile associated with the user by clicking another clickable link.

Manager Log Module—022

The DineGigs Manager Log is for managers while WeNeed is for individual employee users. Both offer similar functionality; a record of the day's events and needs. Managers/business users are provided an ability to keep an electronic diary of the day's events, with functional links to resolve noted issues. This allows establishments with multiple managers to stay in the loop and make notes for one another. Managers may have the ability to categorize each post under Operations, Shift Notes, Ordering, and 86. WeNeed is where employees post items that are out of stock, etc. All employees and managers may have access to the daily WeNeed feed, to avoid redundancy of posts. When drafting an item in WeNeed, an employee may have the ability to mark it as a Shift Note with text visible only to managers. Each feed may appear with information relevant to the permissions of the type of user viewing the feed (manager or employee).

Figure 26:
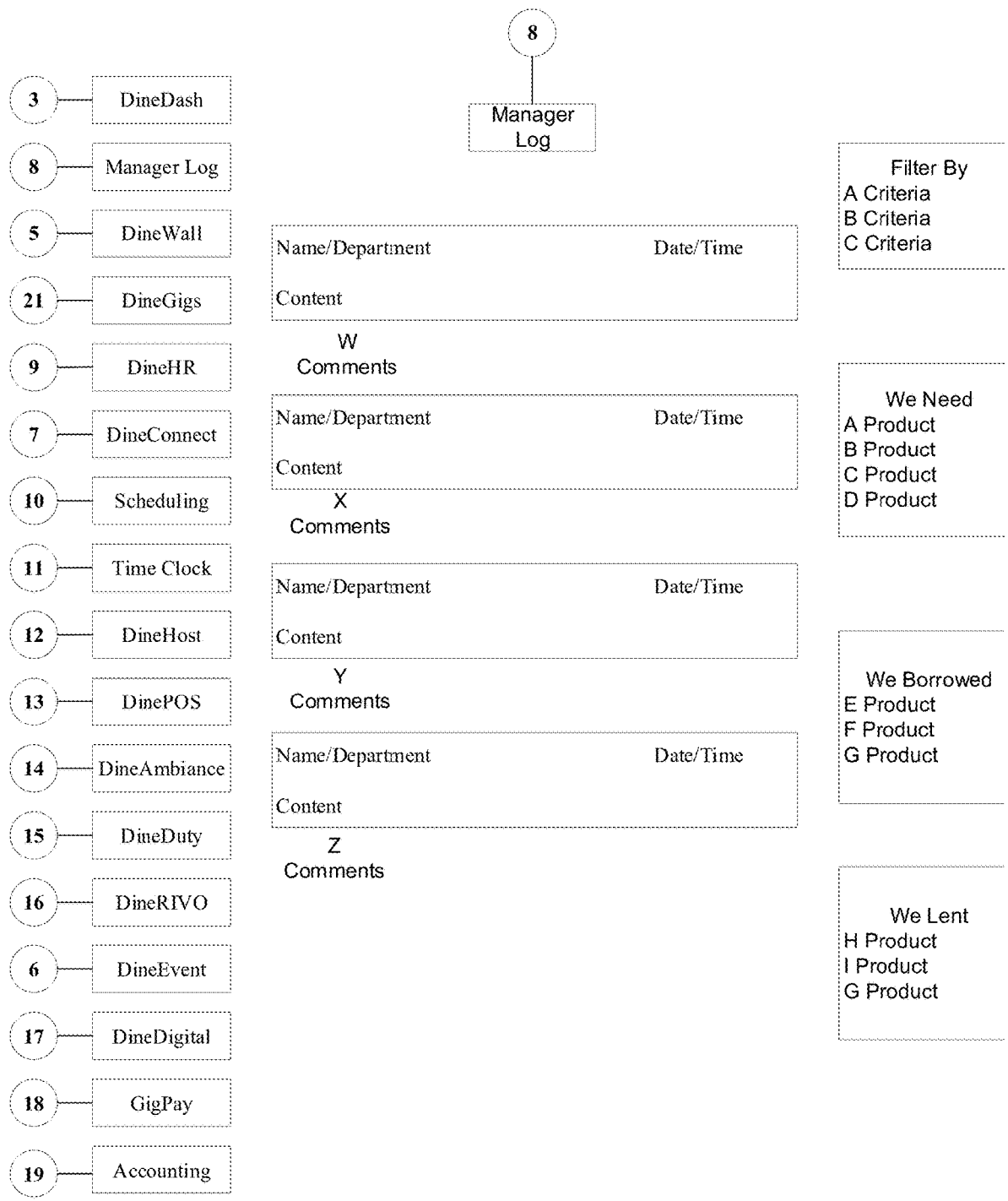
FIG. 26 illustrates an exemplary Manager Log user interface of an application for multi-level network-based access coordination.

FIG. 26 illustrates an exemplary Manager Log user interface of an application for multi-level network-based access coordination.

In FIG. 26, a manager log includes multiple areas in the middle showing reports by different DineGigs user by name, department, date/time and content. The reports may be reports by managers as to operating conditions for a shift, or reports by permitted employees who report unusual circumstances or problems. Sections on the right side allow managers to see requests for needed products and services, reports for borrowed ingredients and goods, and reports for ingredients and goods that were lent out.

A Manager Log page allows a manager to log reports from employees. Reports may include information about the flow of customers, weather around the restaurant, events at nearby venues, recommendations about how to coordinate scheduling better, and so on. For example, reports may be logged periodically, such as once a shift or hourly, or ad hoc such as whenever a report is believed warranted by an employee. Additionally, the Manager Log page may be filterable by topical categories, so that the DineGigs system can display certain types of reports in response to selections by the manager. The manager log may also include fields linked to other pages, such as a WeNeed page summarizing open (unfilled) requirements, a We Borrowed page summarizing items borrowed and where the items are to be returned, and a We Lent page summarizing items lent out that are expected to be returned.

A Manager Log-Borrow-Request may provide a location for a manager to make a request of another to borrow something. For example, a drop-down box or fillable window may allow the manager to specify a recipient of a borrow request. One or more items to borrow can be listed directly together, or one at a time using a clickable Add button. Items may be requested by quantity or weight, such as 12 onions or a pound of onions. A clickable button may also allow the user to confirm and send the request.

A manager log may be information of or a link to a daily recap written by managers with prepopulated breakdowns of sales, local weather imported, employee disciplinary actions sent and acknowledged automatically updated, general notes, etc.

Figure 38:
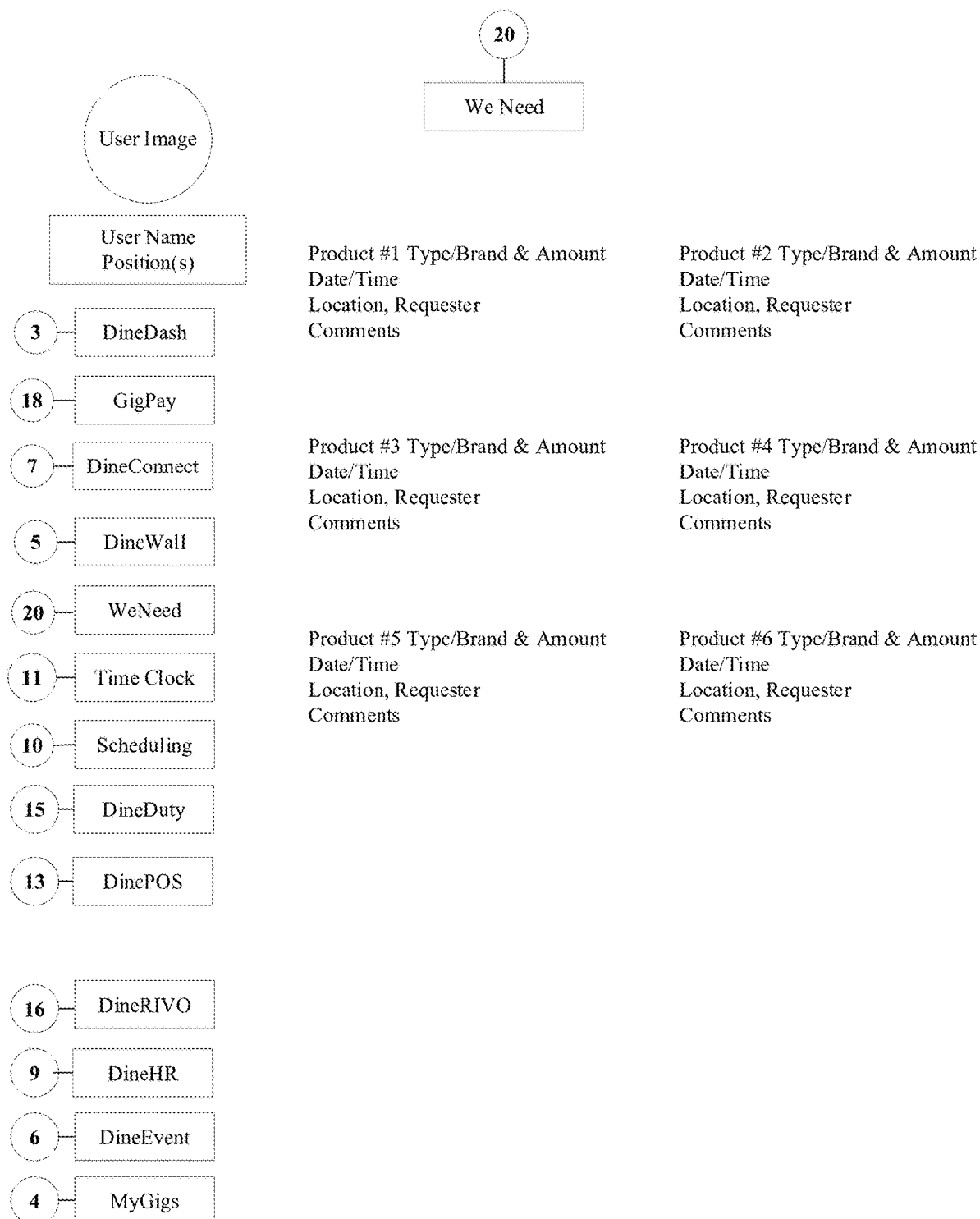
FIG. 38 illustrates an exemplary WeNeed user interface of an application for multi-level network-based access coordination.

FIG. 38 illustrates an exemplary WeNeed user interface of an application for multi-level network-based access coordination.

While WeNeed may be provided as a separate module for employees analogous to the Manager's Log for managers, the WeNeed functionality may be implemented using the Manager Log module of the DineGigs system. In the WeNeed user interface of FIG. 38, employees are allowed to list needed products by type, brand, amount, date/time of request, location, requester, and with any comments. Once saved, the request for products (e.g., ingredients or other goods) may result in a notification to the manager via the Manager Log user interfaces presented to the manager.

Time Clock Module—023

The Time Clock may be a simple user interface where employees record their arrival or departure from work. Employees can be offered the ability to clock in within a geofence automatically via the DineGigs smartphone app. For this instance, functionality provided may include the ability to clock in or out from a shift, the ability for an employee to request a manager to alter a time punch and from the manager/business user end, the process of how a manager alters a punch (includes area for manager to include reason.

Figure 29:
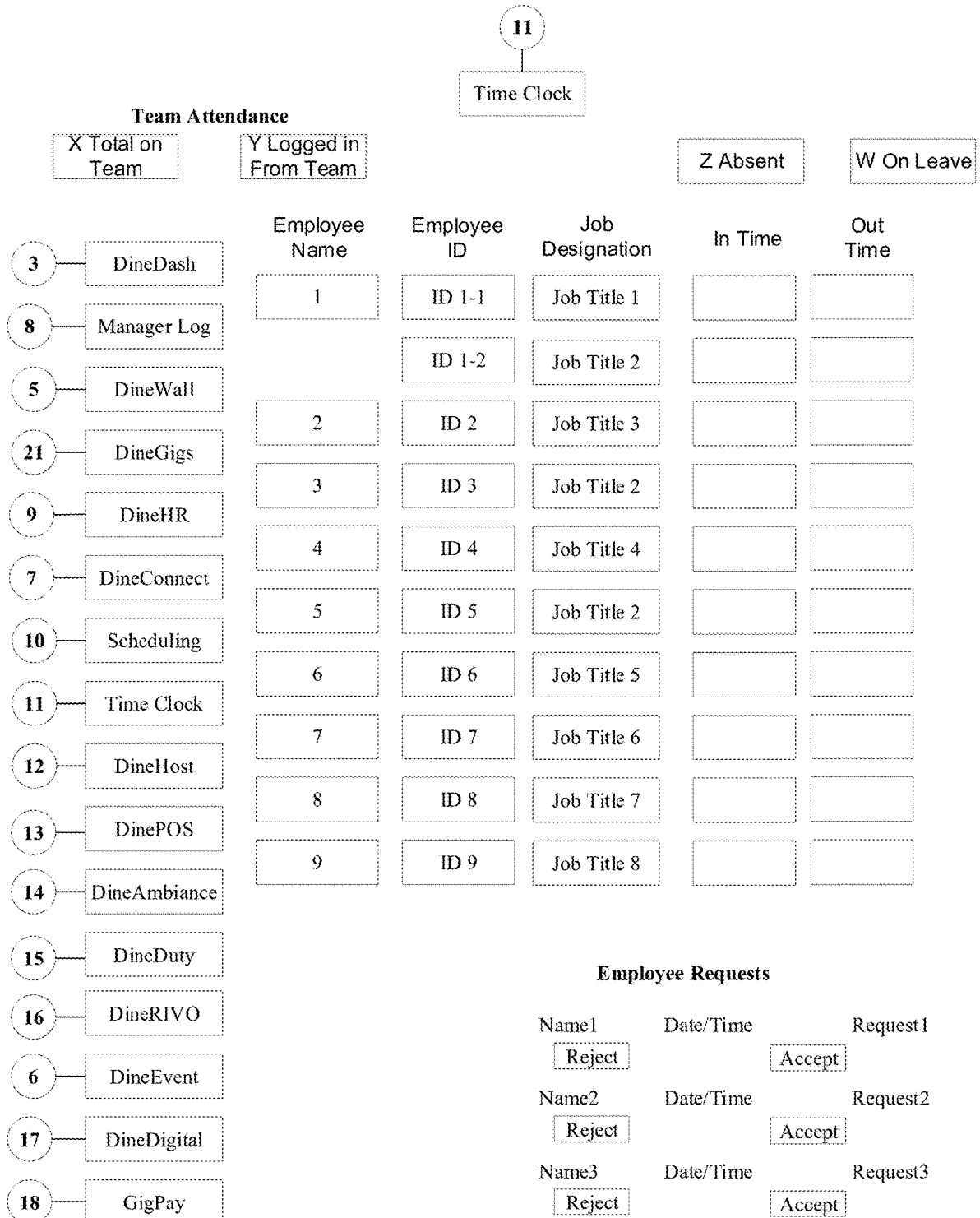
FIG. 29 illustrates an exemplary Time Clock user interface of an application for multi-level network-based access coordination.

FIG. 29 illustrates an exemplary Time Clock user interface of an application for multi-level network-based access coordination.

In FIG. 29, nine employees are arranged in rows by name, employee ID, job designation, in time and out time. Summaries at the top of the user interface show the total number of employees on the team, the total number of employees logged into the DineGigs system, the total number of team employees who are absent, and the total number of team employees who are on leave. Upcoming employee requests are shown on the bottom, including selectable operational buttons to accept or reject each employee request.

A Time Clock Business page may be provided to show results for a team from the viewpoint of a manager. For example, fields may include the total number of team members for a shift or on the overall payroll of a restaurant, the total number of logged in team members at a time the Time Clock Business page is being viewed, the number of team members absent and the number of team members on leave. Employees may be listed by line, with fields for name, employee ID, DineGigs system ID that is shared across employers for a single employee, job designation, a time of clock in and a time of clock out. Employee requests may also be listed, such as requests for days off, to leave early or arrive late, or other types of requests. For each employee request, clickable buttons may be provided to reject or approve the request.

A Time Clock Employee View page may be provided for an individual employee from the viewpoint of the manager. The Time Clock Employee View page may have different fields to show in-time today, number of hours worked/credited yesterday, number of hours worked/credited last week, and number of hours worked/credited this month. The employee may be provided fields to input a data range to show all scheduled and/or credited shifts for the date range including date, type of position, in time, out time, and number of hours worked/credited. Additionally, the results shown using the date range may include scheduled days off and approved days on leave. A scorecard of time due to the employee may also be provided on the Time Clock Employee View page, such as the total number of paid leave days earned, total number of earned paid leave days used, and the balance of paid leave days remaining. Different types of leaves may be separate listed on the scorecard.

A Time Clock Employee page may be provided for an individual employee from the viewpoint of the employee. Differences for the Employee view page compared to the Employee View page may include differences in the links provided on the left side of the page, as links provided for an employee may differ from links provided for a manager. The Employee page will also show the employee as the logged in DineGigs user on the left, whereas the Employee View page will show the manager as the logged in DineGigs user on the left and the employee as the DineGigs user whose Time Clock is being viewed. The Time Clock Employee page may the same or similar arrangement of fields as the Time Clock Employee View page, as well as the available use of a date range to show scheduled days, days off, and approved leave days. The Employee page may also have the same or a similar scorecard for time due as in the Employee View page made available to the manager.

A Time Clock Manager page may be provided for the manager for the manager's own time records. The Manager page may include substantially the same types of information and fields for the manager as on the Employee page for the employee, and thus further detail of the Manager page is not provided.

DineHost Module—024

The DineHost module is a module in the DineGigs system for both business and non-business users and may be required for either or both. The DineGigs system uses the DineHost module to integrate with third party reservation systems such as OpenTable and other reservation service providers.

Figure 30:
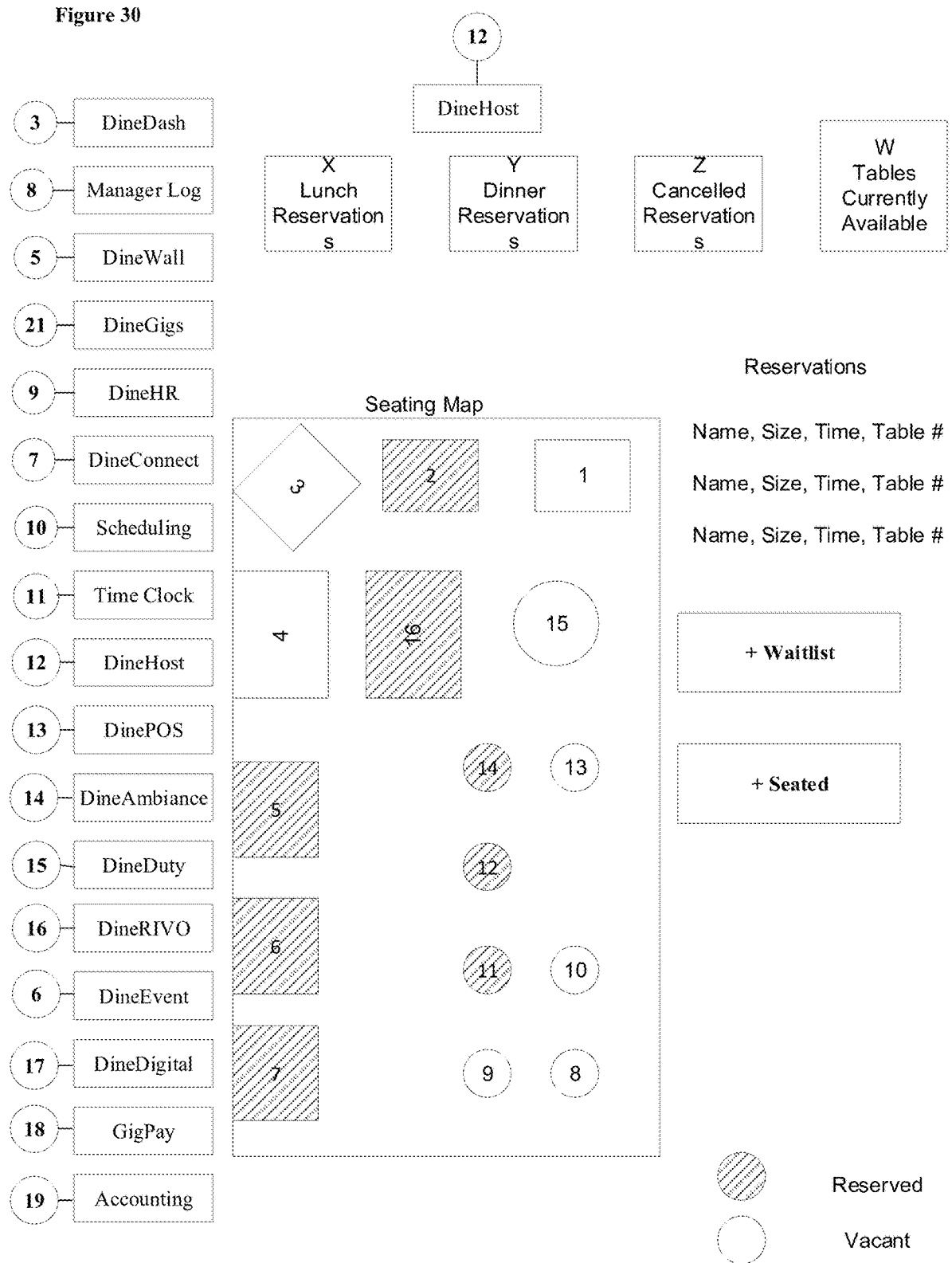
FIG. 30 illustrates an exemplary DineHost user interface of an application for multi-level network-based access coordination.

FIG. 30 illustrates an exemplary DineHost user interface of an application for multi-level network-based access coordination.

In FIG. 30, selectable tabs at the top of the DineHost user interface are for lunch reservations, dinner reservations, cancelled reservations, and tables currently available. The DineHost user interface in FIG. 30 is from the viewpoint of an establishment, and also includes a seating map for the establishment and an adjacent reservations section listing notable upcoming reservations by name, size, time and table #.

The selectable tabs at the top of the DineHost user interface in FIG. 30 will each result in a new DineHost user interface or a pop-up user interface, showing respective information such as lunch reservations, dinner reservations or cancelled reservations. Additionally, expandable selectable buttons on the right can be selected to show a waitlist and a list of those parties already seated.

Thus, the DineHost user interface in FIG. 30 shows information that a restaurant host is responsible for. The DineHost user interface may show the number of lunch reservations, the number of dinner reservations, a count of cancelled reservations, a number of currently available tables, a map of all tables and seats in the restaurant and an availability status of each table and set, and other forms of similar relevant information. Expandable and contractable clickable links may be provided for reservations, a waitlist, and seated parties. For example, the reservations link may be expanded to show upcoming reservations including the party name, the scheduled time, the number of guests, and the anticipated table reserved for the party.

As with all or most other user interfaces described herein, a set of selectable links to other modules of the DineGigs system is provided on the left. The set of selectable links may specifically be arranged as a default set by the DineGigs system based on, for example, the type of position held by the DineGigs user viewing the DineHost user interface in FIG. 30. Additionally, the DineGigs user may be provided an option to rearrange, add or delete selectable links on this or other user interfaces described herein.

DineMaintenance Module—025

The DineMaintenance module is maintenance information and activity is managed for equipment, technical documentation, legal matters, permits and licensing, facility management schedules and service contracts, accounts management, and property/casualty insurance documentation. The insurance documentation may cover buildings, liability, workers compensation and vehicles. Additionally, DineMaintenance is where related services can be shopped, purchased, scheduled, expensed, budgeted, and fully integrated with the DineGigs Ecosystem via DineRIVO, Accounting, Scheduling and GigPay.

The DineMaintenance module may be linked on the left of user interfaces for many different modules of the DineGigs system. For example, DineMaintenance may be the final selection made available for business users at the bottom of the list of selectable options on many, most or all user interfaces they encounter. On the other hand, individual users who are not managers may not have access to DineMaintenance unless permitted by a manager using the permissions functionality described herein.

When the DineMaintenance tab is selected, the DineMaintenance user interface may include categorical tabs at the top for categories including Equipment, Facility, Accounts, Insurance, Licensing, Legal, Inspections, IP, and Service Providers.

The equipment category may provide the manager the ability to search or add new equipment, for options including Electronics, Industrial, Tools, Spare Parts, Furnishings, Kitchen Tools, Glassware, Vehicles, Artwork, and Other All of a restaurants equipment can be categorized by selecting the field in which in may be categorized within at the time it's added. Therefore, selection of an option to add new equipment may result in a pop-up user interface with the option to pick one of the categories for the new item. The manager may be prompted to select or enter the manufacturer, a formal model name and/or model number (e.g., Viking 624-08), a description (e.g., Convection Oven w six burner stovetop), and other information. The manager may also be prompted to enter nicknames and tags for new equipment manually or via a selection from a list. The manager may also be prompted to manually enter a product serial number, purchase date, retailer, phone number, address, and representative name. Moreover, the manager may also be prompted to add information for the retailer's membership rewards account number, a phone number on the account, and a business name on the account. The manager may also be prompted to upload a receipt and enter or upload a warranty policy for the new equipment, along with information or documentation of a service policy, cost, maintenance schedule, reminder dates, a product manual (e.g., a pdf), and more.

Additionally, DineMaintenance may allow the manager to track items that are lent, with a description of when the item is expected back, to help managers and other DineGigs users find missing items.

The functionality of the Industrial tab may be for maintaining information of industrial restaurant equipment. The Tools tab is for information of screw drivers, power tools, etc. The Spare Parts tab is for information of details about extra parts needed or purchased in the past and tagged to another item. The Furnishings tab is for information on tables, chairs, bar stools, vases, chalkboards, etc., owned by the establishment, to maintain an inventory of furniture and furnishings for the establishment. Additionally, the Furnishings tab may also be linked to an inventory schedule for the furniture and furnishings. The Kitchen Tools tab if for maintaining information regarding kitchen tools such as cutting boards, knives, etc. The Glassware tab is for maintaining information on glass drinkware inventory, types, and purchase orders of the beverage glasses. The Vehicles tab is for information on automobiles owned by the establishment, and may include a warranty schedule, receipts, mileage documentation, tagged auto expenses from accounting. The Artwork tab is for details about purchase and/or rental of artwork in the establishment including valuation.

The navigation menu 1 category for Facility is for maintaining information about regularly scheduled or needed services supporting the establishment. Examples, include pest control, hood cleaner, pressure washers, window washers, floor care, bar care, linen services, fire suppressant, security systems, groundskeeper, and more. If a provider or contract has been established or if multiple providers or contracts exist, a user may be able to enter details of a contract, including price and schedule added to restaurant maintenance schedule. If not, clicking a selection may result in identification of service providers available in the category populated from DineRIVO.

Users may also be provided an option to create, assign, and book tasks to an employee or a service provider, view maintenance calendar, ability to tag provider to product. An option to create a demo may provide the establishment an ability to create a maintenance demonstration video/instructable and assign its viewing to an employee for training purposes. An option to find providers may be integrated with a third-party service such as vendIO to identify service providers who provide services, all of which can be added to the selectable navigation matrix once added. A selectable option for Accounts results in a user interface for an online user account name and password keeper, with options to manage user sub accounts created on the site. An option for Insurance is where all insurance details are included, including, policy numbers, declaration pages, coverages, agent name, phone number, claim reporting, claim history, pending claims, etc. An option for Licensing is where business licenses, alcohol licenses, permits, etc., numbers are stored and details about their renewal and renewal agencies are kept. An option for Legal is where all documentation of legal proceedings against the establishment are recorded. An option for Inspections is for all inspector reports, dates, grades, and entered notes for future review with reminder dates. An option for IP is for trademark and reminders for things such as website expiry dates. Finally, an option for service providers is where all types of service providers can be found, RFPs can be sent, and contractors can be booked through searching the vendIO service provider database.

A Dine Maintenance page may be or include links to a main Dine Maintenance page, an option to Add Equipment, and a Dine Maintenance Menu. A main Dine Maintenance page may include categorical links for equipment, facility, accounts, insurance and more. The equipment category, when selected, may display a variety of equipment links for electronics, industrial, tools, spare parts, furnishings, kitchen tools, glassware, vehicles, artwork and other. Individual items of equipment that require maintenance may be listed along with their impending maintenance dates. The Add Equipment page may allow a user to add a piece of equipment for maintenance, such as by category, model name and/or model number, nickname, tags, product serial number, purchase date, retailer, phone number, address, representative name, store membership rewards account number, phone number on account, business name on the account, and representative name. A user may be provided a section to upload a receipt, review a warranty policy at a linked uniform resource locator (URL), and upload a warrant policy if one is available. Checkboxes may be provided for whether a service policy exists, if a maintenance reminder should be created, and if a chain of custody should be added. Checking any of the checkboxes may result in an ability to populate information in windows, such as a next service data and a cost for service if a service policy exists.

DineBrand Module—026

A DineBrand page may be provided for a manager to manage branding for a business. The DineBrand page may include content such as picture, thumbnails and summaries of different types of content, as well as links to stored content such as libraries of pictures, videos, television and radio advertisements, newspaper reviews, logos, and other types of content. Each item of content included on the DineBrand page may be provided with a selectable button that allows the user to share the item of content, as well as a date/time of when the content was listed.

A DineBrand Share page may be provided when a user chooses to share an item of content on the DineBrand page. The DineBrand Share page may allow a user to create, schedule, sponsor and publish a post to multiple social media accounts on different social media platforms corresponding to the business. The Share page may allow the user to provide text, a link, a time and date for the post to publish, selected social media platforms to publish the post, and selectable buttons that allow the user to upload content stored in storage such as pictures.

A DineBrand Calendar page may be provided for a user to manage a calendar of branding events for a business. The Calendar page may have different windows for different types of branding and activities. For example, a manager may select between buttons for scheduled posts and feeds and see existing and upcoming posts along with the text and images provided in the posts. The scheduled posts or feeds may also be listed with date/time of publication, and whether the publication has already occurred or is scheduled to occur. Selectable links may also be provided to allow the manager to add a campaign or add a post for the business.

A DineBrand Social page may track social media activities involving the business, such as mentions by social media users, mentions that have not been read/reviewed, replies to mentions, messages to the social media account(s) of the business, and identities of users who interact with the social media accounts of the business. Analytics provided by social media platforms for business pages may also be provided, including breakdowns of people viewing the social media pages of the business categorized by gender, age groups, relative numbers and percentages of interactions involving existing friends/fans/followers compared to total interactions (i.e., including with strangers) and so on. Graphical information may also be provided to show changes over time, regions (such as countries and continents) where the people viewing the social media pages are located, the number of viewers by category and other forms of useful information descriptive of the users who interact with the social media accounts of the business.

A DineBrand Listing page may be provided for a manager to list information for the business on social media. Information for the business that can be listed on a managed Brand Listing page includes business name, the business listing API, address, phone number, website/URL, social media account identities, days and hours of operation, location on a map, upcoming events, and links such as to menus and third-party reservation platforms.

A DineBrand Email Marketing user interface may provide links to third-party email marketing providers who can assist a manager in creating an email marketing campaign. The DineBrand Email Marketing user interface may allow the establishment to import/upload a list of contacts from existing email accounts, create and send a campaign to subscribers on a list, and provide an ability for users to subscribe to lists for the business. Subscribers can then receive information and promotions from the establishment.

A DineBrand Analytics may provide analytic results similar or identical to those on the DineBrand Social page. Analytics can include metrics for site traffic including sessions and hits over time, daily new users by date, by average for a period, by changes from a baseline, and so on. Individual statistics can also be provided in fields such as average daily users on weekdays, and new user growth. Browser types used by users visiting webpages and social media pages of the business may also be categorized. The number of sessions and hits can be listed by day of week, day of month, time of day, or any other metrics that can be readily derived using electronic clock information. The DineBrand Analytics page can therefore provide analytics for multiple different webpages and social media accounts for a business. The DineGigs infrastructure described herein can provide the same and similar analytic services automatically and on-demand for multiple different businesses. The analytic services can be restricted to owners and managers in the same way that different services and information are tailored for different categories of users for each entity throughout the DineGigs ecosystem Accordingly, DineBrand may be provided as an integrated marketing solution for restaurants. The restaurants may manage a digital creative asset content pool, listen and interact with social media mentions, respond to reviews, create social media posts, create a marketing calendar, appoint a third party dedicated marketing manager or team, and even offer the ability to find and hire talent. For example, the digital creative asset content pool may include photo storage, tv/radio ad storage, newspaper reviews, video storage, logos and more. The social media posts may be created across channels without redundant entry. The marketing calendar may be created and integrated with email marketing. Additionally, the user may be provided an ability to manage search engine business listings. The third party dedicated marketing or manager may be appointed to execute a marketing strategy in the businesses accounts natively. The ability to find and hire talent may be provided through integration with an external platform such as VendIO and may include the ability to find and hire photographers, videographers, marketing consultants, graphic designers, contact radio and tv ad sales reps and order/create blog content.

The restaurants are also able to track and visualize all metrics of advertisement campaigns from DineBrand as well to help focus strategy based on what people respond to the most in context of the restaurant brand and timing of ads placed.

Additionally, restaurants may be provided access to Ionix facial recognition technology as an infrastructure connecting to other restaurants that creates the ability to build complex customer CRM profiles through understanding for the first time who every customer is that comes to the store, where else the customer eats, what the customer orders, and more, even if the restaurant does not specifically known who the actual customer is. By understanding who the customer is and what the customer likes, restaurants will have the ability to better meet the wants of their customers and create the potential to win more of their business.

DineDigital Module—027

The DineDigital module embodies an online concept to reduce the redundancy of creating and changing menus on several different internet platforms and print platforms, as this often takes much time away from restauranteurs. Further, the goal of DineDigital is to allow businesses to easily extend self-service kiosks, digital menu displays, web ordering, and digital payment solutions from DinePOS in an integrated solution.

DineDigital may be offered as a standalone iOS, Android and Roku app. Users may download and login to the DineDigital application. Only DineDigital files saved to the users account will be available to select and project on that device. DineDigital offers a suite of simple solutions for users to manage the transition to digital menus and sharing data with data distributors.

Figure 35:
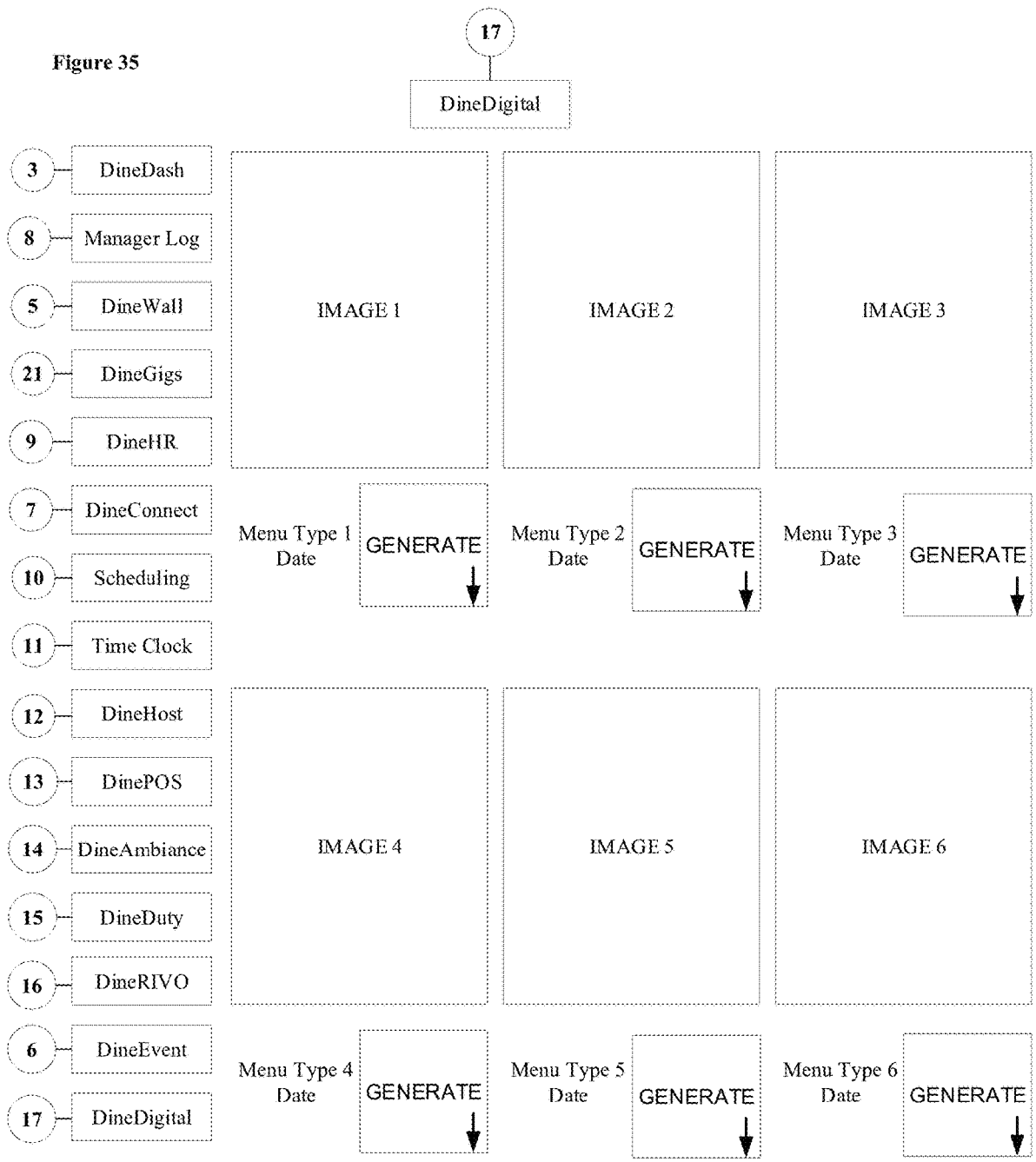
FIG. 35 illustrates an exemplary DineDigital user interface of an application for multi-level network-based access coordination.

FIG. 35 illustrates an exemplary DineDigital user interface of an application for multi-level network-based access coordination.

In the DineDigital user interface of FIG. 35, six sections in the middle each include an image and a menu type corresponding to the image, as well as a date corresponding to the menu type. The DineDigital user interface of FIG. 35 is used to create menus from templates or free-form content provided by a user. The menus can be generated via the DineDigital module and then saved for use via the DinePOS module when wanted.

A DineDigital page may be managed by a manager of a restaurant and used to store different menus and menu items. The DineDigital page may include a picture of each menu and menu item, a date on which the menu or menu item was generated, and a clickable link to generate or modify the menu or menu item. Another clickable link on the DineDigital page may allow a user to plan a menu. The Plan A Menu page is described below.

A DineDigital All dropdown page may be a drop-down menu that appears from a link on the DineDigital page. The All dropdown page may include selectable options for Show Me, All Drafts, Scheduled, Print, Web, Kiosk, Menu Display, Order Display, and All Archived Menus.

A DineDigital Generate dropdown page may be a drop down that appears from a link on the DineDigital page. The Generate dropdown page may include selectable options to schedule a menu, print a menu, Web, Kiosk, menu display, order display, and move to archive.

DineDigital thus provides a design formatting solution for menu data without the need for a graphic designer. When a DineGigs user enters the DineDigital dashboard the DineGigs user may be presented with prompts asking the user what is to be created in navigation menu 1, with selectable options beneath in navigation menu 2 for Print, Plan, Web, Display, Kiosk. Selecting any of these fields lists options below the selected category in navigation menu 3 for New, Scheduled, Archive. For this example, assume Print is selected. Saved is where previous/current designs are kept along with editable custom themes/templates created by, for example, third-party graphic designers. Schedule allows future menus to be created from any DineRIVO recipe. The New features a visual list of template packs, which are collections of different sizes and types of menus with a design theme available as well as the ability to upload a template.

Next, when a template pack is selected, the DineGigs user can select which of the menu styles in the template pack the user wants to use i.e. table flag, happy hour 4.5"×5.5", standard 8.5"×11", Specials Menu 4.5"×11". Current items marked active in DinePOS can appear in a separate box to the right from which the items marked active can be dragged into the section of the template to the left in which the items marked active correspond. If more than one menu is being created, each must be completed individually and matched to the section in the POS where the item is found.

Once a menu is completed, options are provided to save and mark active, print, publish an internet PDF, update the online store, or schedule. Selecting one option does not exit the template, as each must be selected independently. As an example, up to four options may be selected. If the user elects the option to save the user is prompted to provide a name for the file. If the user elects to print, the user is prompted with a print dialog box. If the user elects to publish an internet PDF, the module may convert and store an HTML version of the menu at a standardized API location address that does not change. This API will then only need to be entered once in the header of the menu page of the restaurant's website. When the page is loaded, the API will call the HTML to be loaded, displaying the new menu. Anytime the menu is update, calling the API will remit the new version of the menu. This also will allow search engines like Google (or websites like Yelp or OpenTable) to only require restaurants to enter their menu API on their Google Business page to call menu data. If the user elects to schedule, the user is allowed to create menus into the future. As a result, an establishment can build scheduled menus and select the days/times/shifts that are active into the future. Using the same permanent API endpoints, today's menu can be sent when called, or for a company like OpenTable, when a user is making a reservation for a future date the user may have the ability to call the future menu for the restaurant on that night. If a menu is scheduled, a default option may be shown to automatically update active POS items on scheduled dates. Selecting this will allow DineRIVO to plan items needing to be ordered, items needing to be prepped, suggests to the Scheduling module times for staff to arrive to complete tasks, automatically assign prep tasks to kitchen staff in DineDuty upon arrival for their shift, and print menus at a scheduled time before the shift begins.

For users that don't use print menus, an option to plan an electronic menu may be provided in navigation menu 2. When the option is selected, a basic user interface with DineRIVO recipe data allows the user to select dates/times/shifts in the future to create the electronic menu. Menu items can be dragged from a recipe list on the right into the menu on the left. Items may be pre-labeled in DineRIVO as, for example, Starter, Main Course etc., which will allow the items to fall into the correct category automatically. Alternatively, this gives who use print menus an option to plan menus into the future without committing to a template theme. Later, the users can select an option to print in the navigation menu 2 and then an option to explore new menus in navigation menu 3 so as to from menu packs with sections autoformatted with DinePOS data for the shift.

When the internet is selected in navigation menu 2, options such as Webstore, Web PDF, APIs may be made visible. The Webstore tab is where all menu items are broken out with available modifiers, options, and substitutions (pulling that data from DinePOS) to help users customize orders. Save and Publish may allow Webstore API to update online ordering webstore on the establishment website. A selection of a web menu PDF may result in the application loading a user interface that is similar to the options for Print, and may allow the DineGigs user to select a different theme than what was chosen for the Print preferences. Here, a web menu PDF may be HTML rather than a pdf image and may merely be in a layout that appears similar to a .pdf menu. However, an option to download as a .pdf image may also be provided. When APIs is selected, the DineGigs users are provided permanent API information to enter in a website header to load HTML and distribute menu data to distributors such as Google and OpenTable. A DinePOS API may be found here for businesses wishing to create an integrated, custom webstore. A webstore API may also be provided here. The webstore API can be entered in a user interface on the website of the establishment to load a generic pop-up webstore integrated with the DinePOS for online ordering.

A display is where digital menus that are not interactive (e.g., selectable) are configured. First, the user may select the formatting of the display (vertical or landscape) and the screen size range (e.g., 50"-55"). The user may have the option to create as many displays as needed, and the option to create a timed carousel from the displays created. For displays designed by a graphic designer, a user may have the option to upload files to broadcast. A generic option may be presented, such as when no graphic designer is present. First the user can upload a background image or select a solid/Ombre background color for the display. Next, the user may have the option to upload a logo and define placement. DinePOS active menu items will be imported into a right menu and the user can select items to display in the current display being configured. When satisfied with the result, a user may have options to
  broadcast to a display (usually a LED television) via
    broadcast via Wi-Fi or a Bluetooth connection
  save to a television hard drive,
  save to a USB flash memory stick publish to the application When connected, a display may autoformat for best fit.

A kiosk may essentially be the same as the web shopping cart but is formatted for tablets and larger touch screen displays. For ordering kiosks, a user can have options to select background, upload logo, text font and color for DinePOS active menu items, and to upload their own graphic design background. The user then selects the device type/display size of the destination device. If the DineGigs selects an option to save and publish, the kiosk design and shopping order flow are updated. Several kiosk designs can be created and saved, such as when different destination device sizes and types are contemplated. If the DineGigs user selects an option to create a check and signature kiosk, the DineGigs system allows the user to use inexpensive tablets to distribute final charges and accept payment/signature. Any tablets or other forms of devices with a display may be linked to the DinePOS module via an internet connection for live ordering and payment.

A Plan A Menu page may allow a user to plan a menu. The Plan A Menu page may include fields for a user to name a menu, a window for the user to drag and drop menu items from DinePOS or DineRIVO, create new sections, and populate each section of a menu. For example, a planned menu may include an Appetizer section and a Fajita section, along with sections where new Appetizers and Fajitas can be stored as in-progress menu items.

A DineDigital Print Menu may allow a user to choose a print size and a template, and then print or export different menus placed on the chosen template as a PDF. Selectable buttons may allow the user to Add a Template, Export the menu as a PDF, and print the menu.

A DineDigital Print Menu page may allow a user to print a menu. For example, the user may be allowed to choose a print size, choose a template for the menu from a library of templates, and choose other options similar or identical to conventional printing choices for conventional printers. A Menu may also be exported as a PDF as an alternative to printing.

A DineDigital Kiosk page may show a kiosk menu. The kiosk page may allow a user to select the kiosk size in terms of inches and pixels. The kiosk page may also allow a user to select from among templates or to add a new template. Once completed, a populated or updated template may show a menu or advertisement including pictures of food, cost per plate, cost per meal, and other forms of information specific to a particular kiosk created from the kiosk page. Additionally, menu items may be described in multiple languages using a translation service, such that pictures are accompanied by names and even descriptions in multiple languages such as English and Japanese.

A Menu Display page may allow a user to generate a display for a menu. Selectable options may be options for a menu location (e.g., front, p. 2, back), options for a menu display orientation (e.g., landscape), options for a display size (e.g., in inches and in pixels), and an option how the menu should be broadcast (e.g., Wi-Fi). A user may also be allowed to choose a template for a menu from existing templates, a thumbnail for images in the menu or even s thumbnail for the existing portions of the menu as it is being created. Additionally, links to existing menus (e.g., A La Carte, Lunch Menu, Dinner Menu) may be provided on the Menu Display Page.

A DineDigital Order Display user interface may allow a manager to select a view such as Frontend View at Station from a drop-down menu. The Order Display page may also allow the manager to select a station from a drop-down menu or create a station to add to the drop-down menu. An example of a station is Sautee 1. The Order Display page may also allow the manager to assign an employee from a list of available employees to the station. The Order Display can be saved once the proper information is selected or otherwise input.

Although multi-level network-based access coordination has been described with reference to several exemplary embodiments, it is understood that the words that have been used are words of description and illustration, rather than words of limitation. Changes may be made within the purview of the appended claims, as presently stated and as amended, without departing from the scope and spirit of multi-level network-based access coordination in its aspects. Although multi-level network-based access coordination has been described with reference to particular means, materials and embodiments, multi-level network-based access coordination is not intended to be limited to the particulars disclosed; rather multi-level network-based access coordination extends to all functionally equivalent structures, methods, and uses such as are within the scope of the appended claims.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

The illustrations of the embodiments described herein are intended to provide a general understanding of the structure of the various embodiments. The illustrations are not intended to serve as a complete description of all the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for streamlining the disclosure. This disclosure is not to be interpreted as reflecting an intention that the claimed embodiments require more features than are expressly recited in each claim. Rather, as the following claims reflect, inventive subject matter may be directed to less than all the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A multi-entity automated communications system, comprising:
   a centralized computer that receives a first request from a first system with a first application coordinated by the centralized computer and provided on behalf of an entity that controls the centralized computer, that based on the first request automatically initiates a second request to authorize fulfillment of the first request to a second system with a second application coordinated by the centralized computer and provided on behalf of the entity that controls the centralized computer, that based on the first request and a response to the second request providing authorization to fulfill the first request, provides first instructions to a third system to initiate a first transaction to pay a user of the first system to fulfill the first request, and that based on the first request and the response to the second request provides second instructions to a fourth system to initiate a second transaction correlated with the first transaction,
   that receives a third request from a fifth system with the first application coordinated by the centralized computer, that based on the third request automatically initiates a fourth request to authorize fulfillment of the third request to the second system with the second application coordinated by the centralized computer, that based on the third request and a response to the fourth request providing authorization to fulfill the third request, provides third instructions to the third system to initiate a third transaction to pay a user of the fifth system to fulfill the third request, and that based on the third request and the response to the fourth request provides fourth instructions to the fourth system to initiate a fourth transaction correlated with the third transaction, and that receives a fifth request from a sixth system with the first application coordinated by the centralized computer, that based on the fifth request automatically initiates a sixth request to authorize fulfillment of the fifth request to the second system with the second application coordinated by the centralized computer, that based on the fifth request and a response to the sixth request providing authorization to fulfill the fifth request, provides fifth instructions to the third system to initiate a fifth transaction to pay a user of the sixth system to fulfill the fifth request, and that based on the fifth request and the response to the sixth request provides sixth instructions to the fourth system to initiate a sixth transaction correlated with the fifth transaction, wherein the third system confirms the first instructions to the first system and communicates with the fourth system to correlate the second transaction with the first transaction, confirms the third instructions to the fifth system and communicates with the fourth system to correlate the fourth transaction with the third transaction, and confirms the fifth instructions to the sixth system and communicates with the fourth system to correlate the sixth transaction with the fifth transaction.

2. The multi-entity automated communications system of claim 1, wherein the first application is distributed to the first system, the fifth system and the sixth system over a communications network, and the first application is configured to provide a first class of service;

wherein the second application is one of a plurality of instances of the second application and is distributed to the second system over the communications network, and the second application is configured to provide a second class of service;

wherein the centralized computer coordinates access between the first application and the second application, such that access to the first application on the first system, the fifth system and the sixth system by the second application on the second system is controlled by and through confirmation of the centralized computer; and wherein services are provided on behalf of the first application by the centralized computer, once access from the second application on the second system to the first application on the first system, the fifth system and the sixth system is confirmed.

3. The multi-entity automated communications system of claim 2, wherein the access to the first application from the second application is selective and is used to provide access to content on the first system, the fifth system and the sixth system from the second system with the second application.

4. The multi-entity automated communications system of claim 1, wherein the centralized computer sends the second request, the fourth request and the sixth request to the second application on the second system before providing respective authorizations to the third system to fulfill the first request, the third request and the fifth request.

5. The multi-entity automated communications system of claim 1, wherein the first system, the fifth system and the sixth system each execute a point of sale (POS) application that is customized for a first location common to the first system, the second system, the fifth system and the sixth system and not to the third system or the fourth system.

6. The multi-entity automated communications system of claim 5, wherein the centralized computer interactively coordinates services for the first location and for a second location and a third location.

7. The multi-entity automated communications system of claim 6, wherein the first location, the second location and the third location are geographically distributed from each other and independent of each other, and wherein the first application on the first system, the fifth system and the sixth system is configured to provide simultaneous access to the second application on the second system and on a seventh system at the second location and on an eighth system at the third location.

8. The multi-entity automated communications system of claim 1, wherein the centralized computer interactively coordinates services provided at a first location; and wherein the centralized computer dynamically coordinates services over time based on instructions received from each of the first system, the second system, the fifth system and the sixth system at the first location, and based on transactions completed by each of the first system, the fifth system and the sixth system.

9. The multi-entity automated communications system of claim 1, wherein the first application on the first system, the fifth system and the sixth system is configured to provide simultaneous access to the second application on the second system at a first location and on a seventh system at a second location and on an eight system at a third location.

10. The multi-entity automated communications system of claim 9, wherein the multi-entity automated communications system is configured to enable a first user using the first application to receive compensation upon authorization of a second user using the second application for any of the first location, the second location or the third location.

11. The multi-entity automated communications system of claim 9, wherein the first system is controlled by a payee, the second system is controlled by a payor who owes the payee, the third system is controlled by a first entity that provides a payment account for the payor and the fourth system is controlled by a second entity that provides a receivables account or a credit facility for the payor.

12. The multi-entity automated communications system of claim 1, wherein the first system, the second system, the third system and the fourth system are each independent of the centralized computer-sii and are each subject to independent control of separate entities.

13. The multi-entity automated communications system of claim 1, wherein the first application on the first system enables a first user to obtain compensation based on fulfilment of the first request upon authorization from the second application on the second system.

14. The multi-entity automated communications system of claim 13, wherein the first application on the first system enables the first user to dynamically obtain the compensation for gig work.

15. The multi-entity automated communication system of claim 13,
wherein the first application on the first system enables the first user to select a time period of work for which the compensation is requested in the first request.

16. The multi-entity automated communications system of claim 1,
wherein the first application on the first system enables a first user to obtain compensation based on fulfilment of a plurality of requests including the first request upon authorization from the second application on a plurality of systems including the second system.

17. The multi-entity automated communications system of claim 1,
wherein the first application enables a plurality of users at a plurality of locations to obtain compensation based on fulfilment of requests authorized from the second application at any of the plurality of locations.

18. A multi-entity automated communications system, comprising:
a centralized computer that receives a first request from a first system with a first application coordinated by the centralized computer and provided on behalf of an entity that controls the centralized computer, that based on the first request automatically initiates a second request to authorize fulfillment of the first request to a second system with a second application coordinated by the centralized computer and provided on behalf of the entity that controls the centralized computer, that based on the first request and a response to the second request providing authorization to fulfill the first request, provides first instructions to a third system to initiate a first transaction to pay a user of the first system to fulfill the first request, and that based on the first request and the response to the second request provides second instructions to a fourth system to initiate a second transaction correlated with the first transaction, that receives a third request from a fifth system with the first application coordinated by the centralized computer, that based on the third request automatically initiates a fourth request to authorize fulfillment of the third request to the second system with the second application coordinated by the centralized computer, that based on the third request and a response to the fourth request providing authorization to fulfill the third request, provides third instructions to the third system to initiate a third transaction to pay a user of the fifth system to fulfill the third request, and that based on the third request and the response to the fourth request provides fourth instructions to the fourth system to initiate a fourth transaction correlated with the third transaction, that receives a fifth request from a sixth system with the first application coordinated by the centralized computer, that based on the fifth request automatically initiates a sixth request to authorize fulfillment of the fifth request to a seventh system with the second application coordinated by the centralized computer, that based on the fifth request and a response to the sixth request providing authorization to fulfill the fifth request, provides fifth instructions to the third system to initiate a fifth transaction to pay a user of the sixth system to fulfill the fifth request, and that based on the fifth request and the response to the sixth request provides sixth instructions to the fourth system to initiate a sixth transaction correlated with the fifth transaction, that receives a seventh request from an eighth system with the first application coordinated by the centralized computer, that based on the seventh request automatically initiates an eighth request to authorize fulfillment of the seventh request to the seventh system with the second application coordinated by the centralized computer, that based on the seventh request and a response to the eighth request providing authorization to fulfill the seventh request, provides seventh instructions to the third system to initiate a seventh transaction to fulfill the seventh request, and that based on the seventh request and the response to the eight request provides eight instructions to the fourth system to initiate an eighth transaction correlated with the seventh transaction, wherein the third system confirms the first instructions to the first system and communicates with the fourth system to correlate the second transaction with the first transaction, confirms the third instructions to the fifth system and communicates with the fourth system to correlate the fourth transaction with the third transaction, confirms the fifth instructions to the sixth system and communicates with the fourth system to correlate the sixth transaction with the fifth transaction, and that confirms the seventh instructions to the eighth system and communicates with the fourth system to correlate the eighth transaction with the seventh transaction.

19. The multi-entity automated communications system of claim 18,
wherein the first system, the second system and the fifth system correspond to a first location and the sixth system, the seventh system and the eighth system correspond to a second location geographically remote from the first location.

20. The multi-entity automated communications system of claim 18,
wherein the first system, the second system and the fifth system correspond to a first entity and the sixth system, the seventh system and the eighth system correspond to a second entity independent of the first entity.

* * * * *